(12) United States Patent
Sato

(10) Patent No.: US 10,264,155 B2
(45) Date of Patent: Apr. 16, 2019

(54) WIRELESS COMMUNICATION APPARATUS THAT DISPLAYS IMAGES ASSOCIATED WITH CONTENTS STORED IN AN EXTERNAL STORAGE DEVICE

(71) Applicant: TOSHIBA MEMORY CORPORATION, Tokyo (JP)

(72) Inventor: Keisuke Sato, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/960,473

(22) Filed: Apr. 23, 2018

(65) Prior Publication Data

US 2018/0241904 A1 Aug. 23, 2018

Related U.S. Application Data

(63) Continuation of application No. 15/061,987, filed on Mar. 4, 2016, now Pat. No. 9,955,034.

(30) Foreign Application Priority Data

Mar. 19, 2015 (JP) .................. 2015-056982
Aug. 10, 2015 (JP) .................. 2015-158339

(51) Int. Cl.
*H04N 1/21* (2006.01)
*H04B 5/00* (2006.01)
*H04N 1/00* (2006.01)

(52) U.S. Cl.
CPC ......... *H04N 1/2158* (2013.01); *H04B 5/0031* (2013.01); *H04N 1/00095* (2013.01); *H04B 5/0037* (2013.01); *H04B 5/0075* (2013.01)

(58) Field of Classification Search
None
See application file for complete search history.

(56) References Cited

U.S. PATENT DOCUMENTS 8,928,792 B1* 1/2015 Hynecek .............. H04N 5/3591
348/308
9,576,387 B2* 2/2017 Lehtiniemi ............ H04N 1/387
(Continued)

FOREIGN PATENT DOCUMENTS

CN 1756319 A 4/2006
CN 101395917 A 3/2009
(Continued)

OTHER PUBLICATIONS

Japanese Office Action dated Jun. 15, 2018, filed in Japanese counterpart Application No. 2015-158339, 7 pages (with translation).

(Continued)

*Primary Examiner* — James M Hannett
(74) *Attorney, Agent, or Firm* — Kim & Stewart LLP

(57) ABSTRACT

A wireless communication apparatus includes a memory device in which data associated with a storage device are stored, wherein the data is acquired through a wireless communication; an image capturing device; a display; and a controller configured to: identify an external storage device corresponding to a code captured by the image capturing device, responsive to identification of the external storage device, generate a display image from the data stored in the memory device if the data stored in the memory device are associated with the identified external storage device, and control the display to display a display image, wherein the data stored in the memory device include thumbnail image data of image data stored in the external storage device, and (Continued)

the display image includes one or more thumbnail images that are generated from the thumbnail image data.

20 Claims, 64 Drawing Sheets

(56) References Cited

U.S. PATENT DOCUMENTS

| | | | | |
|---|---|---|---|---|
| 2007/0147774 | A1* | 6/2007 | Mori | G11B 27/107 |
| | | | | 386/291 |
| 2007/0218837 | A1* | 9/2007 | Lessing | H04B 5/0043 |
| | | | | 455/41.2 |
| 2009/0046211 | A1 | 2/2009 | Maekawa | |
| 2009/0073503 | A1 | 3/2009 | Lebaschi et al. | |
| 2010/0169548 | A1* | 7/2010 | Kanda | G06K 17/00 |
| | | | | 711/103 |
| 2013/0206832 | A1* | 8/2013 | Hashimoto | G06F 17/30244 |
| | | | | 235/375 |
| 2014/0051353 | A1* | 2/2014 | Nakamura | H04B 5/0031 |
| | | | | 455/41.1 |
| 2014/0063290 | A1* | 3/2014 | Okuhara | H04N 5/907 |
| | | | | 348/231.7 |

FOREIGN PATENT DOCUMENTS

| | | |
|---|---|---|
| JP | H04323980 A | 11/1992 |
| JP | 2000090228 A | 3/2000 |
| JP | 2000148797 A | 5/2000 |
| JP | 2002345039 A | 11/2002 |
| JP | 2004265343 A | 9/2004 |
| JP | 4339020 B2 | 10/2009 |
| JP | 2010044491 A | 2/2010 |
| JP | 4986264 B2 | 7/2012 |
| JP | 2014032683 A | 2/2014 |
| JP | 2014067441 A | 4/2014 |

OTHER PUBLICATIONS

Chinese Office Action dated Apr. 28, 2018, filed in Chinese counterpart Application No. 201610103964.8, 24 pages (with translation).

* cited by examiner

FIG. 5
| RECOGNITION ID | THUMBNAIL IMAGE | IMAGING TIME |
|---|---|---|
| 1 |  | 2014.12.1 |
| 2 |  | 2014.11.2 |
| 3 |  | 2014.11.1 |
| 4 |  | 2014.10.1 |
| ... | ... | ... |

FIG. 6

| RECOGNITION ID | DATA ID | THUMBNAIL IMAGE | IMAGING TIME | RECOGNITION ID | DATA ID | THUMBNAIL IMAGE | IMAGING TIME |
|---|---|---|---|---|---|---|---|
| ID01111 | 1 | | 2014.12.1 | ID02222 | 1 | | 2010.4.1 |
| ID01111 | 2 | | 2014.11.2 | ID02222 | 2 | | 2010.3.1 |
| ID01111 | 3 | | 2014.11.1 | ... | | | |
| ID01111 | 4 | | 2014.10.1 | | | | |
| ... | | | ... | | | | |

FIG. 7

| RECOGNITION ID | THUMBNAIL IMAGE 1 | IMAGING TIME | THUMBNAIL IMAGE 2 | IMAGING TIME | ... |
|---|---|---|---|---|---|
| ID01111 | | 2014.12.1 | | 2014.11.1 | ... |
| ID02222 | | 2014.10.1 | | 2014.9.1 | ... |
| ID03333 | | 2012.4.1 | | 2011.4.1 | ... |
| ... | ... | ... | ... | ... | |

FIG. 8

| DATA ID | BEFORE UPDATE THUMBNAIL IMAGE | IMAGING TIME |
|---|---|---|
| 1 | | 2014.12.1 |
| 2 | | 2014.11.2 |
| 3 | | 2014.11.1 |
| 4 | | 2014.10.1 |
| ⋮ | ⋮ | ⋮ |
| 10 | | 2010.10.1 |
| ⋮ | ⋮ | ⋮ |
| 16 | | 2013.1.1 |

⇧

| DATA ID | AFTER UPDATE THUMBNAIL IMAGE | IMAGING TIME |
|---|---|---|
| 1 | | 2014.12.1 |
| 2 | | 2014.11.2 |
| 3 | | 2014.11.1 |
| 4 | | 2014.10.1 |
| ⋮ | ⋮ | ⋮ |
| 10 | | 2015.1.1 |
| ⋮ | ⋮ | ⋮ |
| 16 | | 2013.1.1 |

BEFORE UPDATE

| CARD ID | DATA ID | THUMBNAIL IMAGE | IMAGING TIME |
|---|---|---|---|
| ID01111 | 1 | | 2014.12.1 |
| ID01111 | 2 | | 2014.11.2 |
| ID01111 | 3 | | 2014.11.1 |
| ID01111 | 4 | | 2014.10.1 |
| ... | ... | ... | ... |
| ID01111 | 10 | | 2010.10.1 |
| ... | ... | ... | ... |
| ID01111 | 16 | | 2013.1.1 |

AFTER UPDATE

| CARD ID | DATA ID | THUMBNAIL IMAGE | IMAGING TIME |
|---|---|---|---|
| ID01111 | 1 | | 2014.12.1 |
| ID01111 | 2 | | 2014.11.2 |
| ID01111 | 3 | | 2014.11.1 |
| ID01111 | 4 | | 2014.10.1 |
| ... | ... | ... | ... |
| ID01111 | 10 | | 2015.1.1 |
| ... | ... | ... | ... |
| ID01111 | 16 | | 2013.1.1 |

FIG. 12

| ID | DATA ID | THUMBNAIL IMAGE | RELATED DATA (EXAMPLE: DATE) | PRINT FLAG | PRIORITY FLAG | ID | DATA ID | THUMBNAIL IMAGE | RELATED DATA (EXAMPLE: DATE) | PRINT FLAG | PRIORITY FLAG |
|---|---|---|---|---|---|---|---|---|---|---|---|
| ID01111 | 1 | | 2014.12.1 | ○ | 1 | ID03333 | 1 | | 2010.4.1 | | 1 |
| ID01111 | 2 | | 2014.11.2 | | 1 | ID03333 | 2 | | 2010.3.1 | | |
| ID01111 | 3 | | 2014.11.1 | ○ | 3 | | | | | | |
| ID01111 | 4 | | 2014.10.1 | ○ | 2 | | | | | | |
| ... | | ... | ... | | | | | | | | |

FIG. 13
| DATA ID | THUMBNAIL IMAGE | RELATED DATA (EXAMPLE: DATE) | PRINT FLAG | PRIORITY FLAG |
|---|---|---|---|---|
| 1 |  | 2014.12.1 | ○ | 1 |
| 2 |  | 2014.11.2 |  | 1 |
| 3 |  | 2014.11.1 | ○ | 3 |
| 4 |  | 2014.10.1 | ○ | 2 |
| ... | ... | ... |  |  |

FIG. 32

| RECOGNITION ID | TITLE | FILE NAME | FILE GENERATION DATE | FILE UPDATE DATE | FILE CAPACITY | TOTAL CAPACITY | FREE CAPACITY |
|---|---|---|---|---|---|---|---|
| ID01111 | My USB1 | PRESENTATION1.pptx | 2014.10.10 | 2015.1.1 | 300kB | 32GB | 25GB |
| | | ACCOUNTING1.xlsx | 2014.11.1 | 2014.11.2 | 100kB | | |
| | | PRESENTATION2.pptx | 2014.10.15 | 2014.11.1 | 200kB | | |
| | | ACCOUNTING2.xlsx | 2014.8.1 | 2014.10.1 | 40kB | | |
| | | ... | ... | ... | ... | | |
| ID02222 | CORP.1 | EUROPE BUSINESS TRIP.pptx | 2013.6.15 | 2014.1.1 | 3MB | 32GB | 22GB |
| | | U.S. PRESENTATION.pptx | 2013.10.2 | 2015.1.10 | 2MB | | |
| | | ... | ... | ... | ... | | |
| ID03333 | My USB2 | STUDY MATERIAL1.pptx | 2013.7.25 | 2014.4.1 | 500kB | 16GB | 4GB |
| | | SENTENCE1.docx | 2013.8.2 | 2014.6.2 | 2MB | | |
| | | ... | ... | ... | ... | | |

FIG. 40
| RECOGNITION ID | TITLE | THUMBNAIL IMAGE | IMAGING TIME | FLAG INFORMATION | TOTAL CAPACITY | FREE CAPACITY |
|---|---|---|---|---|---|---|
| ID01111 | 2014 Motor Show |  | 2014.12.1 | 0 | 32GB | 5GB |
| | |  | 2014.11.2 | 0 | | |
| | |  | 2014.11.1 | 1 | | |
| | |  | 2014.11.1 | 1 | | |
| | | ... | ... | | | |

FIG. 63

| | FIRST HOST (1800) | NON-VOLATILE SEMICONDUCTOR MEMORY (1025) | | FIRST STORAGE UNIT (1040) | SECOND HOST (1850) | ADVANTAGES |
|---|---|---|---|---|---|---|
| FIRST OPERATION | ○ | ○ | | ○ | ○ | · SECOND HOST IS CAPABLE OF ACQUIRING DATA FROM FIRST STORAGE UNIT, WITHOUT POWER SUPPLY TO FIRST WIRELESS STORAGE DEVICE<br>· DATA ARE AUTOMATICALLY TRANSMITTED FROM NON-VOLATILE SEMICONDUCTOR MEMORY TO FIRST STORAGE UNIT, DURING POWER SUPPLY TO FIRST WIRELESS STORAGE DEVICE (FIRST HOST CAN ACCESS BY NORMAL CMD) |
| SECOND OPERATION | ○ | ○ | | ○ ↓ | ○ | · SECOND HOST IS CAPABLE OF TRANSMITTING DATA TO FIRST STORAGE UNIT, WITHOUT POWER SUPPLY TO FIRST WIRELESS STORAGE DEVICE<br>· DATA ARE AUTOMATICALLY TRANSMITTED FROM FIRST STORAGE UNIT TO NON-VOLATILE SEMICONDUCTOR MEMORY, DURING POWER SUPPLY TO FIRST WIRELESS STORAGE DEVICE (FIRST HOST CAN ACCESS BY NORMAL CMD) |
| THIRD OPERATION | ○ | | | ○ ↑ | ○ | · SECOND HOST IS CAPABLE OF ACQUIRING DATA FROM FIRST STORAGE UNIT, WITHOUT POWER SUPPLY TO FIRST WIRELESS STORAGE DEVICE |
| FOURTH OPERATION | ○ | | | ○ ↓ | ○ | · SECOND HOST IS CAPABLE OF TRANSMITTING DATA TO FIRST STORAGE UNIT, WITHOUT POWER SUPPLY TO FIRST WIRELESS STORAGE DEVICE |
| FIFTH OPERATION | ○ | ○ | | | ○ | · SECOND HOST IS CAPABLE OF ACQUIRING DATA FROM NON-VOLATILE SEMICONDUCTOR MEMORY WITHOUT LIMIT IN CAPACITY |
| SIXTH OPERATION | ○ | ○ | | | ○ | · SECOND HOST IS CAPABLE OF TRANSMITTING DATA TO NON-VOLATILE SEMICONDUCTOR MEMORY WITHOUT LIMIT IN CAPACITY |
| SEVENTH OPERATION | ○ | | | | ○ | · SECOND HOST IS CAPABLE OF EXCHANGING DATA WITH FIRST HOST WITHOUT LIMIT IN CAPACITY |

WIRELESS COMMUNICATION APPARATUS THAT DISPLAYS IMAGES ASSOCIATED WITH CONTENTS STORED IN AN EXTERNAL STORAGE DEVICE

CROSS-REFERENCE TO RELATED APPLICATIONS

This application is a continuation of U.S. patent application Ser. No. 15/061,987, filed on Mar. 4, 2016, which is based upon and claims the benefit of priority from Japanese Patent Application No. 2015-056982, filed Mar. 19, 2015 and Japanese Patent Application No. 2015-158339, filed Aug. 10, 2015; the entire contents of each of which are incorporated herein by reference.

FIELD

Embodiments described herein relate generally to a wireless communication apparatus that has a wireless antenna and displays images associated with contents stored in an external storage device.

BACKGROUND

Generally, an example of a storage device is a memory card such as a SD memory card.

DESCRIPTION OF THE DRAWINGS

FIG. 5 illustrates a data structure of data stored in the storage device according to the first application example.

FIG. 6 illustrates a data structure of data stored in the wireless communication apparatus according to the first application example.

FIG. 7 illustrates a modification example of the data structure of the data stored in the wireless communication apparatus according to the first application example.

FIG. 8 illustrates update of data stored in the storage device according to the first embodiment.

FIG. 12 illustrates a data structure of data stored in the storage device according to the second application example.

FIG. 13 illustrates a data structure of data stored in the wireless communication apparatus according to the second application example.

FIG. 32 illustrates a data structure of data stored in the wireless communication apparatus according to the ninth application example.

FIG. 40 illustrates a data structure of data stored in the storage device according to a fifth modification example of the ninth application example.

FIG. 63 is a table which summarizes features of the first through seventh operation examples of the second embodiment.

DETAILED DESCRIPTION

Figure 1:
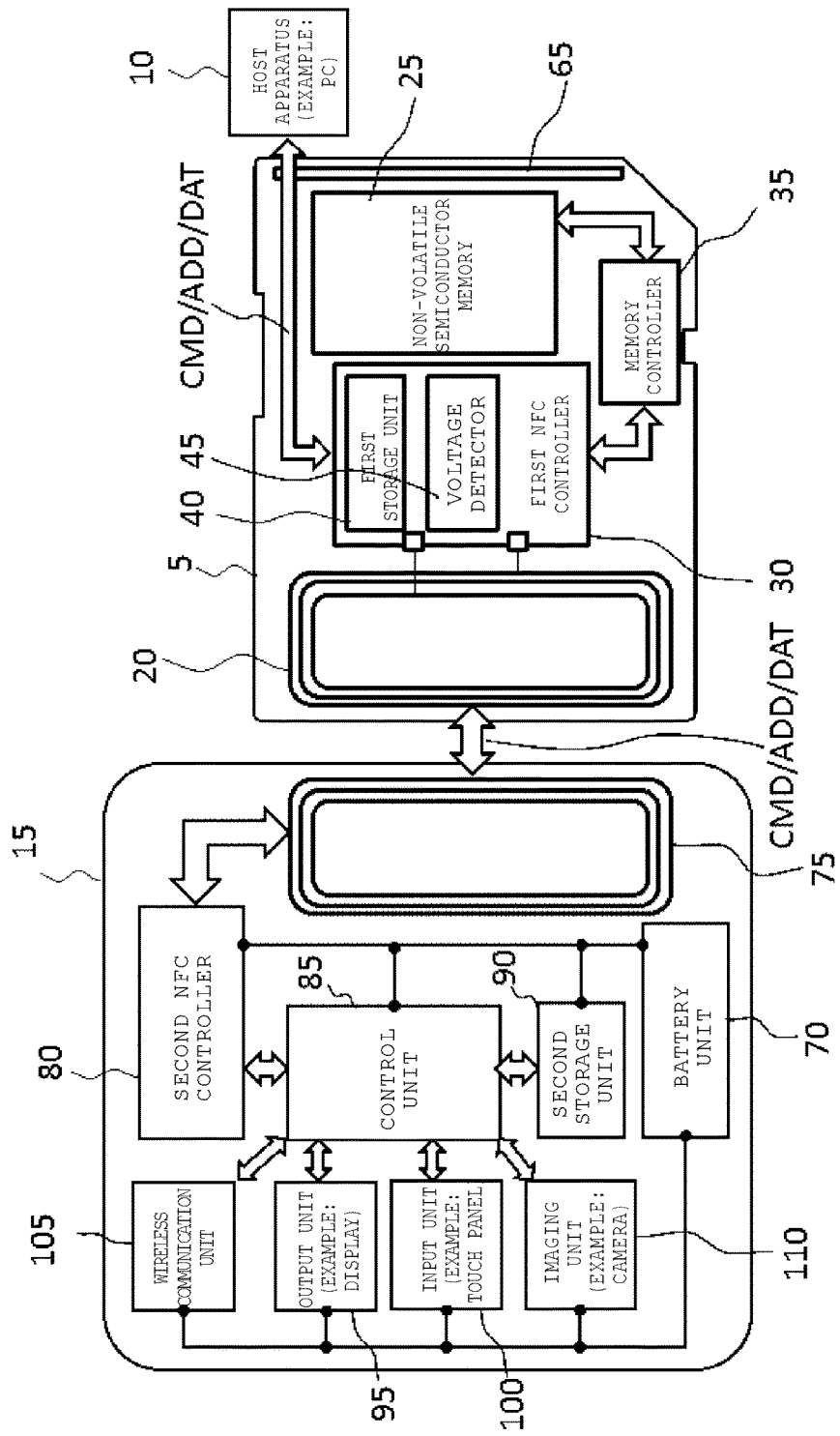
FIG. 1 is a block diagram illustrating a configuration of a storage device and a wireless communication apparatus according to a first embodiment.

One or more embodiments provide a wireless communication apparatus, a wireless communication apparatus control program, and a storage device, which can improve user convenience.

In general, according to an embodiment, a wireless communication apparatus includes a memory device in which data associated with a storage device are stored, wherein the data is acquired through a wireless communication; an image capturing device; a display; and a controller configured to: identify an external storage device corresponding to a code captured by the image capturing device, responsive to identification of the external storage device, generate a display image from the data stored in the memory device if the data stored in the memory device are associated with the identified external storage device, and control the display to display a display image, wherein the data stored in the memory device include thumbnail image data of image data stored in the external storage device, and the display image includes one or more thumbnail images that are generated from the thumbnail image data.

Hereinafter, embodiments will be described with reference to the drawings. In the following description, substantially the same functions and elements are denoted by the same reference numerals.

First Embodiment

FIG. 1 is a block diagram illustrating a configuration of a storage device (external storage device) 5 and a wireless communication apparatus 15 according to a first embodiment.

First, the storage device 5 will be described.

The storage device 5 is operated by power supplied from a host apparatus 10 which is electrically connected thereto. The storage device 5 has a data write and read function.

Further, the storage device 5 is also operable by power generated (induced) by electromagnetic induction of a first wireless antenna 20. For example, the storage device 5 performs communication conforming to a short-range wireless communication standard (near field communication: NFC) in a frequency of 13.56 MHz so as to be able to write and read data to the wireless communication apparatus 15. In other words, the storage device 5 is operable without power from the host apparatus 10.

The storage device 5 communicates data and commands with the host apparatus 10, according to, for example, an SD interface, but may use other interfaces. Further, the storage device 5 communicates data and commands with the wireless communication apparatus 15, according to, for example, an NFC interface, but may use other interfaces.

The storage device 5 includes the first wireless antenna 20, a non-volatile semiconductor memory 25, a first NFC controller 30, a memory controller 35, and a connection terminal 65.

The non-volatile semiconductor memory 25 is, for example, a NAND-type flash memory, but may be other non-volatile semiconductor memories such as a NOR-type flash memory, a magnetoresitive random access memory (MRAM), a phase change random access memory (PRAM), a resistive random access memory (ReRAM), and a ferroelectric random access memory (FeRAM).

The non-volatile semiconductor memory 25 is operated by power supplied from the host apparatus 10 to the storage device 5.

The memory controller 35 controls the non-volatile semiconductor memory 25. The memory controller 35 communicates the commands and data through the first NFC controller 30. In addition, the memory controller 35 may directly communicate with the host apparatus 10 through the connection terminal 65, without passing through the first NFC controller 30.

The memory controller 35 is operated with power supplied from the host apparatus 10. Meanwhile, when the storage device 5 receives power only from the first wireless antenna 20, the memory controller 35 may not operate.

When receiving a first write command CMD, an address ADD, and data DAT, the memory controller 35 writes data into the non-volatile semiconductor memory 25. Further, when receiving a first read command CMD and the address ADD, the memory controller 35 reads data from the non-volatile semiconductor memory 25 and outputs the data.

In addition, when writing data into the non-volatile semiconductor memory 25, the memory controller 35 may write the data into the first storage unit 40. Further, when reading data from the non-volatile semiconductor memory 25, the memory controller 35 may write the read data into the first storage unit 40.

The first wireless antenna 20 is, for example, a PCB pattern antenna. The operable frequency band of the first wireless antenna is set to a predetermined frequency band corresponding to NFC.

The first wireless antenna 20 can generate power caused by electromagnetic induction based on radio waves from the wireless communication apparatus 15. The first wireless antenna 20 supplies the generated power to the first NFC controller 30.

The first wireless antenna 20 receives the command CMD, the address ADD, and data from the wireless communication apparatus 15, and outputs them to the first NFC controller 30. The first wireless antenna 20 outputs the command CMD, the address ADD, and data, which are received from the first NFC controller 30, to the wireless communication apparatus 15.

Further, the first NFC controller 30 is operable by the power supplied from the first wireless antenna 20. In other words, if the first wireless antenna 20 receives radio waves of a predetermined frequency band corresponding to NFC, the first NFC controller 30 can operate. In other words, the storage device 5 is capable of performing NFC communication. In addition, the first NFC controller 30 is also operable by power supplied from the host apparatus 10.

The first NFC controller 30 includes the first storage unit 40 and a voltage detector 45. In addition, the first NFC controller 30 and the first storage unit 40 may be separately configured. The first NFC controller 30 and the memory controller 35 may be achieved as a single controller.

The first NFC controller 30 communicates the command CMD, the address ADD, and the data with the wireless communication apparatus 15, using the first wireless antenna 20. Further, the first NFC controller 30 communicates the command CMD, the address ADD, and the data DAT with the host apparatus 10 through the connection terminal 65. The first NFC controller 30 communicates the command CMD, the address ADD, and the data with the memory controller 35 as necessary.

When receiving the second read command CMD and the address ADD from the wireless communication apparatus 15 through the first wireless antenna 20, the first NFC controller 30 reads data from the first storage unit 40. The first NFC controller 30 outputs the read data, to the wireless communication apparatus 15 through the first wireless antenna 20.

When receiving a third read command CMD from the wireless communication apparatus 15 through the first wireless antenna 20, the first NFC controller 30 reads data in a predetermined region of the first storage unit 40. Then, the first NFC controller 30 outputs the read data, to the wireless communication apparatus 15, through the first wireless antenna 20. In other words, when receiving the third read command CMD, without receiving the address ADD, the first NFC controller 30 outputs the data in the predetermined region from the first storage unit 40. In addition, data in the entire region of the first storage unit 40 may be output. In addition, the second read command CMD and the third read command CMD may be a common command.

When receiving the second write command CMD, the address ADD, and the data from the wireless communication apparatus 15 through the first wireless antenna 20, the first NFC controller 30 writes data into the first storage unit 40.

When receiving a first read command CMD' and an address ADD' from the wireless communication apparatus 15 or the host apparatus 10, the first NFC controller 30 outputs the first read command CMD and the address ADD to the memory controller 35. The memory controller 35 reads data from the non-volatile semiconductor memory 25, and outputs the data to the first NFC controller 30. Then, the first NFC controller 30 outputs the read data to the wireless communication apparatus 15 or the host apparatus 10. In addition, if the first read command CMD' and the first read command CMD are commands recognizable by the memory controller 35, any one may be used. If the address ADD and the address ADD' are recognizable by the memory controller 35, any one may be used.

When receiving the first write command CMD', the address ADD', and the data from the wireless communication apparatus 15 or the host apparatus 10, the first NFC controller 30 outputs the first write command CMD, the address ADD, and the data to the memory controller 35. The memory controller 35 writes the data into the non-volatile semiconductor memory 25. In addition, similar to the first read commands CMD' and CMD, if the first write commands CMD' and CMD are recognizable by the memory controller 35, any one may be used.

In addition, the first NFC controller 30 may directly write data into the non-volatile semiconductor memory 25. Further, the first NFC controller 30 may directly receive data from the non-volatile semiconductor memory 25.

In addition, when the first NFC controller 30 and the memory controller 35 communicate the command CMD', the address ADD', and the data, the first NFC controller 30 or the memory controller 35 may write some portion of the data, data obtained by converting the data, or the like into the first storage unit 40.

When receiving a related data generation command from the host apparatus 10 or the wireless communication apparatus 15, the first NFC controller 30 may generate related data by reading the data that are written into the non-volatile semiconductor memory 25, and may write the related data into the first storage unit 40.

The first storage unit 40 is, for example, a non-volatile memory. The first storage unit 40 stores data in response to the control by the first NFC controller 30 or the memory controller 35. In addition, the first storage unit 40 may temporarily store data. For example, an electrically erasable programmable read-only memory (EEPROM) is used as the first storage unit 40, but it is possible to use various memories similar to the non-volatile semiconductor memory 25.

In addition, since the first storage unit is operable by power supplied from the first wireless antenna 20, it is desirable that power consumption per capacity of the first storage unit 40 is lower than the power consumption of the non-volatile semiconductor memory 25.

Examples of the data stored in the first storage unit 40 include the related data of the storage device 5 (data related to data stored in the non-volatile semiconductor memory 25 (for example, various data such as image data, text data, presentation data, and table calculation data, and file information thereof), or data about the non-volatile semiconductor memory 25 and the storage device 5), or data related to the wireless communication apparatus 15.

Specifically, examples of the data related to image data stored in the non-volatile semiconductor memory 25 include file name data, the first or the last portion of image data, or thumbnail image data of image data, file generation time data, imaging time data, data ID, or the like. The data related to the non-volatile semiconductor memory 25 is data of a memory capacity of the non-volatile semiconductor memory 25, data of a remaining capacity, data of the number of stored files, or the like. The data about the storage device 5 is recognition ID data (the number for identification that is arbitrarily assigned to each storage device 5, for example, a specific product ID that is assigned during production, an ID that is arbitrarily assigned to each storage device 5 after production, or the like), comments (text data related to the storage device 5 that the user stores in the storage device 5 through the host apparatus 10, the wireless communication apparatus 15, or the like)), or the like. The data related to the wireless communication apparatus 15 is the recognition ID data of the wireless communication apparatus 15, or the like.

The voltage detector 45 is electrically connected to the first wireless antenna 20. The voltage detector 45 detects a voltage that is supplied from the first wireless antenna 20 to the first NFC controller 30. Then, the voltage detector 45 outputs a reset command of NFC communication until the first NFC controller 30 reaches a predetermined operable voltage. The first NFC controller 30 does not perform NFC communication during when the first NFC controller 30 receiving the reset command. The reset command can prevents abnormal start-up and operation in the communication by NFC. The voltage detector 45 may output an operable command to the first NFC controller when the first NFC controller 30 reaches the predetermined operable voltage. The first NFC controller 30 performs NFC communication only for a period in which first NFC controller 30 receives the operable command.

The connection terminal 65 is, for example, a standardized connection terminal, and is connectable to the host apparatus 10.

The host apparatus 10 is, for example, an information communication device such as a personal computer (PC) and a personal data assistance (PDA). The host apparatus 10 is connectable to the storage device 5, through the connection terminal 65. Further, the host apparatus 10 is capable of supplying power to the storage device 5, through the connection terminal 65. Further, the host apparatus 10 is connectable to the server. For example, the host apparatus 10 is connectable to the server, through other information communication devices or networks.

Various operations of the storage device 5 according to the present embodiment are described in, for example, U.S. patent application Ser. No. 14/477,200 titled "Memory card equipped with radio antenna," entire contents of which are incorporated herein by reference.

The wireless communication apparatus 15 will be described.

The wireless communication apparatus 15 is, for example, an apparatus with a wireless communication function such as a smartphone, a PDA, and a tablet terminal.

The wireless communication apparatus 15 includes a battery unit 70, a second wireless antenna 75, a second NFC controller 80, a control unit 85, a second storage unit 90, a display unit 95, an input unit 100, a wireless communication unit 105, and an image capturing unit 110. In addition, the second NFC controller 80 and the control unit 85 may be achieved by a single controller.

The wireless communication apparatus 15 can operate and communicate by power supplied from the battery unit 70.

The wireless communication apparatus 15 communicates data with the storage device 5, for example, with the NFC interface, but may use other wireless communication interfaces.

The battery unit 70 is a power source that provides power to the wireless communication apparatus 15. The battery unit 70 is, for example, a battery. The battery unit 70 may be dry cells, storage cells, fuel cells, or the like. More specifically, the battery unit 70 may use a lithium-ion battery or the like. The battery unit 70 may be an external unit of the wireless communication apparatus 15, and for example, an AC adaptor or the like connected to a commercial power source.

The operable frequency band of the second wireless antenna 75 is set to a predetermined frequency band corresponding to NFC.

The second wireless antenna 75 receives data from the storage device 5, and outputs the received data to the second NFC controller 80. The second wireless antenna 75 outputs the command CMD, the address ADD, and data, which are received from the second NFC controller 80 to the storage device 5. The second wireless antenna 75 is, for example, a PCB pattern antenna.

The second NFC controller 80 controls the second wireless antenna 75.

The second NFC controller 80 outputs the read command CMD and the address ADD which are received from the control unit 85, to the storage device 5, through the second wireless antenna 75, when reading data from the storage device 5. The second NFC controller 80 outputs the data received from the storage device 5 to the control unit 85.

The second NFC controller 80 outputs the command CMD, the address ADD and data which are received from the control unit 85, to the storage device 5, through the second wireless antenna 75, when writing data into the storage device 5.

The control unit 85 controls various operations of each element, based on inputs from, for example, the input unit 100, the wireless communication unit 105, the image capturing unit 110, and the storage device 5. The control unit 85 controls each unit, based on input data or a calculation result of the data, and outputs a command or the like to each unit as necessary. Here, a control method based on the data calculation result will be described below.

The control unit 85 is, for example, a semiconductor chip, a circuit formed on a substrate, or a single or a plurality of combinations thereof. In addition, the control unit 85 may include a so-called cache memory or a register which temporarily stores data.

The control unit 85 outputs the read command CMD and the address ADD to the storage device 5 through the second wireless antenna 75 and the second NFC controller 80, when reading data from the storage device 5. The control unit 85 receives data read from the storage device 5, through the second wireless antenna 75 and the second NFC controller 80.

The control unit 85 outputs data received from each unit or a calculation result of the data, the write command CMD, and the address ADD to the second NFC controller 80, when writing data into the storage device 5.

The control unit 85 is electrically connected to each unit, and electrically communicates with each unit. In other words, the control unit 85 is capable of receiving data from each unit and outputting the data or a calculation result of the data. For example, the control unit 85 can calculate (generate) composite image data obtained by highlighting the imaging data captured by image capturing unit, and can output the composite image data to the display unit 95. For example, the control unit 85 can calculate (generate) composite image data, based on the imaged data read from the second storage unit 90, and can output the composite image data to the display unit 95. These are an example, and the control unit 85 can receive data from each unit, and can output the calculation result of the data.

The second storage unit 90 outputs the stored data to the control unit 85, based on communication with the control unit 85, and stores data received from the control unit 85.

The second storage unit 90 is, for example, a memory controller and a non-volatile memory. The non-volatile memory may be various non-volatile memories, which are described above as examples of the non-volatile semiconductor memory 25. The memory controller controls the non-volatile memory. The second storage unit 90 may be, for example, a hard disk drive (HDD), a solid state disk (SSD), or the like.

The display unit 95 outputs data received from the control unit 85, in a format that the user can recognize.

The display unit 95 is, for example, a display. The user can visually recognize the display on the display. Specifically, various displays such as a liquid crystal display, a plasma display, an organic EL display, and a three-dimensional display may be used for the display unit 95. The display unit 95 displays the data received from the control unit 85 on the display. The display unit 95 is capable of displaying, for example, an image and moving image data which are currently captured by the image capturing unit 110.

The input unit 100 outputs the input by the user as input data, to the control unit 85.

The input unit 100 is, for example, a touch panel provided on the display. When the user touches the display, the input unit 100 detects the pressed position on the touch panel, and outputs the position information as input data to the control unit 85. Specifically, switches arranged in a matrix configuration, and various touch panels of a resistance film type, a surface acoustic wave type, an infrared type, an electromagnetic induction type, an electrostatic capacitance type, or the like may be used for the input unit 100.

The input unit 100 may be, for example, a microphone. When the user makes a sound, the input unit 100 may detect the sound, extract input data through sound conversion, and output the input data to the control unit 85.

The wireless communication unit 105 includes a wireless antenna and a wireless controller. The wireless communication unit 105 communicates data by wireless communication with the outside. The wireless communication unit 105 outputs the data received from the outside to the control unit 85. The wireless communication unit 105 transmits the data received from the control unit 85 to the outside.

The image capturing unit 110 is capable of capturing still images, moving images, or both of them. The image capturing unit 110 outputs imaging data (first image data), in other words, still image or moving image data, to the control unit 85. In addition, the capturing of an image herein does not necessarily include storing the captured data. For example, simply detecting or capturing a subject is also included in the capturing of an image herein.

Figure 2A:
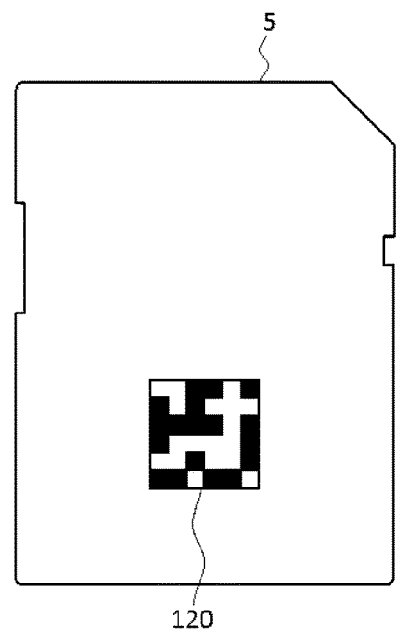
FIG. 2A is a front plan view of the storage device according to the first embodiment.
Figure 2B:
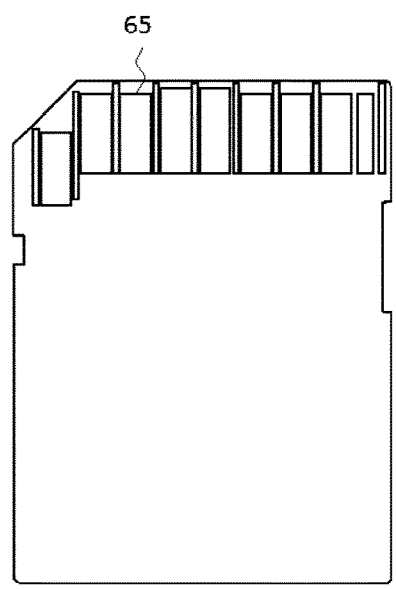
FIG. 2B is a rear plan view of the storage device according to the first embodiment.

The image capturing unit 110 is capable of capturing the code 120 that is disposed on the front surface of the storage device 5 illustrated in FIGS. 2A and 2B.

The image capturing unit 110 is, for example, a camera. More specifically, the image capturing unit 110 is, for example, a camera using a solid-state imaging element, a charge coupled device (CCD) sensor, or a complementary metaloxide semiconductor (CMOS) sensor.

FIGS. 2A and 2B are schematic plan views of the front surface and the back surface of the storage device 5.

As illustrated in FIG. 2A, the storage device 5 includes a code 120 on the front surface (a front surface of a housing).

The code 120 can be detected through an image of the code 120 captured by the image capturing unit 110 of the wireless communication apparatus 15.

The code 120 is, for example, a two-dimensional code with information in a two-dimension of a vertical direction and a horizontal direction. The code 120 is, for example, a two-dimensional matrix code with black and white dots, as illustrated in FIG. 2A. The code 120 may be a stack code, or a one-dimensional bar code. Further, the code 120 may conform to the shape of the character.

The code 120 is, for example, a seal-like, and may be adhered after the user purchases or during manufacture. The code 120 may be arranged on the casing of the storage device 5, directly, through printing, or the like. Further, the code 120 may also be arranged on both the front surface and the back surface of the storage device 5.

The code 120 includes, for example, information (first information) on the recognition ID of the storage device 5. In other words, first information such as the recognition ID is displayed on the outer surface of the storage device 5.

As illustrated in FIG. 2B, the storage device 5 includes a plurality of connection terminals 65 on the back surface side thereof. The plurality of connection terminals 65 are arranged along an end side of the storage device 5.

First Application Example

Figure 3:
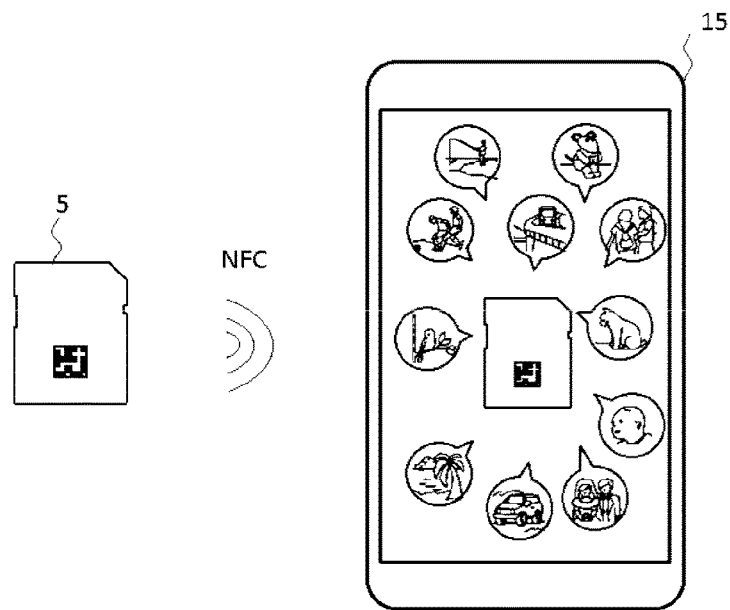
FIG. 3 illustrates a first application example of the storage device and the wireless communication apparatus according to the first embodiment.

FIG. 3 illustrates a first application example of the present embodiment.

As illustrated in FIG. 3, if the storage device 5 is located close to the wireless communication apparatus 15, the wireless communication apparatus 15 displays the related data of the storage device 5. For example, the wireless communication apparatus 15 displays imaged data included in thumbnail data of the image data stored in the storage device 5 (thumbnail image data, imaging time data, or the like of the image data stored in the storage device 5). In addition, the imaging time data indicates a time when the image data were captured.

Figure 4:
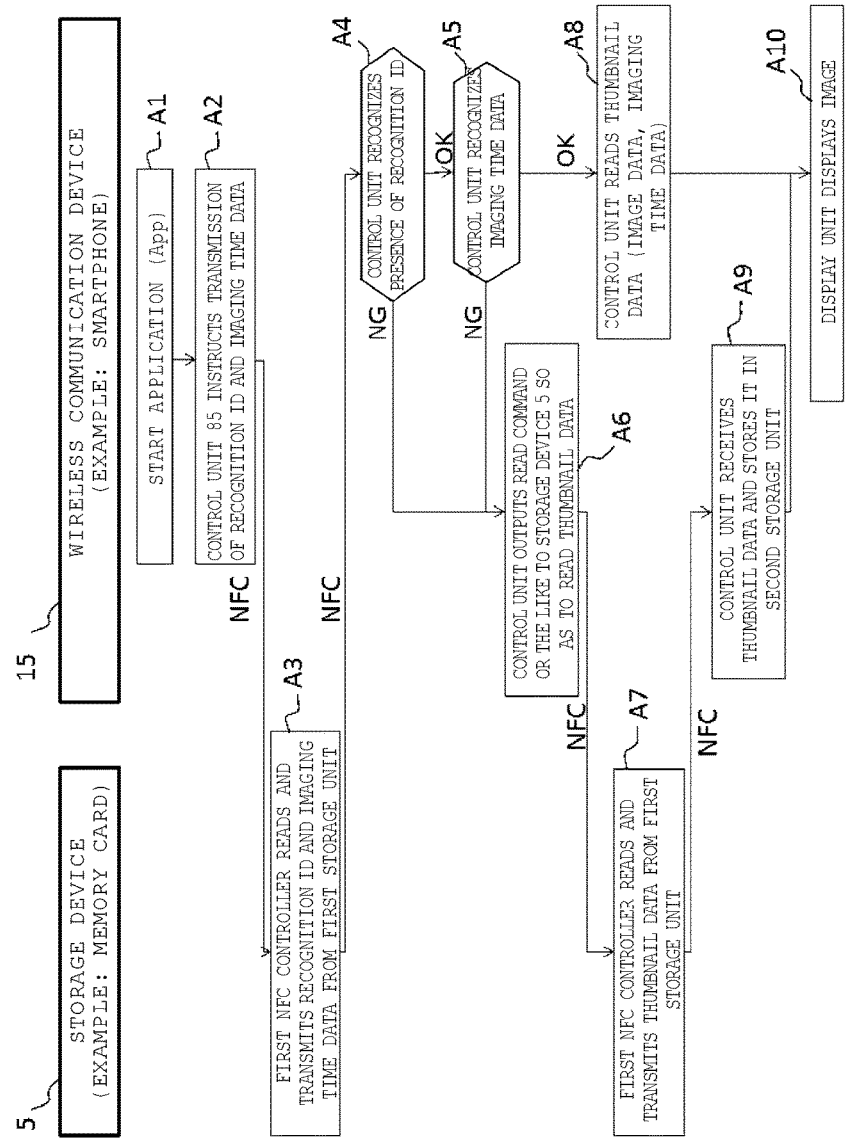
FIG. 4 is a flowchart illustrating a process of the first application example of the first embodiment.

FIG. 4 is a flowchart illustrating the first application example.

In addition, in the following description, the first wireless antenna 20, the second wireless antenna 75, and the second NFC controller 80 are not described, in a description regarding NFC communication between the first NFC controller 30 of the storage device 5 and the control unit 85 of the wireless communication apparatus 15.

In step A1, the user starts an application (App) of the wireless communication apparatus 15. The App controls the operation of the control unit 85 so as to cause the wireless communication apparatus 15 to be in a state capable of communicating with the storage device 5. The App controls the operation of the wireless communication apparatus 15 through the following steps A1 to A8.

In addition, the App may be automatically started in accordance with a predetermined rule. For example, the user may set the App to be automatically started at the same time when the wireless communication apparatus 15 is started, or the App to be started as a portion of the operating system (OS). Further, the App may be automatically started, when the wireless communication apparatus 15 detects the storage device 5, for example, when the image capturing unit 110 captures an image of the storage device 5.

In step A2, the control unit 85 of the wireless communication apparatus 15 transmits a second read command CMD or a third read command CMD to the storage device 5 through NFC so as to transmit the recognition ID and the imaging time data of the storage device 5. In addition, the control unit 85 may also transmit an address ADD if necessary.

In step A3, the first NFC controller 30 of the storage device 5 receives the read command CMD. The first NFC controller 30 reads the recognition ID and the imaging time data from the first storage unit 40. The first NFC controller 30 transmits the read data to the wireless communication apparatus 15 through NFC. In addition, the imaging time data may be one unit of data or a plurality of units of data, each of which corresponds to one of stored images.

In step A4, the control unit 85 of the wireless communication apparatus 15 receives the recognition ID and the imaging time data. The control unit 85 reads the stored recognition ID from the second storage unit 90. The control unit 85 compares the received recognition ID of the storage device 5 with the stored recognition ID. When the control unit 85 determines that the two recognition IDs match (OK in step A4), the control unit 85 performs step A5. When the control unit 85 determines that the two recognition IDs do not match (NO in step A4), the control unit 85 performs step A6.

In addition, the case where a result of step A4 is OK includes, for example, the case where the related data of the storage device 5 have been previously stored in the wireless communication apparatus 15 in the first application example, and the case where the related data of the storage device 5 are stored in the wireless communication apparatus 15 in the application examples to be described below.

In step A5, the control unit 85 of the wireless communication apparatus 15 reads the thumbnail data about the recognition ID from the second storage unit 90. The control unit 85 compares the imaging time data received from the storage device 5 with the imaging time data included in the stored thumbnail data (thumbnail image data, imaging time data, and the like). When the control unit 85 determines that both units of imaging time data match (OK in step A5), the control unit 85 performs step A8. When the control unit 85 determines that both units of imaging time data do not match (NO in step A5), the control unit 85 performs step A6.

In addition, when there is a plurality of units of imaging time data, even if all units of imaging time data do not match, the determination of step A5 may be set as OK. For example, if the predetermined number of units of imaging time data match, the determination of step A5 may be set as OK. The predetermined number may be set previously, or may be set by the user.

In step A6, the control unit 85 of the wireless communication apparatus 15 transmits the second read command CMD or the third read command CMD to the storage device 5 through NFC, so as to transmit thumbnail data of the storage device 5.

In step A7, the first NFC controller 30 of the storage device 5 receives the read command CMD. The first NFC controller 30 reads thumbnail data from the first storage unit 40. The first NFC controller 30 transmits the thumbnail data to the wireless communication apparatus 15 through the first wireless antenna 20, through NFC.

In step A8, the control unit 85 of the wireless communication apparatus 15 reads the image data of the thumbnail data from the second storage unit 90. In addition, the control unit 85 may read the image data of the thumbnail data in step A4 or step A5.

In step A9, the control unit 85 of the wireless communication apparatus 15 receives the thumbnail data from the storage device 5. The control unit 85 stores the received thumbnail data in the second storage unit 90.

In step A10, the control unit 85 of the wireless communication apparatus 15 outputs the thumbnail data received from the storage device 5, image data read from the second storage unit 90, or image data of a composite image using the image data, to the display unit 95. The display unit 95 displays the input image data.

FIG. 3 illustrates a screen displaying a composite image in which each unit of thumbnail data is arranged around the image of the storage device 5, as an example. Each image of the thumbnail data is trimmed, for example, in a circle, and a circular frame is attached. In addition, the shape of the image and the shape of the frame are not limited to the circle, and needless to say, may be a square or any shape.

FIG. 5 schematically illustrates an example of a data structure of thumbnail data stored in the first storage unit of the storage device 5. In addition, the wireless communication apparatus 15 may include a unit that displays the data table on the display unit 95.

The storage method stores one unit of thumbnail data for one recognition ID. In other words, one unit of image data and one unit of imaging time data are stored for one recognition ID. In addition, this example includes the recognition ID for ease of understanding, but the data ID may not be necessarily required. For example, in the case of managing the data using a stored address, or the like, the recognition ID is not required.

FIG. 6 schematically illustrates an example of a data structure of thumbnail data stored in the second storage unit of the wireless communication apparatus 15 and the recognition ID of the storage device 5. The storage method stores one unit of thumbnail data for the recognition ID and one unit of data ID.

FIG. 7 schematically illustrates another example of a data structure of thumbnail data stored in the second storage unit 90 of the wireless communication apparatus 15. In FIG. 7, data ID is omitted, differently from the storage method in FIG. 6. A plurality of units of thumbnail data is stored for one recognition ID.

FIG. 8 schematically illustrates an example of an update of thumbnail data stored in the storage device 5 (first storage unit 40). A left table represents a list of thumbnail data before the update, and a right table represents a list of thumbnail data after the update.

When storing new data, the first NFC controller 30 of the storage device 5 may overwrite the thumbnail data of the data ID having the oldest capture time. In other words, in the left table, the oldest thumbnail data are the thumbnail data of the data ID 10. Thus, when storing new thumbnail data, the data of the data ID 10 are overwritten and stored in the first storage unit 40.

Figure 9:
FIG. 9 illustrating update of data stored in the wireless communication apparatus according to the first application example.

FIG. 9 schematically illustrates an example of an update method of thumbnail data about the wireless communication apparatus 15 (the second storage unit 90). A left table represents a list of thumbnail data before update, and a right table represents a list of thumbnail data after update.

When storing new data, the control unit 85 of the wireless communication apparatus 15 may overwrite the thumbnail data of the data ID having the oldest capture time in the second storage unit 90. In other words, in the left table, the oldest thumbnail data are the thumbnail data of the data ID 10. Thus, when storing new thumbnail data, the data of the data ID 10 are overwritten and stored in the second storage unit 90. The update method illustrated in FIG. 9 can be used for storing the thumbnail data in step A8 in FIG. 4.

Advantage of First Application Example

According to the present embodiment, the wireless communication apparatus 15 can display the contents of the storage device 5 by moving the storage device 5 close to the wireless communication apparatus 15. In other words, the user can recognize the contents of the storage device 5, without physically connecting the storage device 5 to the wireless communication apparatus 15 through a cable or the like. As a result, user convenience can be significantly improved, without effort to prepare a new cable and effort to physically connect the storage device 5.

Modification Example of First Application Example

The thumbnail data may include the image data ID, instead of the imaging time data. The image data ID are allocated specifically to the image data, and are for example, an identifiable number or the like from other units of image data.

Second Application Example

Figure 10:
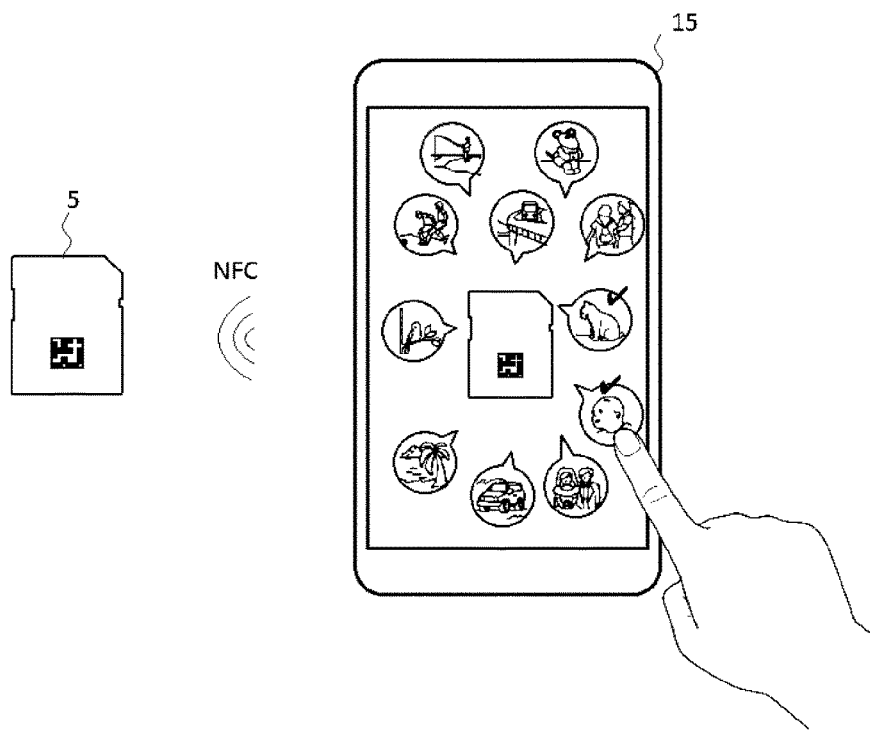
FIG. 10 illustrates a second application example of the storage device and the wireless communication apparatus according to the first application example.

FIG. 10 illustrates a second application example of the present embodiment.

In the second application example, the user selects one or a plurality of images from the images displayed on the wireless communication apparatus 15. As illustrated in FIG. 10, a check mark is denoted in each of selected thumbnail image. The wireless communication apparatus 15 notifies the storage device 5 that certain thumbnail images are selected. The storage device 5 receives the notification, and stores flag data corresponding to the selected thumbnail images, for example, in the first storage unit 40.

Figure 11:
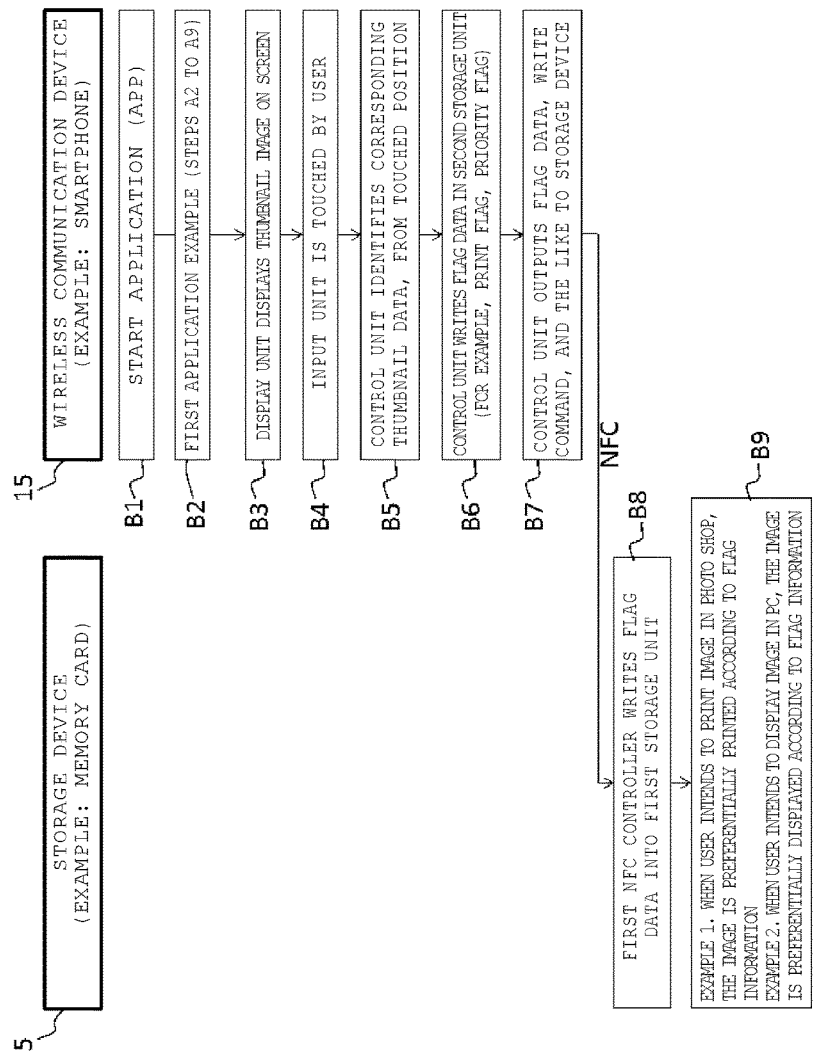
FIG. 11 is a flowchart illustrating a process of the second application example.

FIG. 11 is a flowchart illustrating the second application example.

In step B1, the user starts the App of the wireless communication apparatus 15. The App causes the wireless communication apparatus 15 to be in a state capable of communicating with the storage device 5. The App controls the operation of the wireless communication apparatus 15 in steps B1 to B9.

In steps B2 and B3, the control unit 85 displays the thumbnail images of image data in the storage device 5 on the display unit 95 of the wireless communication apparatus 15, for example, in the same manner as the first application example.

In step B4, the user selects a portion or all of the thumbnail image displayed on the display unit 95. The user presses a touch panel, which is the input unit 100, with the finger or a touch pen, for example, corresponding to the selected thumbnail image. The touch panel, which is the input unit 100, outputs information on the pressed position to the control unit 85.

In step B5, the control unit 85 identifies the selected thumbnail data corresponding to the selected thumbnail image, based on the information on the touched position of the touch panel. The control unit 85 outputs data of an image in which the selected thumbnail image is highlighted, to the display unit 95. The display unit 95 displays an image corresponding to the image data received from the control unit 85. In FIG. 10, the display unit 95 displays the image in which a check mark is added to the selected thumbnail images.

In step B6, the control unit 85 writes flag data corresponding to the selected thumbnail data of the second storage unit 90.

In step B7, the control unit 85 outputs a write command CMD, an address ADD, and data including at least flag data to the storage device 5 through NFC.

In step B8, the first NFC controller 30 of the storage device 5 receives the write command CMD, the address ADD, and the data including at least flag data. The first NFC controller 30 writes the at least input flag data into the first storage unit 40.

In step B9, the user can preferentially perform for example, the following processes, based on the flag data of the image data of the storage device 5.

As an example, when the user brings the storage device 5 to a photo shop (print shop) and displays a list of image data units to select an image to be printed, in order to print the image, the image data including flag data are displayed as a print target. Further, as another example, when the user connects the storage device 5 to a terminal capable of displaying image data, such as a PC or a tablet, the image data including flag data are displayed at the beginning of the image list. Alternatively, images corresponding to the image data including the flag data are displayed in a slideshow.

FIG. 12 schematically illustrates an example of a data structure of thumbnail data stored in the second storage unit 90 of the wireless communication apparatus 15, including the recognition ID of the storage device 5 and the flag data. The flag data include, for example, a print flag and a priority flag. It is possible to separately store the print flag and the priority flag for a single unit of image data.

FIG. 13 schematically illustrates an example of a data structure of thumbnail data stored in the first storage unit 40 of the storage device 5, which include the flag data.

Advantage of Second Application Example

According to the second application example, the user can set a flag in the thumbnail data of the storage device 5, using the wireless communication apparatus 15. Setting the flag enables a change in an order of printing or displaying of the storage device 5. As a result, user convenience can be improved.

Modification Example of Second Application Example

FIG. 14 illustrates a modification example of the second application example.

Figure 14A:
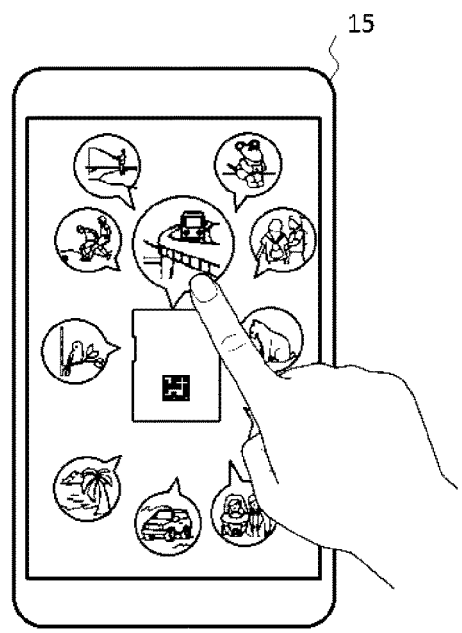
FIGS. 14 A and B illustrate modification examples of the second application example according to the first embodiment.

In the modification example in FIG. 14A, the selected thumbnail images are enlarged. Since the selected thumbnail images are displayed larger than other thumbnail images, the user can confirm the selection.

Figure 14B:
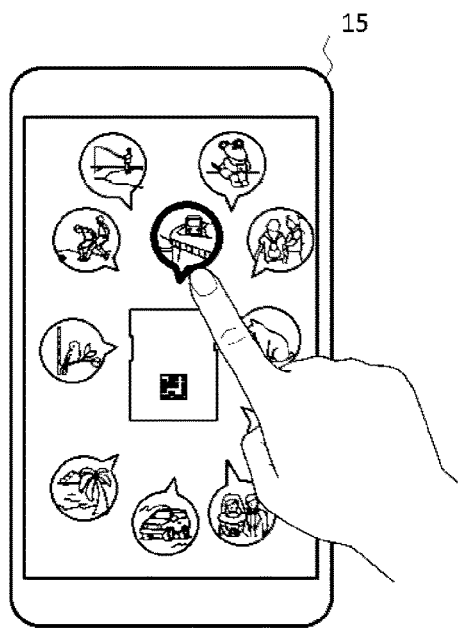

In the modification example in FIG. 14B, the contour of the selected thumbnail images are highlighted. Alternatively, the color of the contour may be changed. Thus, the user can very easily confirm his or her own selection.

Thus, according to the modification example of the second application example, it is possible to use any emphasis manner. For example, the selected thumbnail images may be displayed in a square different from the surrounding. Since the selected thumbnail images are displayed in a shape different from the surrounding, the users can easily visually recognize the selected thumbnail images.

Third Application Example

Figure 15:
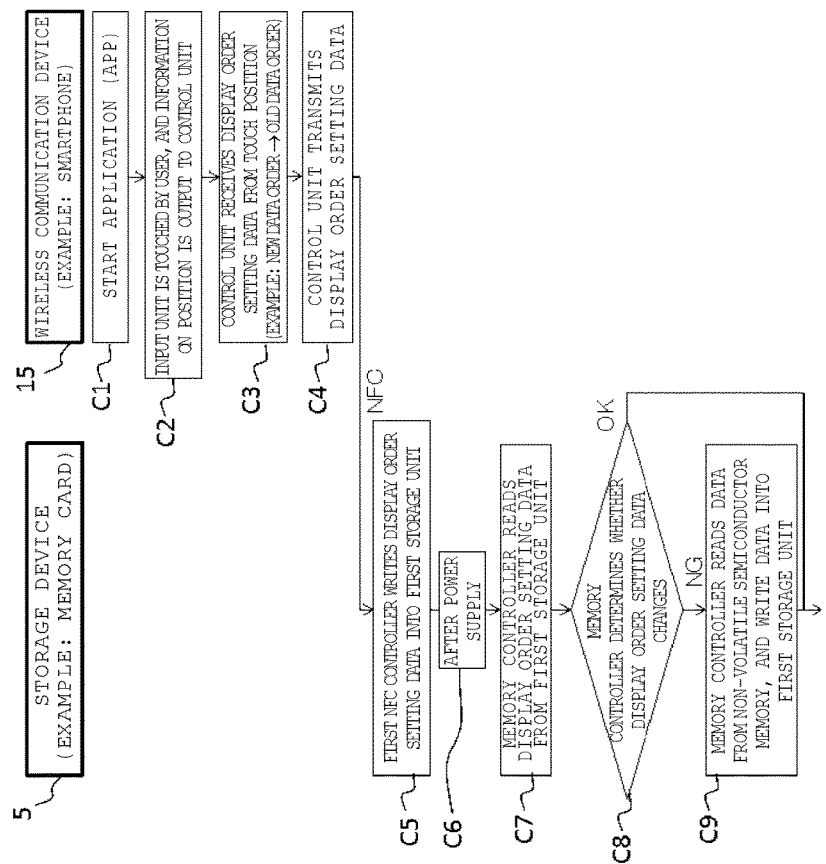
FIG. 15 is a flowchart illustrating a process of a third application example according to the first embodiment.

FIG. 15 is a flowchart illustrating a third application example of the present embodiment.

In the third application example, the user can change the thumbnail data displayed on the storage device 5 through the wireless communication apparatus 15.

In step C1, the user starts the App of the wireless communication apparatus 15. The App causes the wireless communication apparatus 15 to be in a state capable of communicating with the storage device 5. The App controls the operation of the wireless communication apparatus 15 in steps C1 to C9.

In step C2, the display unit 95 of the wireless communication apparatus 15 displays a setting data change screen for the display order of the storage device 5. The user selects the setting of any display order, through the setting data change screen of the display order. Specifically, the user touches the touch panel which is the input unit 100, for example, with the finger or the touch pen, corresponding to the setting of the display order that the user wants to select. The touch panel which is the input unit 100 outputs the information on the pressed position to the control unit 85.

Figure 16:
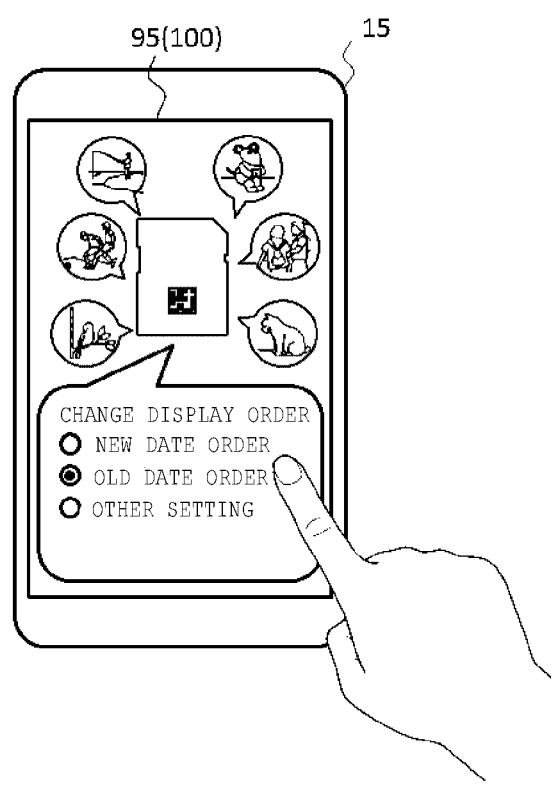
FIG. 16 illustrates a display screen of the wireless communication apparatus according to the third application example.

FIG. 16 is an example of the setting data change screen for the display order in step C2. As an example, the user selects any one of (1) a new date order, (2) an old date order, and (3) other settings.

In step C3, the control unit 85 identifies the display order setting data corresponding to the selection, from information on the position which is input from the touch panel.

In step C4, the control unit 85 outputs a write command CMD, an address ADD, and data including at least display order setting data, to the storage device 5 through NFC. In addition, it is also possible to use another write command CMD different from the normal command CMD for the write command CMD in this step.

In step C5, the first NFC controller 30 receives the write command CMD, the address ADD, and the data including at least display order setting data. The first NFC controller 30 writes the display order setting data into the first storage unit 40.

In step C6, the storage device 5 is on standby until power is supplied from the host apparatus 10.

In step C7, after power has been supplied from the host apparatus 10, the memory controller 35 reads the display order setting data from the first storage unit 40.

In step C8, the memory controller 35 compares the read display order setting data with the old read display order setting data stored in the non-volatile semiconductor memory 25 or the first storage unit 40.

When the old setting data and new setting data match, the update of the thumbnail data stored in the first storage unit 40 is not performed (OK in step C8). Meanwhile, when the old setting data and new setting data do not match, the process flow proceeds to step C9 (NG in step C8).

In step C9, the memory controller 35 writes thumbnail data into the first storage unit 40, based on the new setting data. In addition, the memory controller 35 may write the data stored in the non-volatile semiconductor memory 25, or may write a calculation result of the data stored in the non-volatile semiconductor memory 25.

Advantage of Third Application Example

According to the third application example, the user can change the contents of the thumbnail data of the storage device 5 to any contents that the user desires, using the wireless communication apparatus 15. It is possible to improve the user interface associated with the change of the displayed thumbnail data. Further, since the wireless communication apparatus 15 includes an output unit, for example, a display, the user can change the display order setting data, with the good operability.

Modification Example of Third Application Example

The example is described in which the memory controller 35 directly writes data into the first storage unit 40 in step C9 of the above description, but the example is not limited thereto. In other words, the memory controller 35 may write data into the first storage unit 40 through the first NFC controller 30.

Further, the memory controller 35 compares the old setting data with the new setting data in steps C6 to C8 in the above description. In the modification example, the first NFC controller 30 can perform comparison, without the power from the host apparatus 10. In addition, even in the modification example, the rewriting of thumbnail data of the first storage unit 40 in step C9 is performed after power is supplied to the storage device 5.

Fourth Application Example

Figure 17:
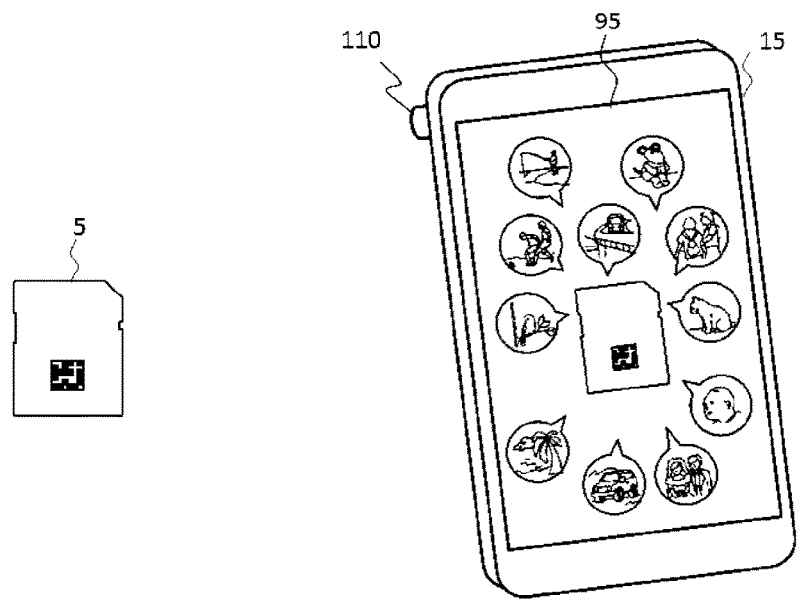
FIG. 17 illustrates a display screen of the wireless communication apparatus according to a fourth application example of the first embodiment.

FIG. 17 illustrates a fourth application example of the present embodiment.

As illustrated in FIG. 17, when the storage device 5 comes into an image capturing field of view of the image capturing unit 110 of the wireless communication apparatus 15, the images corresponding to the thumbnail data of the storage device 5 are displayed on the wireless communication apparatus 15.

Figure 18:
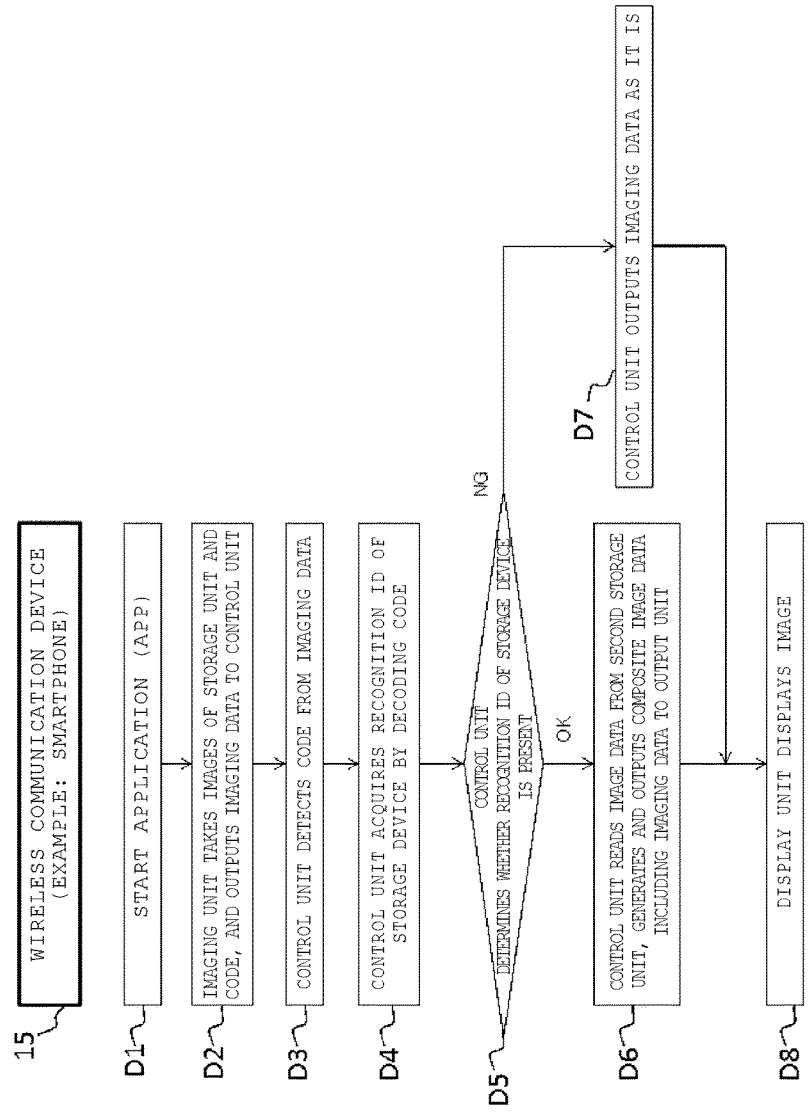
FIG. 18 is a flowchart illustrating a process of the fourth application example according to the first embodiment.

FIG. 18 is a flowchart illustrating a fourth application example.

In step D1, the user starts an App of the wireless communication apparatus 15. The App causes the image capturing unit 110 of the wireless communication apparatus 15 to be in a state capable of capturing an image. The App controls the operation of steps D1 to D8 of the wireless communication apparatus 15.

In step D2, the image capturing unit 110 captures an image of the storage device 5, including the code 120 disposed on the storage device 5, operated by the user. The image capturing unit 110 outputs imaging data (first image data) to the control unit 85.

In step D3, the control unit 85 of the wireless communication apparatus 15 detects the code 120 from the imaging data.

In step D4, the control unit 85 of the wireless communication apparatus 15 acquires information included in the code 120, through decoding (extraction) from the code 120. The information included in the code 120 is, for example, a recognition ID of the storage device 5.

In step D5, the control unit 85 of the wireless communication apparatus 15 reads the stored recognition ID from the second storage unit 90. Thereafter, the control unit 85 compares the recognition ID that has been already stored with the recognition ID obtained by decoding.

When the control unit 85 determines that both recognition IDs match (OK in step D5), the control unit 85 performs step D6. When the control unit 85 determines that both recognition IDs do not match (NO in step D5), the control unit 85 performs step D7.

In addition, examples of the case where a result of step D5 is OK include the case where the related data of the storage device 5 have been previously stored in the wireless communication apparatus 15 in the fourth application example, and the case where the related data of the storage device 5 are stored in the wireless communication apparatus 15 in the application examples to be described below.

In step D6, the control unit 85 of the wireless communication apparatus 15 reads image data included in the thumbnail data regarding the recognition IDs which match each other, from the second storage unit 90. The control unit 85 generates composite image data in which the image data obtained from the image capturing unit 110 and the read image data are combined. The control unit 85 outputs the composite image data to the display unit 95.

In step D7, the control unit 85 of the wireless communication apparatus 15 outputs the composite imaging data obtained from the image capturing unit 110, to the display unit 95.

In step D8, the display unit 95 of the wireless communication apparatus 15 displays an image of the image data or the composite image data which are input.

Advantage of Fourth Application Example

According to the application example, the user can confirm image data stored in the storage device 5 from a longer distance within the image capturing range.

First Modification Example of Fourth Application Example

In step D7 of the above description, the control unit 85 of the wireless communication apparatus 15 outputs the imaging data of the image capturing unit 110 to the display unit 95 as it is. As the modification example, for example, the control unit 85 may generate composite image data in which image data indicating that information on the storage device 5 is not stored in the wireless communication apparatus 15 and the imaging data acquired by the image capturing unit 110 are combined. The control unit 85 outputs the composite image data to the display unit 95.

In this case, the user can recognize explicitly that information on the storage device 5 is not stored in the wireless communication apparatus 15. As a result, user convenience can be improved.

Second Modification Example of Fourth Application Example

Figure 19:
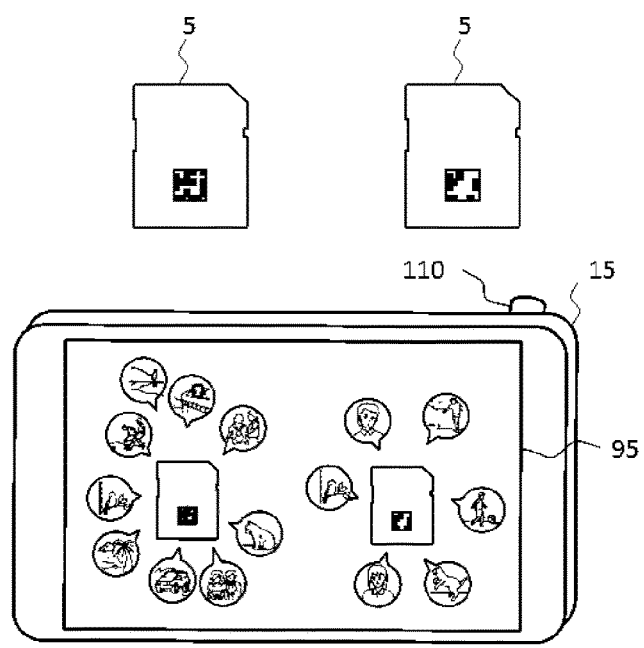
FIG. 19 illustrates a display screen of the wireless communication apparatus according to a first modification example of the fourth application example.

FIG. 19 illustrates a second modification example of the fourth application example of the present embodiment.

As illustrated in FIG. 19, if a plurality of storage devices 5 is in the image capturing field of the image capturing unit 110 of the wireless communication apparatus 15, the wireless communication apparatus 15 displays each thumbnail image of thumbnail data in the storage device 5.

The user can check the contents of the plurality of storage devices 5 at a time, and thus user convenience can be improved.

In addition, FIG. 19 illustrates the case where there are two storage devices 5, but any number of storage devices 5 may be displayed, without being limited thereto. Further, when there are excessively large number of storage devices 5 and it is difficult to display all thumbnail images of the storage devices 5, the wireless communication apparatus 15 may display a portion of the thumbnail images of the storage devices 5, without displaying all thumbnail images of the storage devices 5.

Third Modification Example of Fourth Application Example

Figure 20:
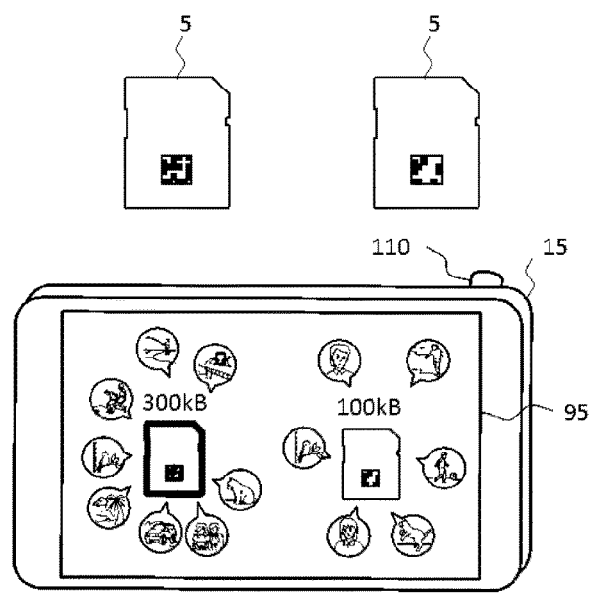
FIG. 20 illustrates a display screen of the wireless communication apparatus according to a second modification example of the fourth application example.

FIG. 20 illustrates a third modification example of the fourth application example of the present embodiment.

As illustrated in FIG. 20, when displaying the thumbnail images of the storage device 5, the remaining capacity may be displayed at the same time. The user can check the remaining capacities of the plurality of storage devices 5, and user convenience can be improved. Specifically, for example, when the user wants to carry a storage device 5 which can record new larger number of photos during travel, according to the application example, the user can easily select a storage device 5 having larger free space.

Fifth Application Example

Figure 21:
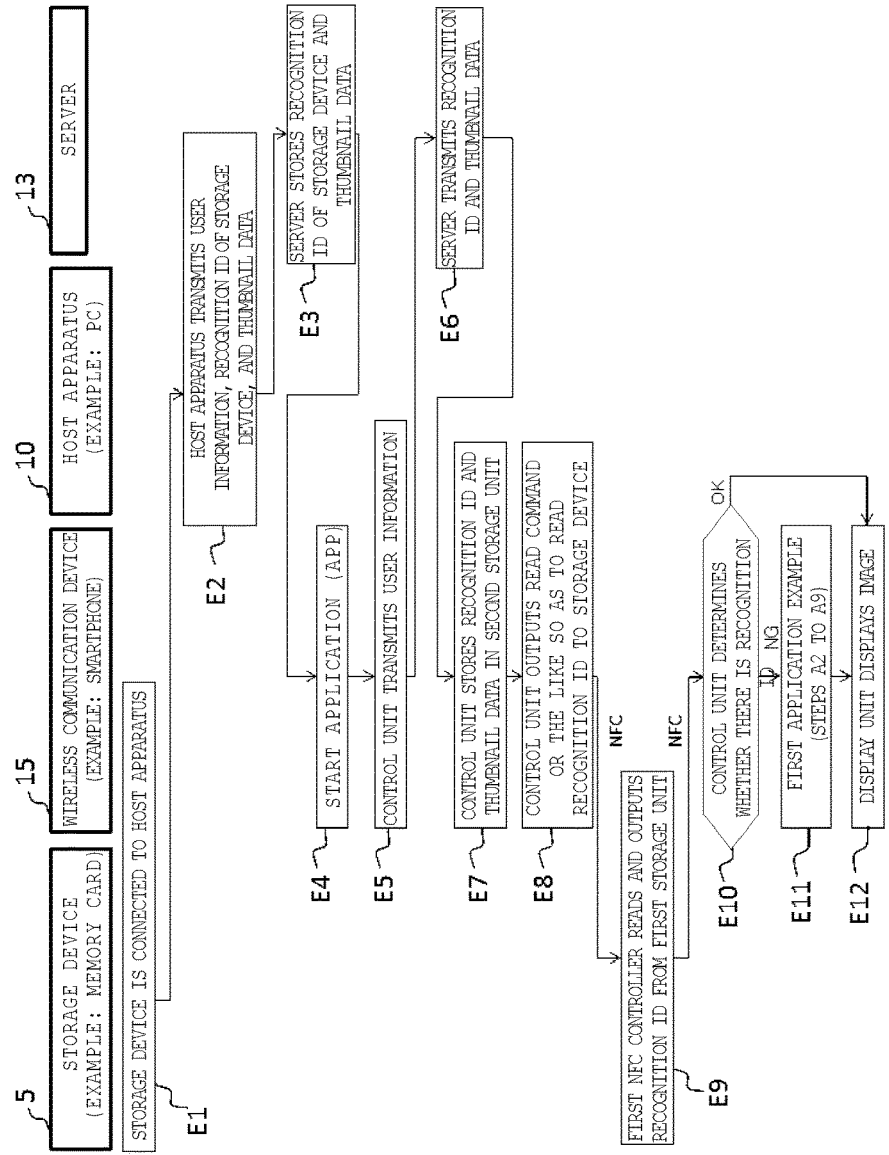
FIG. 21 is a flowchart illustrating a process of a fifth application example according to the first embodiment.

FIG. 21 is a flowchart illustrating a fifth application example of the present embodiment.

In the present application example, the wireless communication apparatus 15 stores previously the image data of the storage device 5, through the host apparatus 10, the server 13, and the like. The wireless communication apparatus 15 can display the thumbnail image data of the storage device 5 at a high speed, with NFC or a camera. Hereinafter, a description will be made based on the flowchart.

In step E1, the user connects the storage device 5 to the host apparatus 10. The storage device 5 is connected to the host apparatus 10 through the connection terminal 65. The storage device 5 is connected to the host apparatus 10, through for example, the USB standard.

In step E2, the host apparatus 10 is connected to a server through for example, a network. The host apparatus 10 transmits user information (for example, a user ID, a user ID and a password, the ID of the wireless communication apparatus 15, the wireless communication apparatus ID and the password, or the like), a recognition ID of the storage device, thumbnail data (thumbnail image data, imaging time data, or the like), to the server 13. In addition, data may be transmitted to the server 13, through the wireless communication apparatus 15 instead of the host apparatus 10.

In step E3, the server 13 stores the recognition ID and the thumbnail data of the storage device, based on the received user information.

In step E4, the user starts the App of the wireless communication apparatus 15. The App controls the operation of the wireless communication apparatus 15 in steps E1 to E11.

In step E5, the control unit 85 is connected to the server 13 through the wireless communication unit 105, by wire communication or the like. The wireless communication apparatus 15 transmits user information to the server 13. In addition, the wireless communication apparatus 15 may be connected to the server 13 through another communication terminal or a network, or may be connected to the server 13 over the so-called Internet.

In step E6, the server 13 authenticates the received user information. The server 13 transmits the recognition ID and the thumbnail data of the storage device which are stored based on the previous user information, based on the user information, to the wireless communication apparatus 15.

In step E7, the wireless communication unit 105 of the wireless communication apparatus 15 receives the recognition ID and the thumbnail data of the storage device 5 from the server 13. The wireless communication unit 105 outputs the received information to the control unit 85. The control unit 85 outputs the information which is input to the second storage unit 90. The second storage unit 90 stores the input information.

In step E8, the control unit 85 of the wireless communication apparatus 15 transmits the read command or the like to the storage device 5 through NFC, so as to transmit the recognition ID and the imaging time data of the storage device 5.

In step E9, the first NFC controller 30 reads the recognition ID of the storage device 5, from the first storage unit 40. The first NFC controller 30 transmits the recognition ID to the wireless communication apparatus 15 through NFC.

In step E10, the control unit 85 of the wireless communication apparatus 15 reads the stored recognition ID from the second storage unit 90. The control unit 85 compares the received recognition ID of the storage device 5 with the stored recognition ID. When the control unit 85 determines that both recognition IDs match (OK in step E10), the control unit 85 performs step E12. When the control unit 85 determines that both recognition IDs do not match (NO in step E10), the control unit 85 or the like performs step E11.

In step E11, the wireless communication apparatus 15 acquires the thumbnail data of the storage device 5 through the same processes as steps A2 to A9 of the first application example.

In step E12, the control unit 85 of the wireless communication apparatus 15 outputs the thumbnail image data included in the thumbnail data, or the image data of a composite image based on the thumbnail image data, to the display unit 95. The display unit 95 displays the image data.

Advantage of Fifth Application Example

According to the present application example, the wireless communication apparatus 15 can acquire the image data of the storage device 5 previously from the server 13, without acquiring the image data from the storage device 5. Thus, the wireless communication apparatus 15 can display the image data at a high speed.

First Modification Example of Fifth Application Example

Step E7 and step E8 may not be performed in temporal proximity. In other words, the wireless communication apparatus 15 previously acquires an image in step E7. Thereafter, step E8 may be performed, for example, by changing the date, with a time difference.

Second Modification Example of Fifth Application Example

In the second modification example of fifth application example, not the thumbnail data (thumbnail image data, imaging time data, or the like), but rather the image data and the imaging time data stored in the storage device 5 may be communicated among the wireless communication apparatus 15, the host apparatus 10, and the server 13.

In the second modification example of fifth application example, any one of communication from the storage device 5 to the host apparatus 10 (step E1), communication from the host apparatus 10 to the server 13 (step E2), and communication between the server 13 and the wireless communication apparatus 15 (steps E5 to E7) can be performed at a higher speed compared to NFC.

Thus, it is possible to communicate original image data of higher image quality, which has larger data capacity and a larger number of pixels than the thumbnail image data. It is possible to display a clear image on the display unit 95, by communicating the original image.

Third Modification Example of Fifth Application Example

Figure 22:
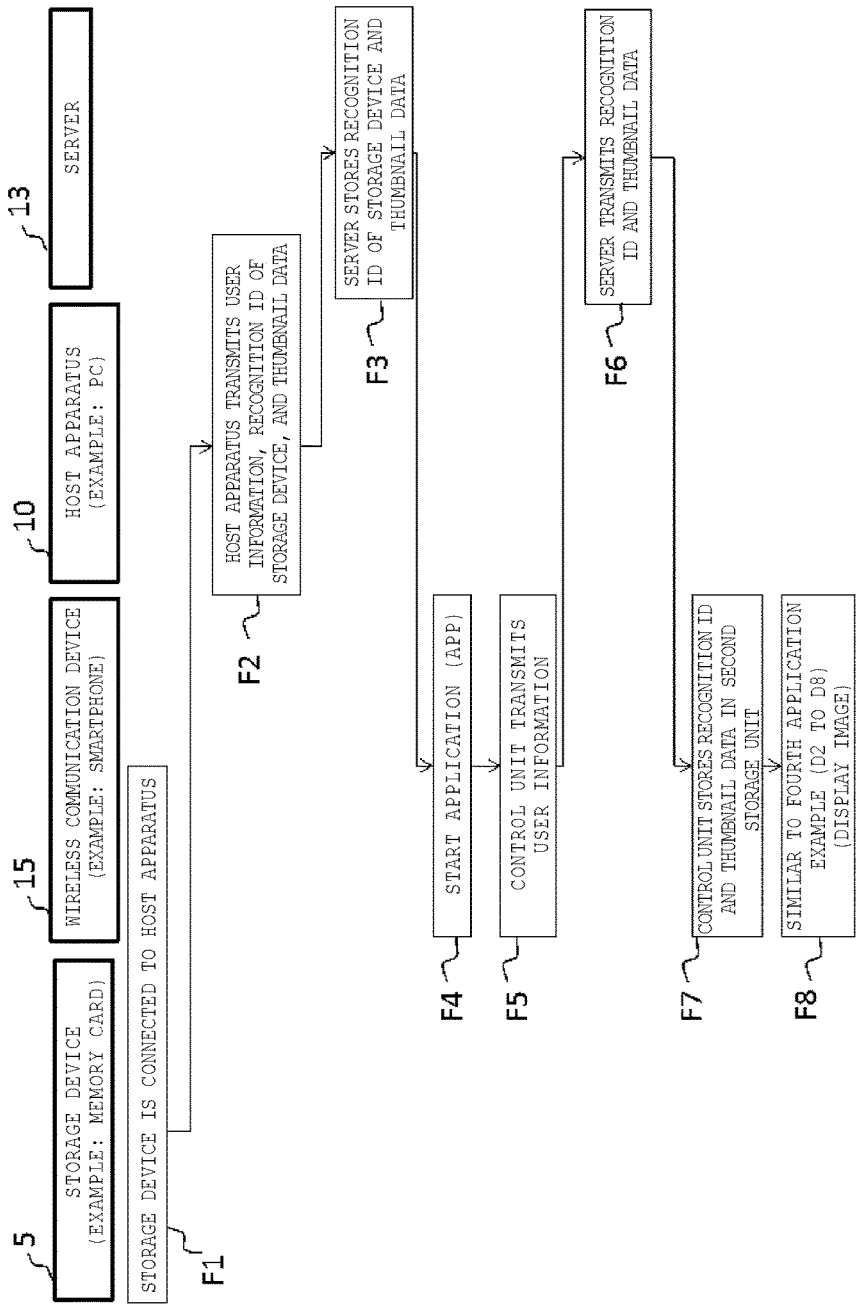
FIG. 22 is a flowchart illustrating a modification example of the fifth application example.

FIG. 22 is a flowchart of a third modification example of the fifth application example. Since steps F1 to F7 may be the same process as in FIG. 21, the description thereof will be omitted.

In step F8, the same process as steps D2 to D7 in the fourth application example is performed. In other words, if the image capturing unit 110 of the wireless communication apparatus 15 captures an image of the storage device 5, the thumbnail image corresponding to the thumbnail data of the storage device 5 is displayed on the display unit 95.

Specifically, in step F8, the same process as steps D1 to D8 in FIG. 18 is performed. The display unit 95 displays a thumbnail image corresponding to the thumbnail image data included in the thumbnail data of the storage device 5.

In addition, the thumbnail data may not be communicated, but rather the original image of the storage device 5 may be communicated similar to the second modification example, even in the modification example.

Sixth Application Example

Figure 23:
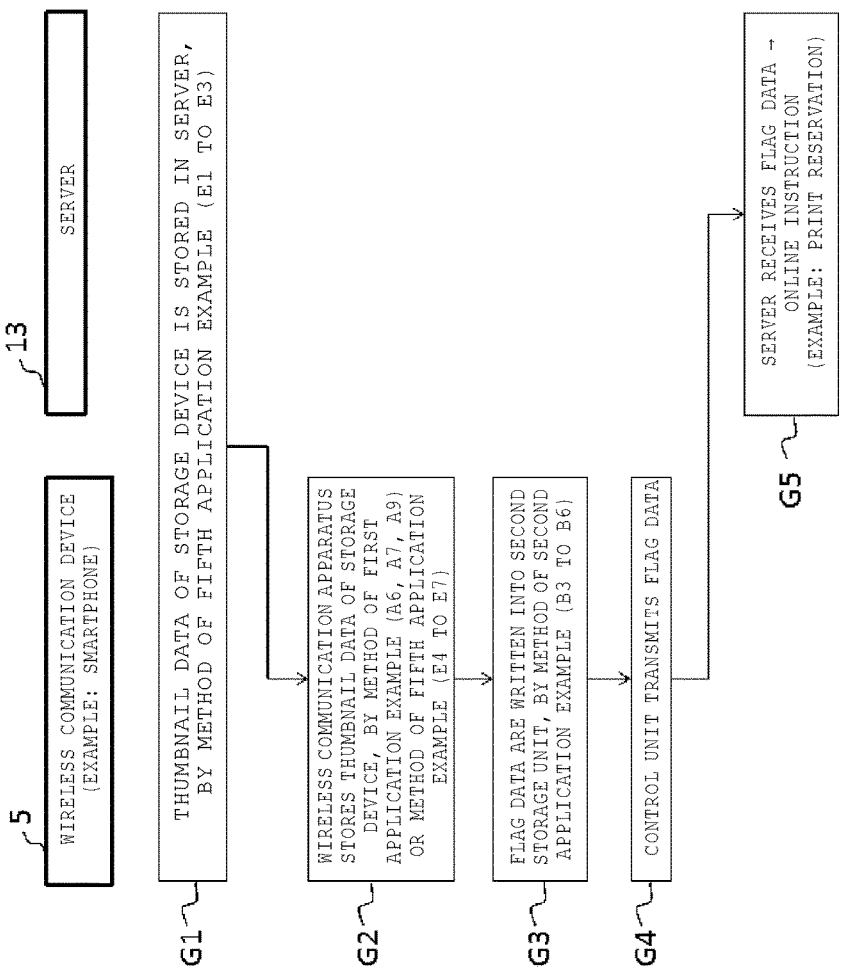
FIG. 23 is a flowchart illustrating a process of a sixth application example according to the first embodiment.

FIG. 23 is a flowchart illustrating a sixth application example.

In the application example, the wireless communication apparatus 15 displays the thumbnail image corresponding to the pre-stored thumbnail data of the storage device 5. The user inputs the flag data. The wireless communication apparatus 15 is connected to the server 13, and transmits the flag data. The server 13 gives a print instruction to a print shop, based on, for example, the received flag data. In other words, the user can print the image stored in the storage device 5, using a device of terminal of the wireless communication apparatus 15.

In step G1, the server 13 stores the thumbnail data of the storage device 5 according to the method of the fifth application example (steps E1 to E3 in FIG. 21).

In step G2, the wireless communication apparatus 15 stores the thumbnail data of the storage device 5 according to the method of the first application example (steps A6, A7, and A9 in FIG. 4) (NFC), or the method of the fifth application example (steps E4 to E7 in FIG. 21) (through the server 13).

In step G3, the wireless communication apparatus 15 acquires flag data according to the method of the second application example (steps B3 to B6 in FIG. 11).

In step G4, the control unit 85 of the wireless communication apparatus 15 is connected to the server 13 through the wireless communication unit 105. Further, the control unit 85 transmits the flag data to the server 13.

In step G5, the server 13 receives the flag data, and performs, for example, the following processes.

For example, the server 13 transmits the flag data and the image data, which are received, for example, to the photo shop. Then, a reservation of the printing of the photo is made at the photo shop, based on the flag data. Alternatively, the image data transmitted from the wireless communication apparatus 15 may be printed.

A predetermined process is for example, a process through which the server 13 allows another user to view the image to be printed, based on the received flag data. Alternatively, the server 13 transmits a mail to a certain user.

Advantage of Sixth Application Example

The user can make a reservation of printing of a photo, or print a photo, by operating the wireless communication apparatus 15. As a result, user convenience can be significantly improved.

Seventh Application Example

Figure 24:
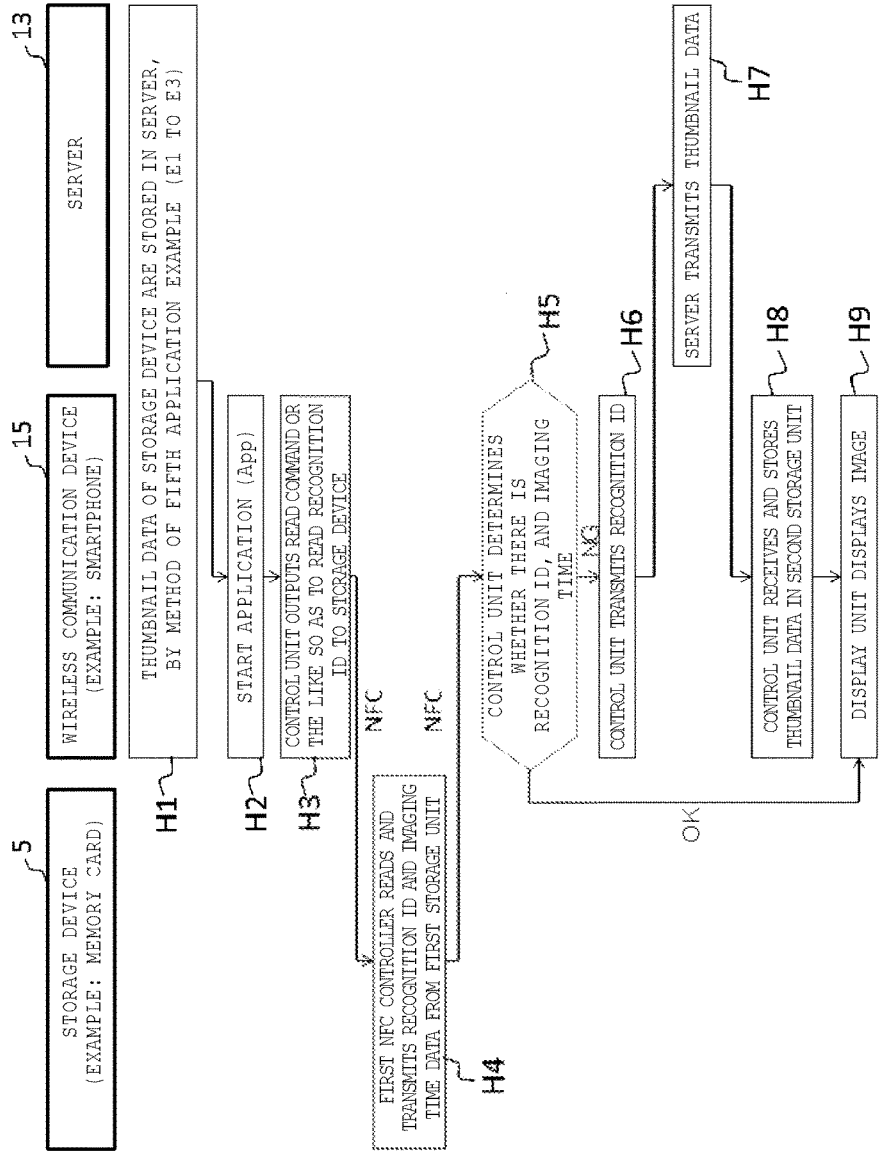
FIG. 24 is a flowchart illustrating a process of a seventh application example according to the first embodiment.

FIG. 24 is a flowchart illustrating a seventh application example.

In the seventh application example, the wireless communication apparatus 15 acquires the thumbnail data of the storage device 5 from the server 13. It is possible to display the thumbnail images of data stored in the storage device 5 at a high speed, by acquiring the thumbnail data from the server 13.

Hereinafter, a description will be made based on the flowchart.

In step H1, the server 13 stores the thumbnail data of the storage device 5 by the method of the fifth application example (steps E1 to E3 in FIG. 21). In the seventh application example, the server 13 stores the thumbnail data of the storage device 5, based on the recognition ID of the storage device 5. In the seventh application example, the user information is not necessarily required.

In step H2, the user starts an App of the wireless communication apparatus 15. The App controls the operation of the wireless communication apparatus 15 in steps H2 to H9.

In step H3, the control unit 85 of the wireless communication apparatus 15 transmits a second read command CMD or a third read command CMD to the storage device 5 through NFC so as to transmit the recognition ID and the imaging time data of the storage device 5. In addition, the control unit 85 may also transmit the address ADD if necessary.

In step H4, the first NFC controller 30 of the storage device 5 receives a read command CMD. The first NFC controller 30 reads the recognition ID and the imaging time data from the first storage unit 40. The first NFC controller 30 transmits the read data to the wireless communication apparatus 15 through NFC. In addition, the number of the imaging time data units may be one, or a plurality of units of imaging time data may be present for each image.

In step H5, the control unit 85 of the wireless communication apparatus 15 receives the recognition ID and the imaging time data. The control unit 85 reads the stored recognition ID and the imaging time data from the second storage unit 90. The control unit 85 compares the received recognition ID and the imaging time data of the storage device 5 with the recognition ID and the imaging time data that are stored. When the control unit 85 determines that both recognition IDs and both units of imaging time data match (OK in step H5), the control unit 85 or the like performs step H9. When the control unit 85 determines that both do not match (NO in step H5), the control unit 85 performs step H6. In addition, the process of step H5 may have the same contents as the process of steps A4 and A5 of the first application example.

In step H6, the control unit 85 is connected to the server 13 through the wireless communication unit 105, by wire communication or the like. The wireless communication apparatus 15 transmits recognition ID of the storage device 5 or the like to the server 13. In addition, not the recognition ID of the storage device 5, but rather the user information or the recognition ID of the wireless communication apparatus 15 may be transmitted.

In step H7, the server 13 receives the recognition ID of the storage device 5. The server 13 transmits the thumbnail data of the storage device 5, which are stored based on the recognition ID of the storage device 5, to the wireless communication apparatus 15.

In step H8, the wireless communication unit 105 of the wireless communication apparatus 15 receives the thumbnail data of the storage device 5 from the server 13. The wireless communication unit 105 outputs these units of received information to the control unit 85. The control unit 85 outputs these units of input information to the second storage unit 90. The second storage unit 90 stores these units of input information.

In step H9, the thumbnail image data included in the thumbnail data, or the image data of the composite image using the thumbnail image data are output to the display unit 95. The display unit 95 displays the input image data. The display unit 95 displays the input image data.

Advantage of Seventh Application Example

The user can check the data stored in the storage device 5 even at a high speed, using the wireless communication apparatus 15, similar to the fifth application example. Further, according to the seventh application example, it is possible to download only the necessary thumbnail data of the storage device 5, different from the fifth application example, and thus it is not necessary to store extra data in the wireless communication apparatus 15. In other words, it is possible to achieve the user convenience and the effective use of data storage capacity of the wireless communication apparatus 15.

First Modification Example of Seventh Application Example

In a first modification example of the seventh application example, similar to the fifth application example, not the thumbnail data (thumbnail image data, the imaging time data, or the like), but rather the image data and the imaging time data which are stored in the storage device 5 may be communicated among the wireless communication apparatus 15, the host apparatus 10, and the server 13.

In the first modification example of the seventh application example, any one of communication (step H1) from the storage device 5 to the host apparatus 10, communication (step H1) from the host apparatus 10 to the server 13, and the communication (steps H6 to H8) between the server 13 and the wireless communication apparatus 15 can be performed at a higher speed compared to NFC.

Thus, it is possible to communicate original image data of high image quality, which has data capacity and a number of pixels that are larger than the thumbnail image data. It is possible to display a clear image on the display unit 95, by communicating the original image.

Second Modification Example of Seventh Application Example

Figure 25:
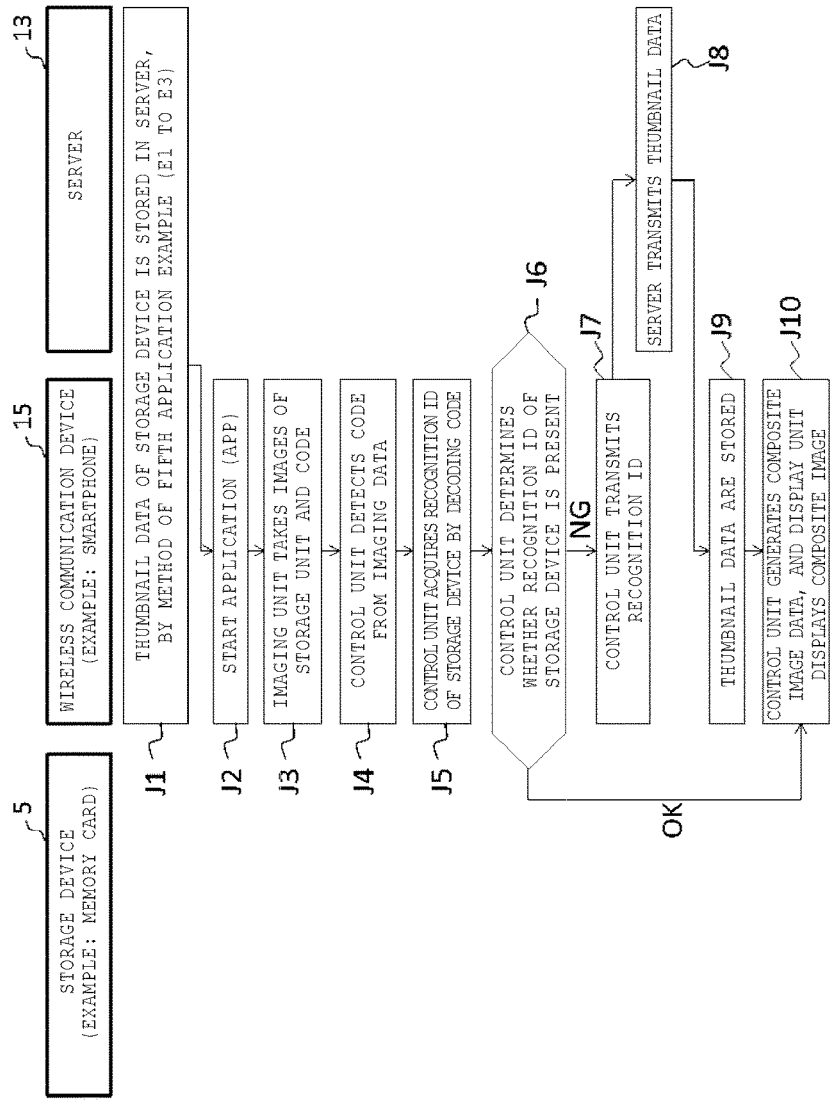
FIG. 25 is a flowchart illustrating a process of a modification example of the seventh application example.

FIG. 25 is a flowchart of a second modification example of the seventh application example. Since steps J1 and J2 are the same process as steps H1 and H2 in FIG. 24, the description thereof will be omitted.

In step J3, the image capturing unit 110 captures images of the storage device 5 and the codes 120 provided in the storage device 5 by the user. The image capturing unit 110 outputs the imaging data (first image data) to the control unit 85.

In step J4, the control unit 85 of the wireless communication apparatus 15 detects the code 120 from the imaging data.

In step J5, the control unit 85 of the wireless communication apparatus 15 acquires information included in the code 120, by decoding (extracting) the code 120. The information included in the code 120 is, for example, a recognition ID of the storage device 5.

In step J6, the control unit 85 of the wireless communication apparatus 15 reads the stored recognition ID from the second storage unit 90. Thereafter, the control unit 85 compares the stored recognition ID with the recognition ID obtained by the decoding.

When the control unit 85 determines that both recognition IDs match (OK in step J6), the control unit 85 performs step J10. When the control unit 85 determines that both recognition IDs do not match (NO in step J6), the control unit 85 performs step J7.

In step J7, the control unit 85 is connected to the server 13 through the wireless communication unit 105, by wire communication or the like. The wireless communication apparatus 15 transmits the recognition ID of the storage device 5 or the like to the server 13. In addition, not the recognition ID of the storage device 5, but rather the user information or the recognition ID of the wireless communication apparatus 15 may be transmitted.

In step J8, the server 13 receives the recognition ID of the storage device 5. The server 13 transmits the thumbnail data of the storage device 5, which are stored based on the recognition ID of the storage device 5, to the wireless communication apparatus 15.

In step J9, the wireless communication unit 105 of the wireless communication apparatus 15 receives the thumbnail data of the storage device 5 from the server 13. The wireless communication unit 105 outputs these units of received information to the control unit 85. The control unit 85 outputs these units of input information to the second storage unit 90. The second storage unit 90 stores these units of input information.

In step J10, in the case of YES in step J6, the control unit 85 of the wireless communication apparatus 15 reads the thumbnail image data included in the thumbnail data regarding the matched recognition ID, from the second storage unit 90. The control unit 85 generates composite image data in which the image acquired from the image capturing unit 110 and the read image data are combined. The control unit 85 outputs the composite image data to the display unit 95, and the display unit 95 displays the composite image data.

In the case of NO in step J6, the control unit 85 of the wireless communication apparatus 15 generates composite image data in which thumbnail image data contained in the thumbnail data acquired by the server 13 and the imaging data acquired by the image capturing unit 110 are combined. The control unit 85 outputs the composite image data to the display unit 95, and the display unit 95 displays an image corresponding to the composite image data.

According to this modification example, it is possible to display an image corresponding to the image data stored in the storage device 5 even from a distance away from the storage device 5, without using NFC.

In addition, not the thumbnail data, but rather the original image of the storage device 5 may be communicated in this modification example, similar to the first modification example.

Eighth Application Example

Figure 26:
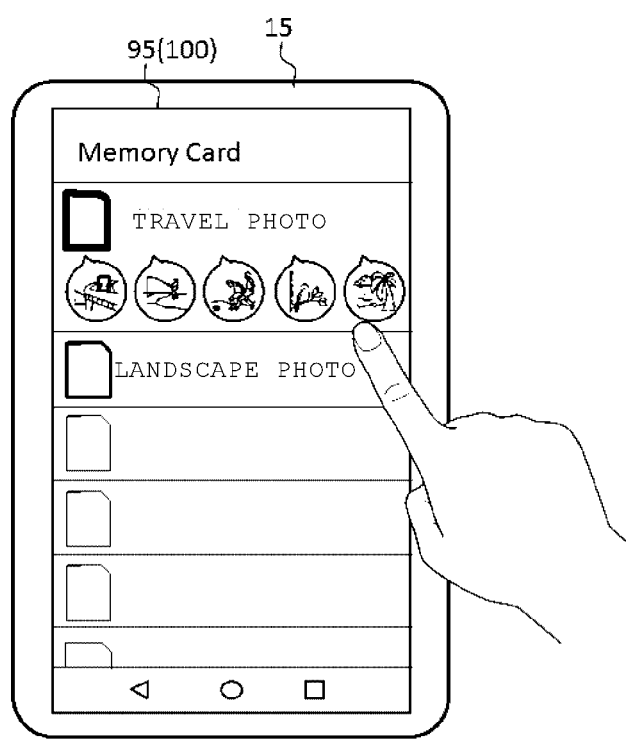
FIGS. 26 and 27 each illustrate a display screen of a wireless communication apparatus according to an eighth application example of the first embodiment (No. 1).
Figure 27:
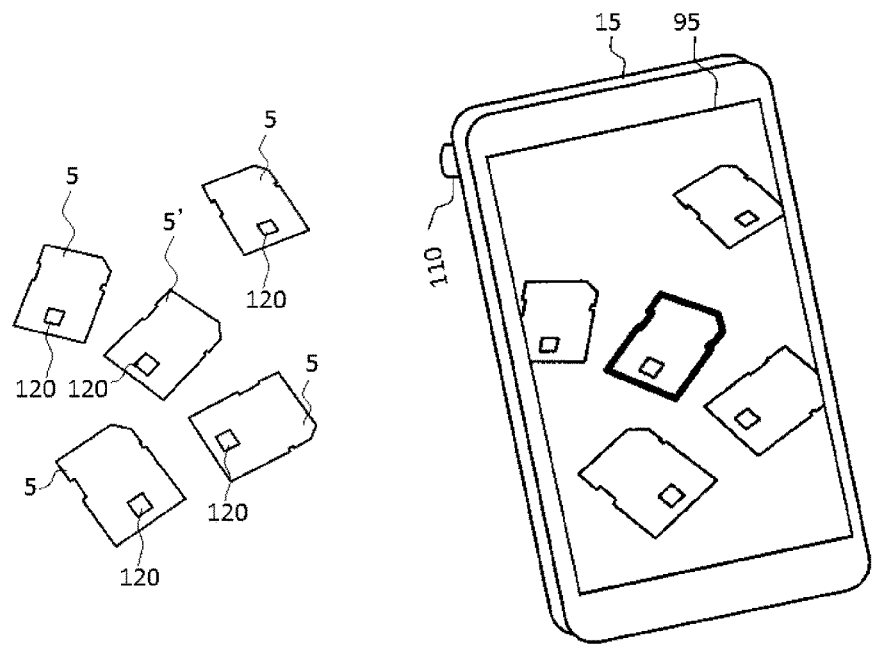

FIG. 26 and FIG. 27 illustrate an eighth application example. In addition, in FIG. 27, the pattern of the code 120 is not illustrated. It is possible to use a certain code 120 that is described with reference to FIGS. 2A and 2B.

As illustrated in FIG. 26, a list of information of the storage device 5 that has been already stored is displayed on the display unit 95 of the wireless communication apparatus 15. The user selects a certain storage device 5 from the list. Information on the selected storage device 5 is highlighted.

Specifically, in FIG. 26, the display unit 95 of the wireless communication apparatus 15 displays information on two storage devices (two comments which are related data of the storage device 5 are respectively "travel photo" and "landscape photo"). Then, the storage device 5 of "travel photo" is selected by the user, and is highlighted.

As illustrated in FIG. 27, when the image capturing unit 110 captures an image of a certain storage device 5, the display unit 95 displays an image in which the storage device 5 of "travel photo" selected in FIG. 26 is highlighted. Specifically, five storage devices 5 are placed in FIG. 27. The storage device 5 in the center thereof is the storage device 5 of "travel photo", and the contour thereof is highlighted in the display unit 95.

In other words, according to this application example, since the user selects a certain storage device 5 in the wireless communication apparatus 15, and the image capturing unit 110 captures an image of the certain storage device 5, it is possible to find the selected storage device 5.

Figure 28:
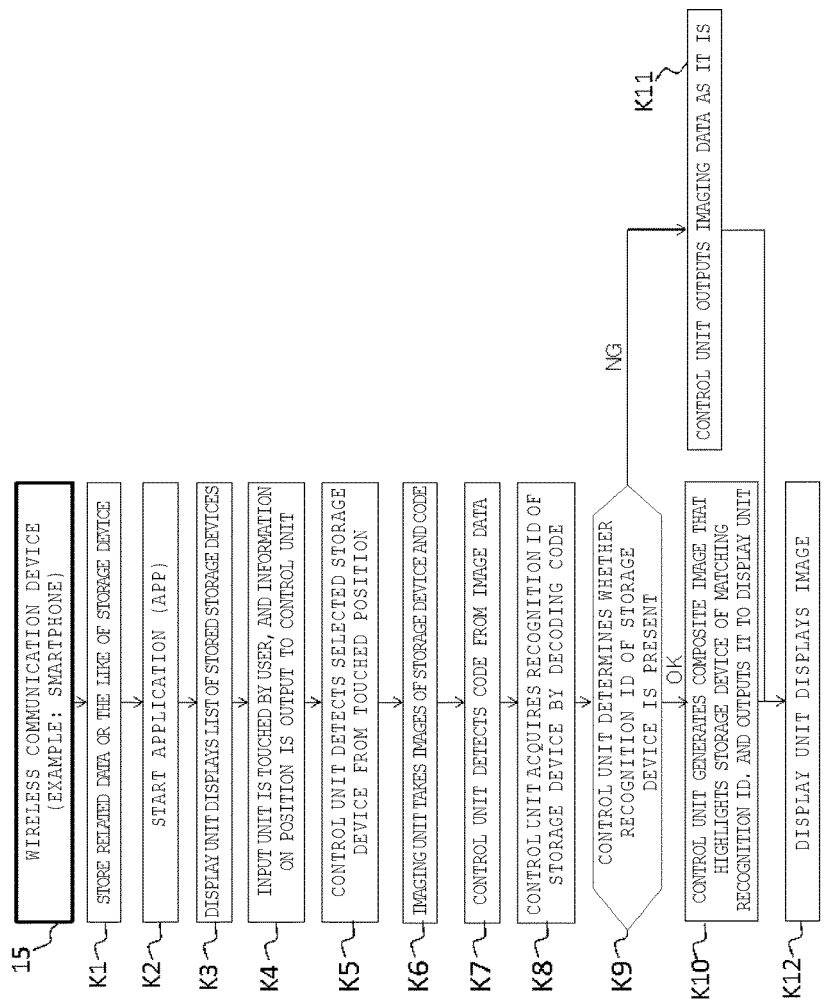
FIG. 28 is a flowchart illustrating a process of the eighth application example of the first embodiment.

FIG. 28 is a flowchart illustrating the eighth application example.

Hereinafter, a description will be made based on the flowchart.

In step K1, the second storage unit 90 of the wireless communication apparatus 15 stores the recognition ID and the thumbnail data of the storage device 5, for example, according to any method of the application examples described above. In addition, the second storage unit 90 may store the recognition ID of the storage device 5 by direct or indirect connection through another connection terminal 65 or the first wireless antenna 20, regardless of the application examples described above.

In step K2, the user starts an App of the wireless communication apparatus 15. The App controls the operation of the wireless communication apparatus 15 in steps K2 to K12.

In step K3, the control unit 85 reads the recognition ID, the thumbnail data, or the like of the storage device 5 that has been already stored from the second storage unit 90. The control unit 85 generates a composite image data of a list of the storage devices 5 illustrated in FIG. 26, from data such as the read recognition ID, and outputs the composite image data to the display unit 95. The display unit 95 displays the composite image data.

In step K4, the user presses a touch panel which is the input unit 100, with the finger or a touch pen, for example, corresponding to the storage device 5 that the user wants to select. The touch panel which is the input unit 100 outputs information on the pressed position to the control unit 85.

In step K5, the control unit 85 identifies the selected storage device 5, from the information on the position which is input from the touch panel. The control unit 85 stores the recognition ID corresponding to the selected storage device 5, in the cache memory in the control unit 85 or the second storage unit 90.

In step K6, the image capturing unit 110 captures an image of a certain storage device 5. In FIG. 27, the image capturing unit 110 captures images of five storage devices 5. Then, the image capturing unit 110 outputs the imaging data (first image data) to the control unit 85.

In step K7, the control unit 85 of the wireless communication apparatus 15 detects a code 120 from imaging data. In the example in FIG. 27, the control unit 85 detects five codes 120.

In step K8, the control unit 85 of the wireless communication apparatus 15 acquires the recognition ID of the storage device 5 included in each of the codes 120, by decoding (extracting) the codes 120.

In step K9, the control unit 85 of the wireless communication apparatus 15 reads the stored recognition ID from the second storage unit 90 or the cache memory. Thereafter, the control unit 85 compares the stored recognition ID with the recognition ID obtained by decoding.

When the control unit 85 determines that both recognition IDs match (OK in step K9), the control unit 85 performs step K10. When the control unit 85 determines that both recognition IDs do not match (NO in step K9), the control unit 85 performs step K11.

In step K10, the control unit 85 of the wireless communication apparatus 15 identifies the storage device 5' corresponding to the matched recognition ID. The control unit 85 generates a composite image data that highlights the portion corresponding to the storage device 5' based on the imaging data, and outputs it to the display unit 95. In addition, FIG. 27 illustrates an example in which the contour of the storage device 5 is highlighted, but a highlighting method is appropriately determined. For example, it is possible to give highlights by any method, such as changing the color of the storage device 5, or giving highlights using an arrow icon. In addition, the image of the non-corresponding storage device 5 is displayed as it is, without being highlighted.

In step K11, the control unit 85 outputs the imaging data as it is to the display unit 95.

In step K12, the display unit 95 displays an image of the imaging data or the composite image data which are received from the control unit 85.

Advantage of Eighth Application Example

According to the eighth application example, it is possible to highlight the storage device 5 of which data have been stored in the wireless communication apparatus 15 in the past, through the image capturing unit 110 and the display unit 95 of the wireless communication apparatus 15. In other words, the user can find the selected storage device 5, without checking the contents of the storage device 5. As a result, user convenience can be significantly improved.

Modification Example of Eighth Application Example

In step K11 of the above description, the control unit 85 of the wireless communication apparatus 15 outputs the imaging data of the image capturing unit 110 to the display unit 95 as it is. As this modification example, for example, the control unit 85 may generate composite image data in which image data indicating that information on the storage device 5 is not stored in the wireless communication apparatus 15 and the imaging data acquired by the image capturing unit 110 are combined. The control unit 85 outputs the composite image data to the display unit 95.

In this case, the user can recognize explicitly that an image of the selected storage device 5 is not captured by the image capturing unit 110 of the wireless communication apparatus 15. As a result, user convenience can be improved.

The summary of one application example of the control method of the wireless communication apparatus 15 according to this embodiment is, for example, as follows.

The control method of the wireless communication apparatus causes a storage unit to store first information that is displayed on an outer surface of a storage device; an image capturing unit to generate first image data including the first information when the image capturing unit captures an image of the first information; a control unit to extract the first information from the first image data, compare the extracted first information with the first information stored in the storage unit, and generate a second image data in which a region corresponding to the storage device, of the first image data, is highlighted; and a display unit to display the second image data.

Further, the wireless communication apparatus control method simultaneously captures second information of a second storage device when capturing the first information, and generates the second image data of which a region corresponding to the second storage device is the first image data when generating the second image data.

Ninth Application Example

FIG. 29 to FIG. 32 illustrate a ninth application example.

Figure 29:
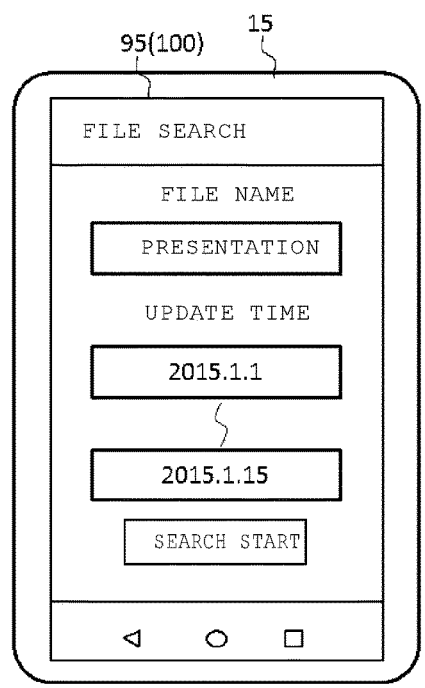
FIGS. 29 and 30 each illustrate a display screen of a wireless communication apparatus according to a ninth application example of the first embodiment.

As illustrated in FIG. 29, a user interface for inputting a search keyword is displayed on the display unit 95 of the wireless communication apparatus 15. The user inputs a certain search keyword such as a file name and an update time.

Specifically, in FIG. 29, the display unit 95 of the wireless communication apparatus 15 displays a file name input field in the upper portion, and an update time input field in the lower portion. The user inputs the character "presentation" in the file name input field, and inputs "2015.1.1 to 2015.1.15" in the update time input field. Thereafter, the user selects a search start button.

Figure 30:
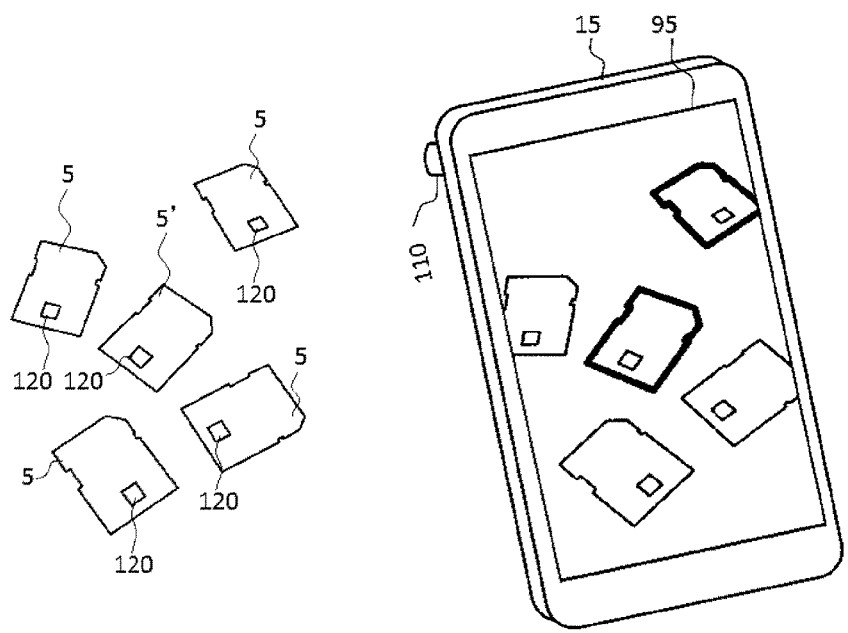

Subsequently, as illustrated in FIG. 30, the user captures an image of a certain storage device 5, with the image capturing unit 110 of the wireless communication apparatus 15.

Thus, an image, in which the storage device 5 storing a file matching the search condition designated in FIG. 29 is highlighted, is displayed on the display unit 95.

Specifically, five storage devices 5 are located in FIG. 30. The storage devices 5 in the center and the upper left portion thereof are the storage devices 5 storing files corresponding to the search condition. The contours of the corresponding storage devices 5 are highlighted on the display unit 95.

In other words, according to this application example, since the user designates a certain search keyword in the wireless communication apparatus 15, and the image capturing unit 110 captures an image of the certain storage device 5, it is possible to find the storage device 5 storing files corresponding to the selected search keyword.

Figure 31:
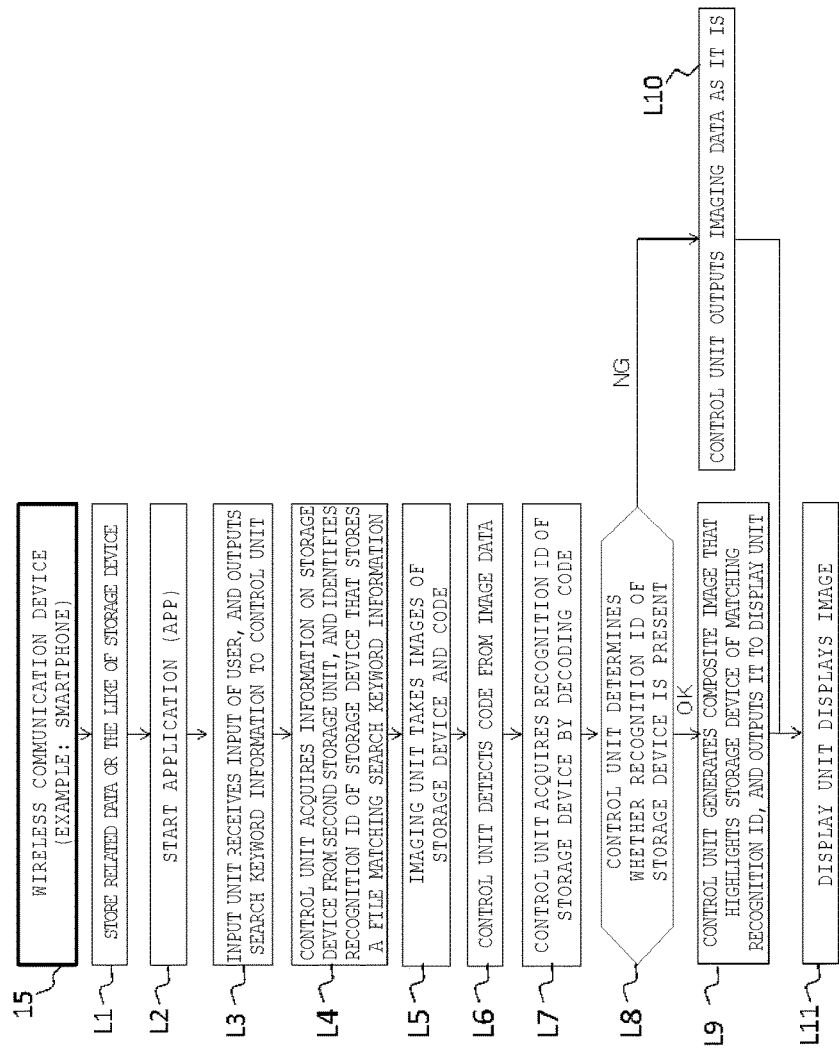
FIG. 31 is a flowchart illustrating a process of a ninth application example of the first embodiment.

FIG. 31 is a flowchart illustrating the ninth application example.

Hereinafter, a description will be given according to the flowchart. In addition, the description of the same portions as the eighth application example will be appropriately omitted.

In step L1, the second storage unit 90 of the wireless communication apparatus 15 stores the recognition ID and the thumbnail image of the storage device 5, for example, according to any method of the application examples described above. In addition, the second storage unit 90 may store the recognition ID of the storage device 5, by direct or indirect connection, through another connection terminal 65 or the first wireless antenna 20, regardless of the application examples described above.

FIG. 32 is a table schematically illustrating an example of a method in which the second storage unit 90 stores information on the storage device 5.

In step L1 in FIG. 32, the title corresponding to the recognition ID, and the total capacity and the free space of the storage device 5 are stored corresponding to the recognition ID of the storage device 5. In addition, one or a plurality of file names is stored with respect to each recognition ID. Property data, such as a file creation date, a file update date, and a file size, are stored corresponding to each file name.

In step L2, the user starts the App of the wireless communication apparatus 15. The App controls the operation of the wireless communication apparatus 15 through steps L2 to L11.

In step L3, the control unit 85 displays a screen that contains a field for inputting a search keyword of the user on the display unit 95. The user touches the touch panel which is the input unit 100 with the finger or a touch pen, corresponding to the storage device 5 that the user wants to search for. The input unit 100 outputs the input search keyword information to the control unit 85.

In step L4, the control unit 85 reads information on the storage device 5 illustrated in FIG. 32, from the second storage unit 90. The control unit 85 compares the read information on the storage device 5 and search keyword information, and identifies the storage device 5 that stores a file matching the search condition.

In the example in FIG. 29, the search keyword information is "file name: presentation, and update time: 2015.1.1 to 2015.1.15". The search keyword information matches "presentation 1.pptx" included in the recognition ID 01111 and "U.S. presentation.pptx" included in the recognition ID 02222, in FIG. 32. In other words, the control unit 85 identifies "ID01111" and "ID02222" as the recognition ID of the storage devices 5 matching the search keyword information.

In the following steps L5 to L11, the same processes as steps K6 to K12 of the eighth application example are performed.

In step L11, the composite image data displayed by the display unit 95 are image data in which the recognition IDs "ID01111" and "ID02222" of the storage device 5 are highlighted, in FIG. 29 and FIG. 32. In other words, as illustrated in FIG. 30, two corresponding storage devices 5 are highlighted.

In addition, when a file matching the search keyword is not stored in any storage device 5, the control unit 85 may output an error indicating the fact to the display unit 95 in step L4, and the process ends. Alternatively, the control unit 85 may determine that the determination in step L8 is NG, and the control unit 85 may directly display an image of the imaging data to the display unit 95 as it is.

Advantage of Ninth Application Example

According to the ninth application example, it is possible to search for the information on the file stored to the wireless communication apparatus 15 by the storage device 5, through the wireless communication apparatus 15. In other words, it is possible to search for the desired file, without checking the data stored in the storage device 5 one by one. As a result, user convenience can be significantly improved.

First Modification Example of Ninth Application Example

The input of a search keyword from the user, as illustrated in FIG. 29, is not limited to the above example. For example, searching may be performed with attribute data of the data stored in the storage device, such as a file generation date, an extension of a file, a file size, a file type (video, audio, an image, a text, binary, or the like), or any type of information.

Further, the user does not use the input unit 100 for input, and voice input may be used.

Second Modification Example of Ninth Application Example

Figure 33:
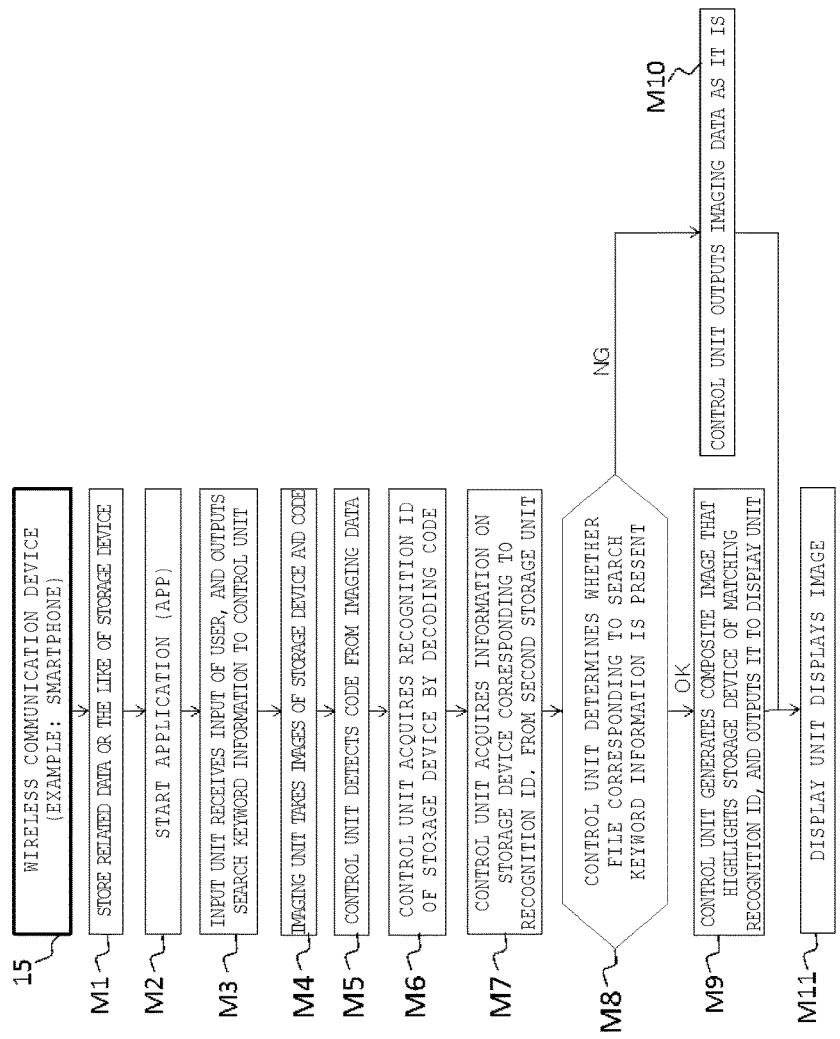
FIG. 33 is a flowchart illustrating a process of a second modification example of the ninth application example.

FIG. 33 is a flowchart illustrating a second modification example of the ninth application example. The second modification example is different from the flow chart illustrated in FIG. 31 in processing contents subsequent to step M4.

In other words, in the flowchart in FIG. 31, the control unit 85 first searches for the storage device 5 matching the search keyword. Then, the control unit 85 searches for the storage device 5 matching imaging data of an image that is captured by the image capturing unit 110.

In contrast, in the flowchart in FIG. 33, the control unit 85 first identifies the storage device 5 matching the imaging data of the image that is captured by the image capturing unit 110. Thereafter, the control unit 85 determines whether or not a file matching the search condition is included, for the identified storage device 5.

Hereinafter, a detailed description will be made based on the flowchart in FIG. 33. In addition, the description of the overlapping portions will appropriately be omitted.

Steps M4 to M6 are the same as steps K6 to K8 of the eighth application example.

In step M7, the control unit 85 reads information on the storage device 5 corresponding to the identified recognition ID, from the second storage unit 90 or the cache memory. The control unit 85 searches the read information on the storage device 5, with the search keyword information that is input in step M3.

When the control unit 85 determines that both units of information match (OK in step M8), the control unit 85 performs step M9. When the control unit 85 determines that both units of information do not match (NO in step M8), the control unit 85 performs step M10.

The process of steps M9 to M11 is the same as steps K10 to K12 of the eighth application example.

According to this modification example, searching may be performed at a higher speed, as compared to the sequence of the flowchart in FIG. 31. In the sequence of the flowchart in FIG. 31, the storage device 5 that is not detected by the wireless communication apparatus 15, for example, the information on the storage device 5 which is not at hand, is searched based on the search keyword information. In contrast, since searching is performed with only the storage device 5 that is sensed by the wireless communication apparatus 15 as a subject in the modification example in FIG. 33, it is possible to perform searching at a high speed.

Third Modification Example of Ninth Application Example

Figure 34:
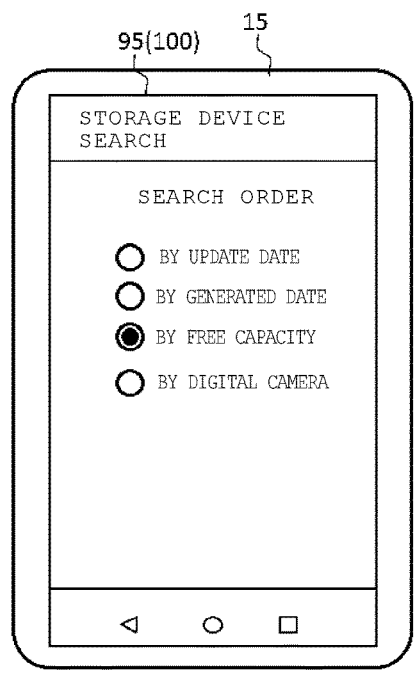
FIGS. 34 and 35 each illustrate a display screen of the wireless communication apparatus according to a third modification example of the ninth application example.
Figure 35:
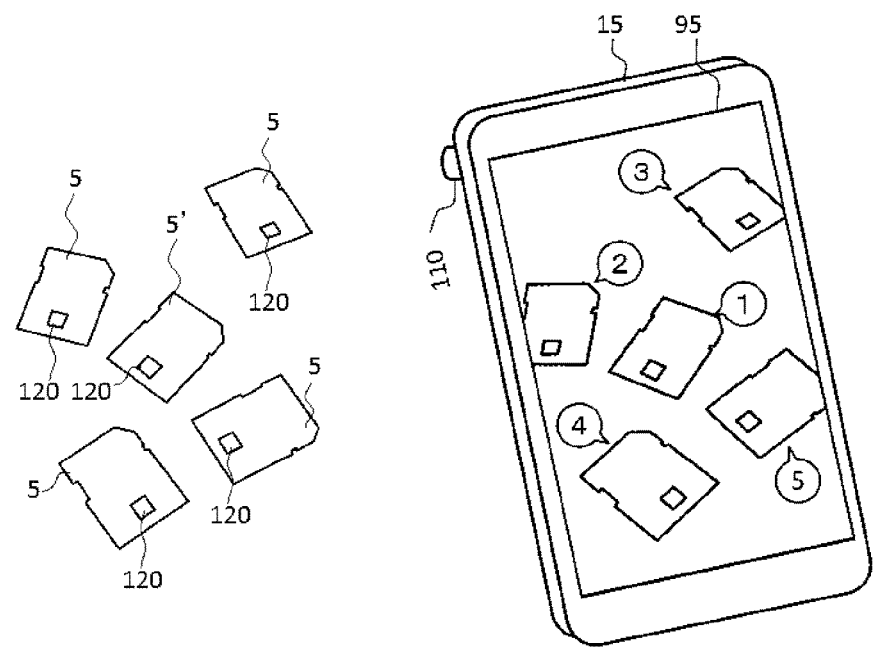
Figure 36:
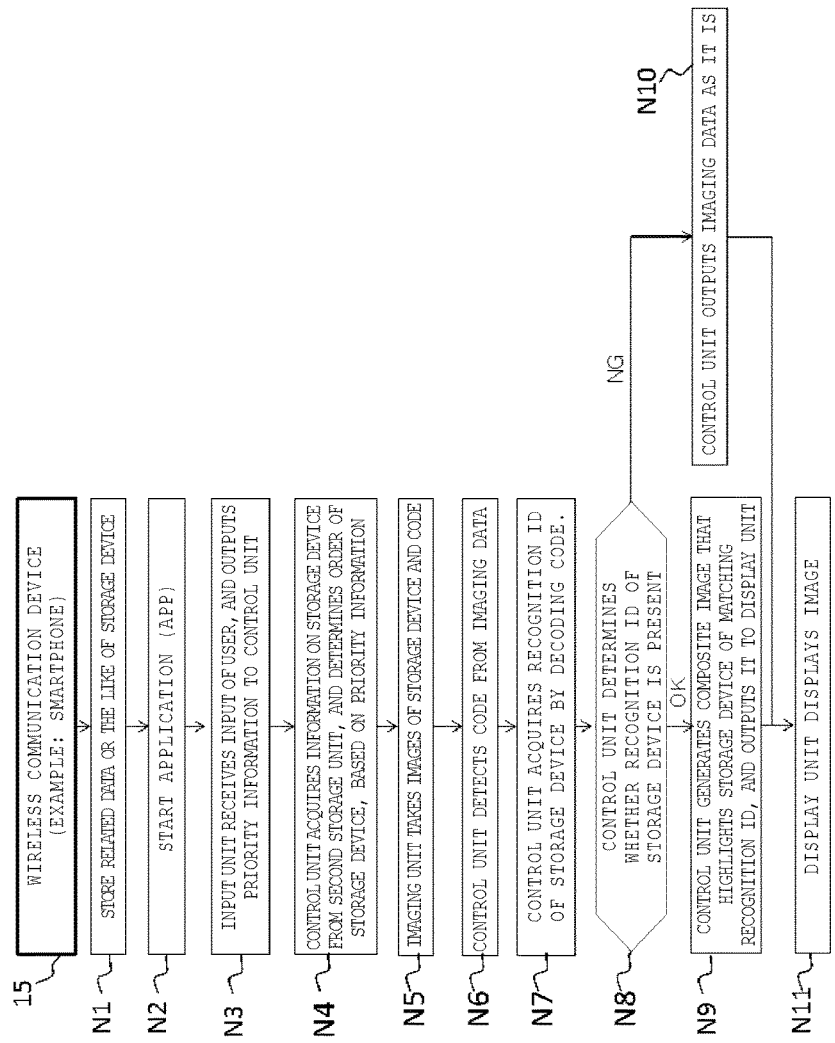
FIG. 36 is a flowchart illustrating a process of the third modification example of the ninth application example.

FIG. 34 to FIG. 36 illustrate a third modification example of the ninth application example. As illustrated in FIG. 34, the user inputs certain priority information for the storage device 5.

As illustrated in FIG. 35, the wireless communication apparatus 15 displays an image in which an order is attached to the storage device 5 based on the set priority information. Specifically, as illustrated in FIG. 34, the user selects an order based on size of free space as priority information. In FIG. 35, numbers are displayed in the order of the size of free space.

FIG. 36 is a flowchart illustrating a third modification example.

Since this modification example has substantially the same processing contents as the flowchart in FIG. 31, except for steps N3, N4, and N9, the description thereof will be omitted. Further, the description of the overlapping portions will appropriately be omitted.

In step N3, the control unit 85 displays a screen that contains a check field for causing the user to select a priority on the display unit 95. The user selects the priority that the user wants to select. The input unit 100 outputs the input priority information to the control unit 85.

In step N4, the control unit 85 reads information on the storage device 5 illustrated in FIG. 32, from the second storage unit 90. The control unit 85 compares the read information on the storage device 5 and the priority information, and determines the order of the storage device 5 in an order of priority.

In step N9, the control unit 85 generates composite image data in which for example, the number corresponding to the priority information that is determined in step N4 is added as a balloon. In addition, the numbers of priority may be assigned to the storage devices 5 which are stored in the second storage unit 90, in an absolute order. Alternatively, the numbers of priority may be assigned to the storage devices 5 which are detected by the control unit 85 from the imaging data, in a relative order.

According to the modification example, since an image of the storage device 5 is captured by the image capturing unit 110 of the wireless communication apparatus 15, without checking the information on the storage device 5 one by one, it is possible to easily search for the storage device 5 which is intended.

In addition, as illustrated in FIG. 34, priority information includes, for example, an order suitable for a digital camera (digital camera order). The control unit 85 calculates a priority, based on the speed class or the free space of a memory card, as the digital camera order.

Specifically, information such as a captured image quality, a capturing condition, and a camera model number is input to the wireless communication apparatus 15 previously. The control unit 85 calculates a priority, for example, based on the speed class, the free space, or the temperature characteristic (for example, the operating temperature may be different in a memory card and a USB memory) of a memory card, according to the input information.

The information may not necessarily be input manually by the user. For example, information may be input by a digital camera and the wireless communication apparatus 15 communicating in a wireless manner. Alternatively, the control unit 85 may recognize an image of a digital camera model number or the like, by the image capturing unit 110 capturing a digital camera.

Fourth Modification Example of Ninth Application Example

Figure 37:
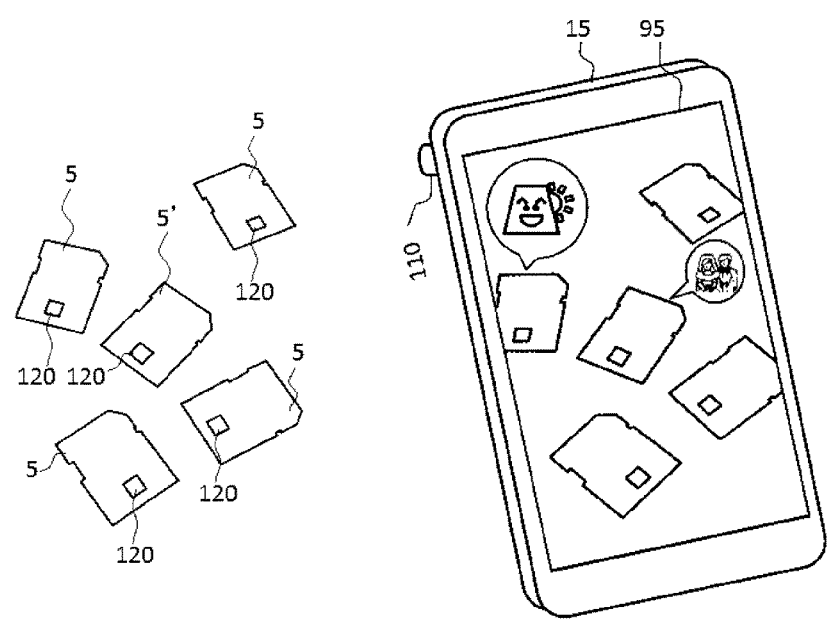
FIG. 37 illustrates a display screen of the wireless communication apparatus according to a fourth modification example of the ninth application example.
Figure 38:
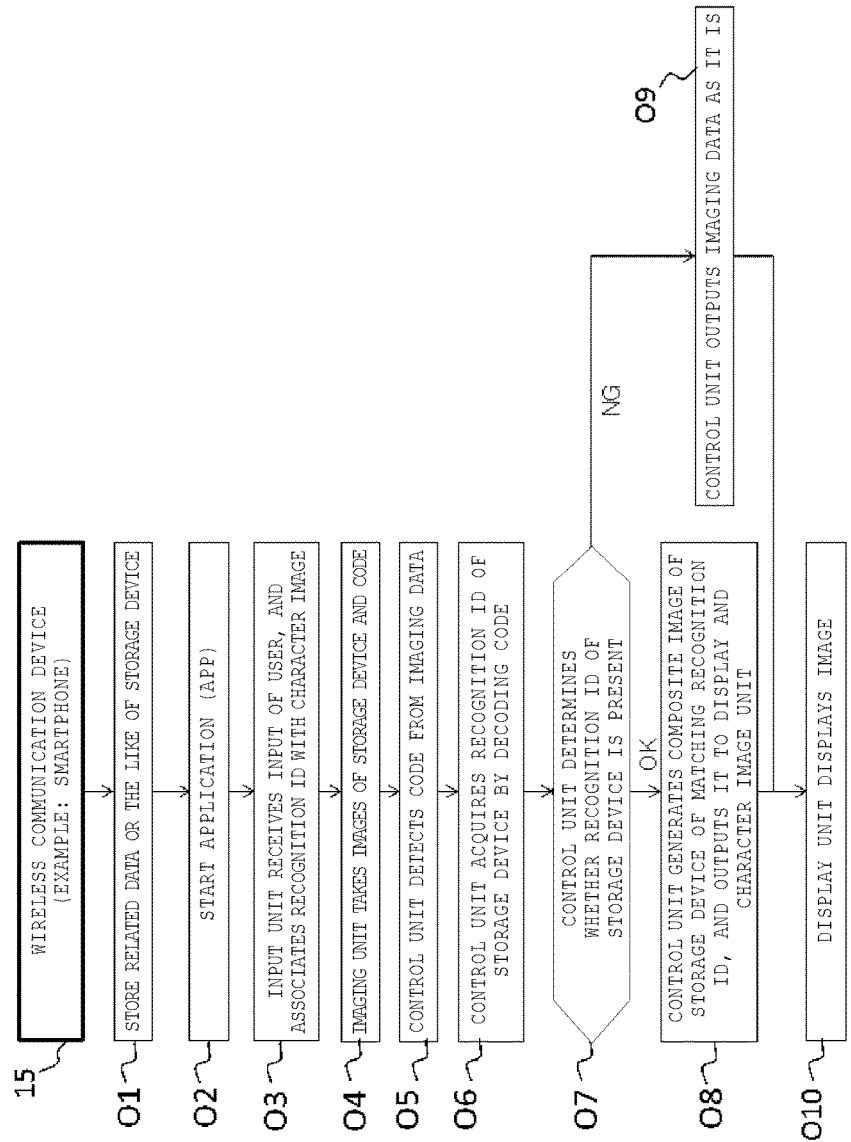
FIG. 38 is a flowchart illustrating a process of the fourth modification example of the ninth application example.

FIG. 37 illustrates a fourth modification example of the ninth application example.

The user sets a certain character for the storage device 5, in the wireless communication apparatus 15. As illustrated in FIG. 37, the wireless communication apparatus 15 displays a composite image in which the storage device 5 and the certain character are overlapped, on the display 95, when imaging the storage device 5 by the image capturing unit 110.

Since this modification example has substantially the same processing contents as the flowchart in FIG. 28, except for steps O3, O8, the description thereof will be omitted. Further, the description of the overlapping portions will appropriately be omitted.

In step O3, the input unit stores a character image corresponding to the recognition ID of the storage device 5, based on an input of the user. In addition, without being limited to the character image, the thumbnail image of the image stored in the storage device 5 may be stored, or an image obtained by performing, for example, image conversion such as a deformation processing on the thumbnail image may be stored.

In step O8, with respect to the storage device 5 associated with the character image, among imaging data units, the character image may be displayed as for example, a balloon, as illustrated in FIG. 37.

In addition, in the modification example, the character image is not necessarily a still image, but may be a moving image. Further, as another modification example, music corresponding to the storage device 5 may resound, instead of highlighting.

According to the modification example, it is possible to give highlight using a particular character.

Fifth Modification Example of Ninth Application Example

Figure 39:
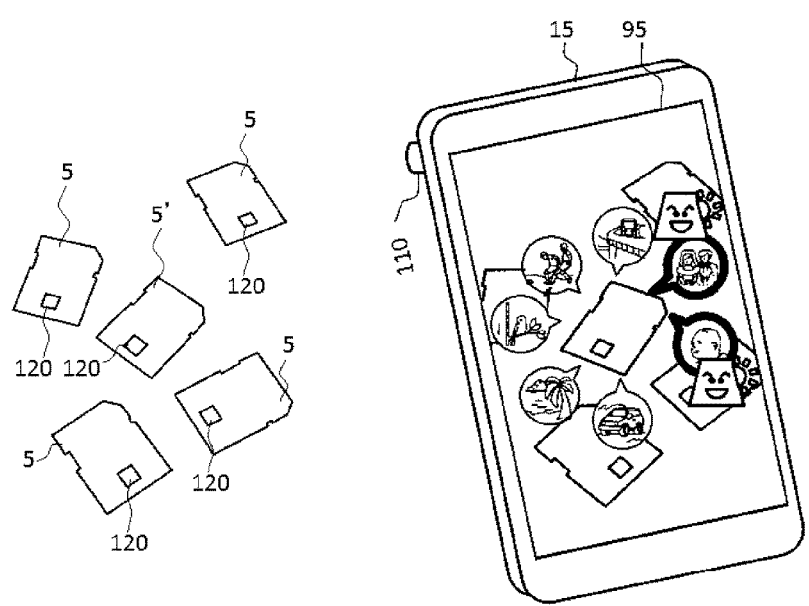
FIG. 39 illustrates a display screen of the wireless communication apparatus according to a fifth modification example of the eighth application example.

FIG. 39 illustrates a fifth modification example of the ninth application example.

The user inputs, for example, a specific date to the wireless communication apparatus 15. As illustrated in FIG. 39, in the case of taking an image of the storage device 5 by the image capturing unit 110, when a thumbnail image corresponding to a specific storage device 5 is displayed on the display unit 95, the wireless communication apparatus 15 highlights the image corresponding to a specific date. In addition, as illustrated in FIG. 39, any character image may be placed next to the highlighted image.

FIG. 40 is a table schematically illustrating a method by which the second storage unit 90 according to the modification example stores information on the storage device 5.

As illustrated in FIG. 40, a title corresponding to the recognition ID, and total capacity and free space of the storage device 5 are stored corresponding to the recognition ID of the storage device 5. In addition, one or a plurality of file names are stored for each recognition ID, and flag information is stored corresponding to each file name.

FIG. 39 illustrates an example in which a date such as "2014.11.1" is input from the user. The control unit 85 sets only the flag of the corresponding file name to 1, and stores 1 in the second storage unit 90.

Specifically, step L3 in FIG. 31 is performed, by setting only a certain date, instead of causing the user to input the search keyword information. Further, the character image is as described in the fourth modification example.

According to the modification example, since the thumbnail image corresponding to the certain date are highlighted, the user can easily access the storage device 5 which stores thumbnail data corresponding to the certain date and the image thereof.

For example, it is assumed that image data of an amusement facility are stored in the storage device 5 on the day when the user goes to the amusement facility. Furthermore, the character image corresponding to the amusement facility is stored in the storage device 5, corresponding to the day when the user goes to the amusement facility. Here, this storage device 5 and the character image are provided, for example, from the amusement facility.

Since the user inputs the date after the elapse of the time, the user can easily access the character of the amusement facility and the thumbnail images of the photos at that time. Furthermore, since the user is reminded of happy memory, the managers of the amusement facility can expect that the user will go again as a repeater.

Second Embodiment

Figure 41:
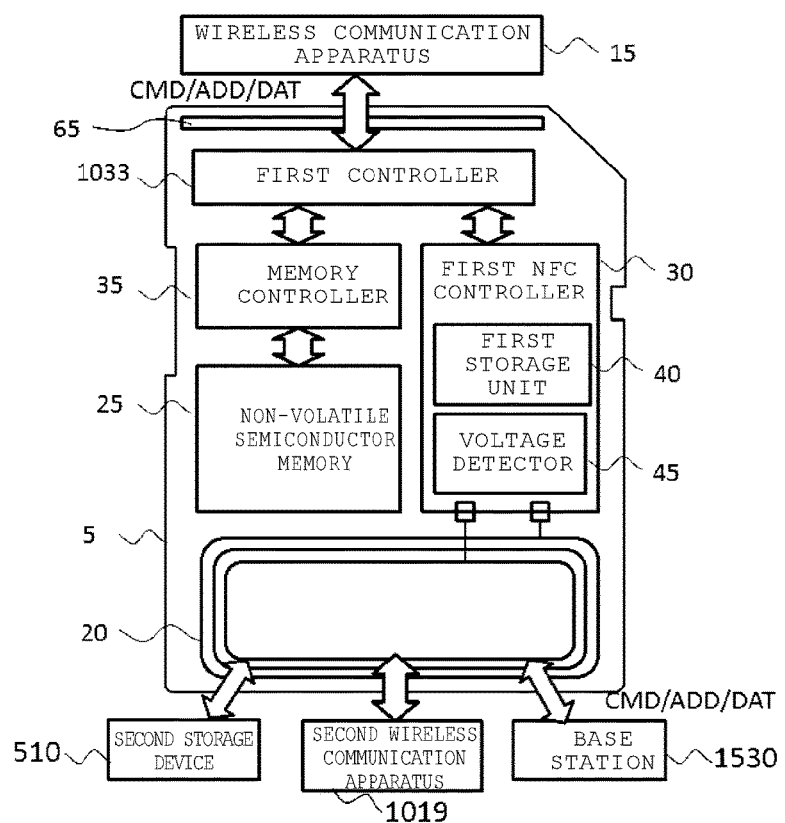
FIG. 41 illustrates a configuration of the storage device according to a second embodiment.

FIG. 41 is a block diagram illustrating a configuration of the storage device 5 according to the second embodiment and correlation between the storage device 5 and each of the wireless communication apparatus 15, the second storage device 1510, the second wireless communication apparatus 1019, and the base station 1530, which are located around the storage device 5. In addition, since the operation method or the like of the storage device 5 will be described below, each element will be described here.

The storage device 5 communicates data and commands with the wireless communication apparatus 15, for example, according to an SD interface, but another interface may be used. Further, the storage device 5 communicates data and commands with the second wireless communication apparatus 1019, for example, according to an NFC interface, but another wireless communication interface may be used.

The storage device 5 includes a first controller 1033, a first wireless antenna 20, a non-volatile semiconductor memory 25, a first NFC controller 30, a memory controller 35, and a connection terminal 65. In addition, the first controller 1033, the memory controller 35, and the first NFC controller 30 needs not necessarily be provided separately, and any combination may be provided integrally.

The storage device 5 is operated by power supplied from the wireless communication apparatus 15 which is electrically connected thereto. The storage device 5 has data write and read functions.

Further, at least a portion of the storage device 5 is operable also by power generated (induced) by electromagnetic induction of the first wireless antenna 20. For example, the storage device 5 performs communication conforming to a short-range wireless communication standard (near field communication: NFC) in a frequency of 13.56 MHz so as to be able to write and read data to the second storage device 1510, the second wireless communication apparatus 1019, and the base station 1530. In other words, the storage device 5 is also operable without power supply from the wireless communication apparatus 15. In addition, NFC communication is possible at lower power than in general wireless LAN communication.

Specifically, the first controller 1033, the memory controller 35, and the non-volatile semiconductor memory 25 are operated when the storage device 5 receives power from the wireless communication apparatus 15. When the storage device 5 receives power only from the first wireless antenna 20, the first controller 1033, the memory controller 35, and the non-volatile semiconductor memory 25 may not operate.

Meanwhile, the first NFC controller 30 is operable even when the storage device 5 receives power only through the first wireless antenna 20. In other words, when the first wireless antenna 20 receives radio waves of a predetermined frequency band corresponding to NFC, the first NFC controller 30 is operable. In other words, the storage device 5 is capable of performing NFC communication.

The first controller 1033 receives a command CMD, an address ADD, and data DAT from the wireless communication apparatus 15, the memory controller 35, and the first NFC controller 30.

The first controller 1033 outputs the command CMD, the address ADD, data DAT, or the like to the memory controller 35, the first NFC controller 30, and the wireless communication apparatus 15, based on the received command CMD.

The memory controller 35 controls the non-volatile semiconductor memory 25. The memory controller 35 writes data into the non-volatile semiconductor memory 25, for example, based on the command CMD or the like received from the first controller 1033. Further, the memory controller 35 reads data from the non-volatile semiconductor memory 25, for example, based on the command CMD or the like from the first controller 1033, and outputs the data to the first controller 1033. In addition, the memory controller 35 may communicate with the first NFC controller 30 or the wireless communication apparatus 15, without passing through the first controller 1033.

The non-volatile semiconductor memory 25 is, for example, a NAND-type flash memory, but may be other types of non-volatile semiconductor memories such as a NOR-type flash memory, a magnetoresitive random access memory (MRAM), a phase change random access memory (PRAM), a resistive random access memory (ReRAM), and a ferroelectric random access memory (FeRAM).

The non-volatile semiconductor memory 25 is operated when power is supplied from the wireless communication apparatus 15 to the storage device 5.

The first wireless antenna 20 is, for example, a PCB pattern antenna. The operable frequency band of the first wireless antenna is set to a predetermined frequency band corresponding to NFC.

The first wireless antenna 20 can generate power caused by electromagnetic induction based on radio waves, for example, from the second wireless communication apparatus 1019. The first wireless antenna 20 supplies the generated power to the first NFC controller 30.

The first wireless antenna 20 receives a command CMD, an address ADD, and data DAT, from the second storage device 1510, the second wireless communication apparatus 1019, and the base station 1530. The first wireless antenna 20 outputs the received command CMD, or the like, to the first NFC controller 30.

The first wireless antenna 20 outputs, the command CMD or the like received from the first NFC controller 30, to the second storage device 1510, the second wireless communication apparatus 1019, and the base station 1530.

The first NFC controller 30 includes a first storage unit 40 and a voltage detector 45. In addition, the first NFC controller 30 and the first storage unit 40 may separately be configured.

The first controller 1033 receives the command CMD, the address ADD, and the data DAT from the wireless communication apparatus 15, the memory controller 35, and the first NFC controller 30.

The first controller 1033 outputs the command CMD, the address ADD, the data DAT or the like to the memory controller 35, the first NFC controller 30, and the wireless communication apparatus 15, based on the received command CMD.

The first NFC controller 30 communicates with the second wireless communication apparatus 1019 or the like, through the first wireless antenna 20.

The first NFC controller 30 receives the command CMD, the address ADD, the data DAT, or the like from the first controller 1033 and the first wireless antenna 20. The first NFC controller 30 outputs data DAT or the like, for example, to the first controller 1033 and the first wireless antenna 20, based on the received command CMD.

Further, the first NFC controller 30 reads data DAT from the first storage unit 40, based on the command CMD, the address ADD, or the like, which are received, and outputs data DAT to the first controller 1033 and the first wireless antenna 20.

Further, the first NFC controller 30 writes the data DAT into the first storage unit 40, based on the command CMD, the address ADD, data DAT or the like.

In addition, the command CMD, the address ADD, the data DAT, or the like which is communicated between the wireless communication apparatus 15, the first controller 1033, the memory controller 35, the first NFC controller 30, the first wireless antenna 20, and the like may necessarily match in the formats. The command CMD, the address ADD, and the data DAT which are recognizable by both apparatuses which communicate need not formally match the command CMD, the address ADD, the data DAT, and the like which are communicated by other apparatuses.

When receiving a related data generation command CMD and the data DAT through the first controller 1033 or the first wireless antenna 20, the first NFC controller 30 may generate and write related data DAT' to the first storage unit 40.

In addition, the first NFC controller 30 may not have a write function to the second wireless communication apparatus 1019 side. In other words, there is no need to have a write function to write into an NFC tag or the like in the outside of the storage device 5. In addition, when the second wireless communication apparatus 1019 writes data into the first storage unit 40 through the first wireless antenna 20, the second wireless communication apparatus 1019 may directly write the data into the first storage unit 40. In other words, data writing into the first storage unit 40 may not necessarily be performed by the first NFC controller 30.

The first storage unit 40 is, for example, a non-volatile memory. The first storage unit 40 stores data, in response to control by the first NFC controller 30 or the memory controller 35. In addition, the first storage unit 40 may temporarily store data. Although as the first storage unit 40, for example, an electrically erasable programmable read-only memory (EEPROM) is used, it is possible to use various memories similar to the afore-mentioned non-volatile semiconductor memory 25.

In addition, since the first storage unit 40 is operable by power supplied from the first wireless antenna 20, it is desirable that power consumption on a capacity basis in the non-volatile memory used for the first storage unit 40 is lower than the power consumption of the non-volatile semiconductor memory 25. Specifically, a NOR-type memory may be used.

Examples of the data stored in the first storage unit 40 include a portion of the related data of the storage device (data related to data stored in the non-volatile semiconductor memory 25 (for example, various data such as image data, text data, presentation data, and table calculation data), or data regarding the non-volatile semiconductor memory 25 and the storage device 5), data related to the wireless communication apparatus 15, and information of a command CMD received from the first controller 1033, the second wireless communication apparatus 1019, or the like.

Specific examples will be described. In addition, the specific examples do not mean that the data stored in the first storage unit 40 are limited thereto.

Examples of data related to the image data stored in the non-volatile semiconductor memory 25 include file name data, a first or last portion of the image data, thumbnail image data of the image data, file generation time data, imaging time data, a data ID, and the like.

Examples of data related to the sound data stored in the non-volatile semiconductor memory 25 include file name data, a first or last portion of the sound data, playing time data of the sound data, file generation time data, a data ID, and the like.

The data related to the non-volatile semiconductor memory 25 are data of memory capacity of the non-volatile semiconductor memory 25, data of remaining capacity, data of the number of stored files, or the like.

The data about the storage device 5 are recognition ID (the number for identification that is arbitrarily assigned to each storage device 5, for example, a specific product ID that is assigned during production, an ID that is arbitrarily assigned to each storage device 5 after production, or the like), comments (text data related to the storage device 5 that the user stores in the storage device 5 through the wireless communication apparatus 15)), or the like.

The data related to the wireless communication apparatus 15 are the recognition ID of the wireless communication apparatus 15, or update information of firmware of the wireless communication apparatus 15, flag information generated based on these units of information, or the like.

The voltage detector 45 is electrically connected to the first wireless antenna 20. The voltage detector 45 detects a voltage that is supplied from the first wireless antenna 20 to the first NFC controller 30. Then, the voltage detector 45 outputs a reset command of NFC communication until the first NFC controller 30 reaches a predetermined operable voltage. The first NFC controller 30 does not perform NFC communication while receiving the reset command. The reset command can prevent abnormal start-up and operation in the communication by NFC. The voltage detector 45 may output an operable command to the first NFC controller 30 when voltage of the first NFC controller 30 reaches the predetermined operable voltage. The first NFC controller 30 performs the communication by NFC, only when receiving the operable command.

The connection terminal 65 is, for example, a standardized connection terminal, and is connectable to the wireless communication apparatus 15.

Figure 42:
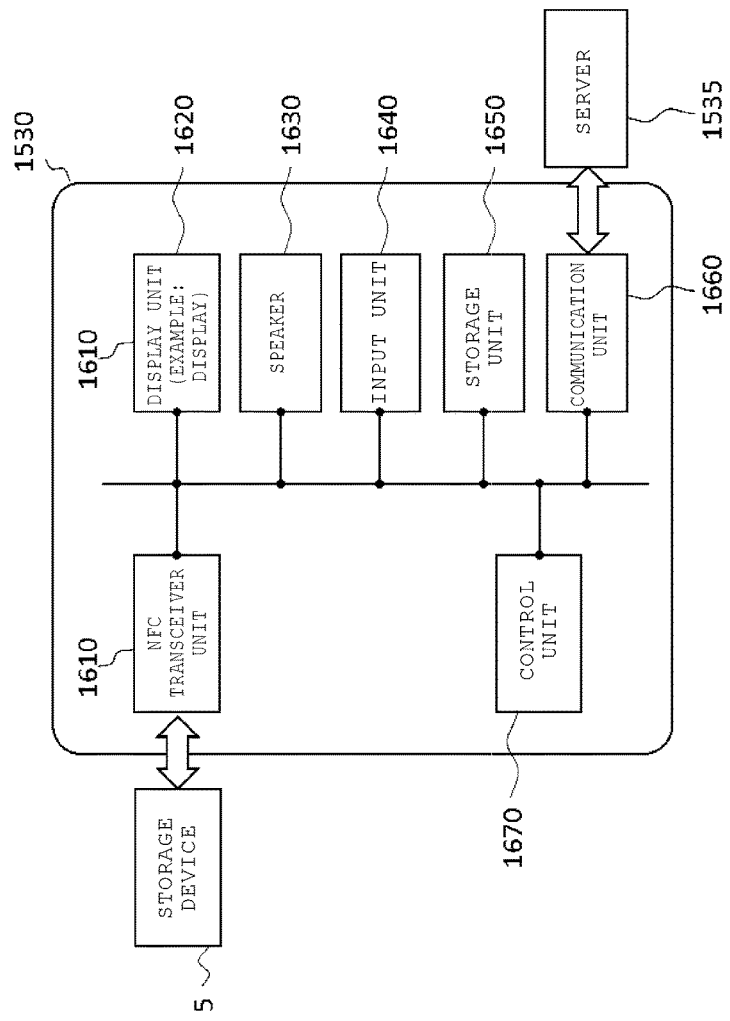
FIG. 42 is a block diagram of a base station according to the second embodiment.

FIG. 42 is a block diagram schematically illustrating a base station 1530. The base station 1530 includes a NFC transceiver unit 1610, a display unit (display) 1620, a speaker 1630, an input unit 1640, a storage unit 1650, a communication unit 1660, and a control unit 1670.

The NFC transceiver unit 1610 performs NFC communication with devices in the outside of the base station 1530, in response to an instruction of the control unit 1670. For example, the NFC transceiver unit 1610 performs NFC communication with the storage device 5.

The display unit 1620 is, for example, any display such as a liquid crystal display and an organic EL display. The display unit 1620 displays, for example, that the base station 1530 performs NFC communication, during NFC communication, and represents the completion of communication when the communication is completed.

The speaker 1630 generates a sound in response to the instruction from the control unit 1670.

The input unit 1640 is, for example, a keyboard or buttons. Alternatively, when the display unit 1620 is a display functioning as a touch panel, the touch panel is the input unit 1640.

The storage unit 1650 is, for example, any storage device such as a HDD, a SSD, and a flash memory. The storage unit 1650 stores, for example, data transmitted to the outside. Examples of the data include voice data of a character, moving image data, or the like.

The communication unit 1660 communicates with, for example, the server 1535 external to the base station 1530, in response to an instruction of the control unit 1670, by wired or wireless communication. The communication unit 1660 acquires data to be stored to the storage unit 1650, from the server 1535.

The control unit 1670 controls the NFC transceiver unit 1610, the display unit 1620, the speaker 1630, the input unit 1640, the storage unit 1650, and the communication unit 1660.

Operation Method of Storage Device

Hereinafter, the operation example of the storage device 5 according to this embodiment will be described with reference to FIG. 43 to FIG. 63. In addition, for convenience of description, a device that communicates with the storage device 5 through the connection terminal 65 is referred to as a first host 1800 and a device that communicates with the storage device 5 through the first wireless antenna 20 is referred to as a second host 1850. The second storage device 1510, the second wireless communication apparatus 1019, and the base station 1530 in FIG. 41 are collectively referred to as the second host 1850. In addition, with respect to the common elements in each operation example, the details which are described in the previous operation examples are not repeated in the following operation examples, without being noted in particular.

First Operation Example

Figure 43:
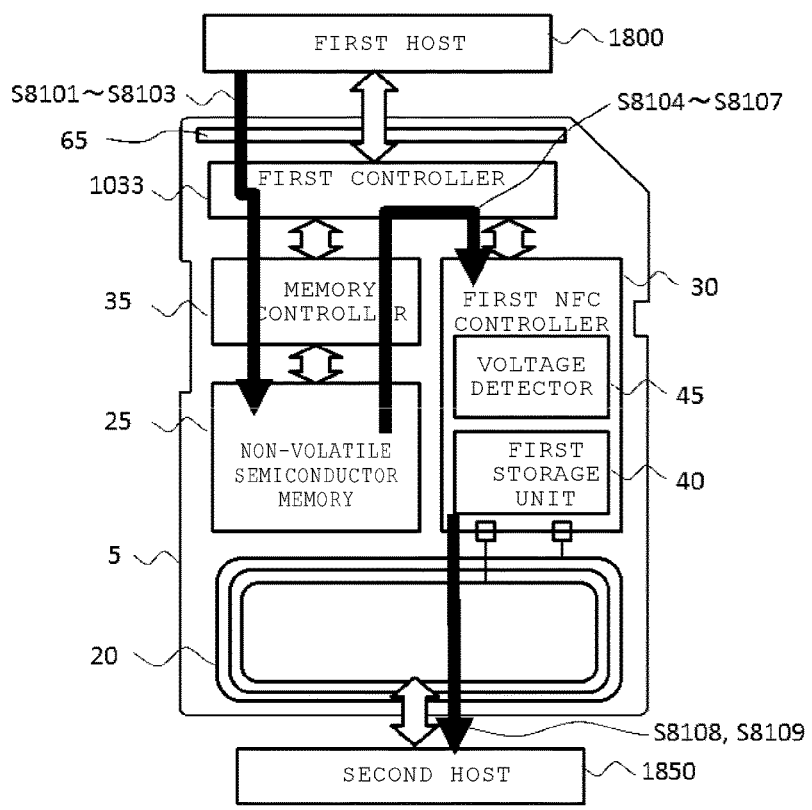
FIG. 43 illustrates data flow in the storage device according to a first operation example of the second embodiment.
Figure 44:
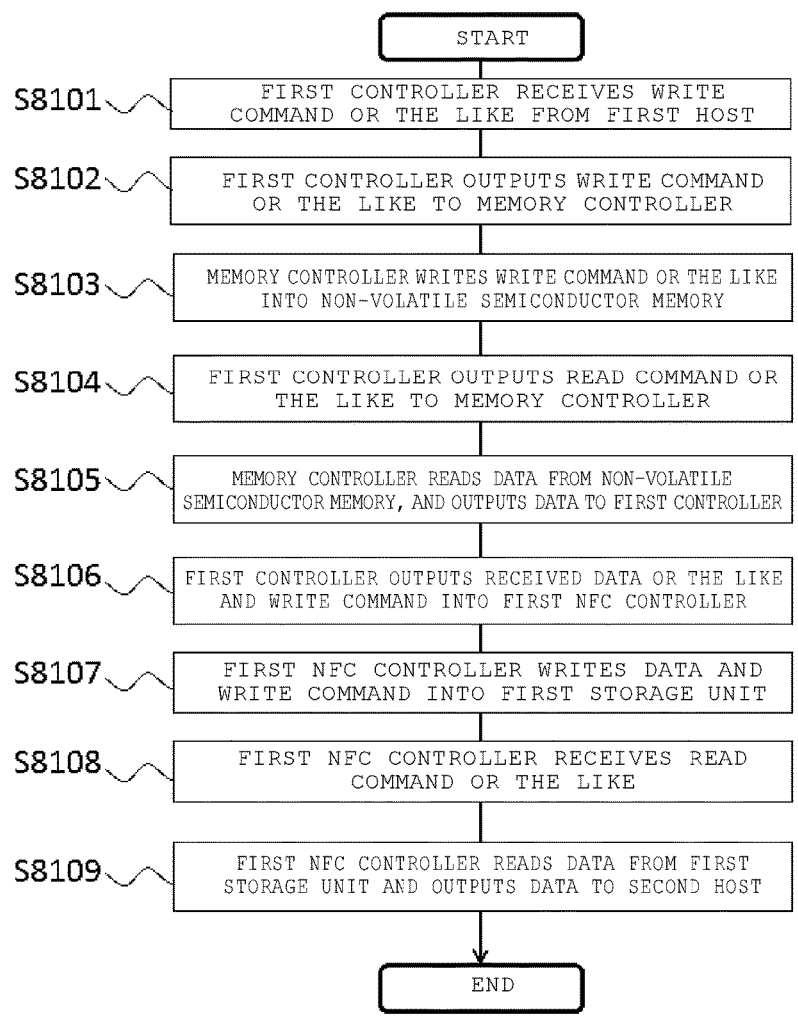
FIG. 44 is a flowchart illustrating a process of the first operation example of the second embodiment.

FIG. 43 schematically illustrates a data flow in a first operation example. Further, FIG. 44 illustrates a flowchart of the first operation example.

A first operation example is an operation in which the data that are transmitted from the first host 1800 to the non-volatile semiconductor memory 25 is transferred to the first storage unit 40, and second host 1850 reads data from the first storage unit 40.

In step S8101, the first controller 1033 receives a write command CMD, an address ADD, and data DAT, from the first host 1800, through the connection terminal 65.

In step S8102, the first controller 1033 outputs the write command CMD, the address ADD, and the data DAT to the memory controller 35. In addition, as described above, the write commands CMD of step S8101 and step S8102 need not formally match. The same is also applied to the address ADD and the data DAT. In addition, the same is applied to the following description, unless otherwise noted.

In step S8103, the memory controller 35 writes data into the non-volatile semiconductor memory 25, based on the received command CMD.

In step S8104, the first controller 1033 outputs the read command CMD and the address ADD to the memory controller 35.

In step S8105, the memory controller 35 reads data DAT from the non-volatile semiconductor memory 25, based on the read command CMD, and outputs the data DAT to the first controller.

In step S8106, the first controller 1033 outputs the data DAT, the write command CMD, and the address ADD, which are received, to the first NFC controller 30.

In step S8107, the first NFC controller 30 writes the data DAT into the first storage unit 40, based on the received write command CMD, or the like.

In step S8108, the first NFC controller 30 receives the read command CMD and the address ADD, from the second host 1850, through the first wireless antenna 20.

In step S8109, the first NFC controller 30 reads data DAT from the first storage unit 40, based on the received read command CMD. The first NFC controller 30 outputs the data DAT to the second host 1850, through the first wireless antenna 20.

In addition, the above steps may not necessarily be performed in succession, and respective steps may also be temporally separated.

Modification Example of First Operation Example

Hereinafter, a modification example of the first operation example will be described.

The storage device 5 is operable only by power supplied from the second host 1850 through the first wireless antenna 20, in step S8107 to step S8109 of the above operation example.

Fifth Operation Example

After step S8103, the process after step S8104 may be performed after the input of commands or the like from the second host 1850. In this case, the second host 1850 can move only required data from the non-volatile semiconductor memory 25 to the first storage unit 40. In addition, in this case, step S8108 may be omitted.

Data Transferred to First Storage Unit

In this operation example, the data DAT that have been written in step S8106 and step S8107 (here, for convenience, referred to as DAT2) and the data DAT that have been written in step S8103 (here, for convenience, referred to as DAT1) need not necessarily match. In other words, the data stored in the non-volatile semiconductor memory 25 and the data stored in the first storage unit 40 need not match. The same is applied to the following operation examples.

For example, DAT2 may be a portion of DAT1. Further, DAT2 may be data obtained by processing data of DAT1. For example, when DAT1 is the image data, DAT2 may be a compressed image of DAT1, and when DAT2 is sound data, DAT2 may be more compressed sound, or may be sound data of an introductory portion.

In this way, the data stored in the non-volatile semiconductor memory 25 and the data to be transferred to the first storage unit 40 do not necessarily match. With respect to a method of extracting the data stored in the first storage unit 40, three methods will be described as specific examples.

First, a first method is a method in which the first host 1800 outputs a particular command CMD, an address ADD, the data DAT, or the like to the first controller 1033. In this method, which data to be transferred to the first storage unit 40 are designated by the address ADD and the data DAT.

The first controller 1033 reads the designated data from the non-volatile semiconductor memory 25 using the memory controller 35. Further, the first controller 1033 outputs the read data to the first NFC controller 30, and writes the data into the first storage unit 40 using the first NFC controller. According to the method, it is possible to transfer data, as intended by the user.

Next, a second method is a method of storing a setting file in the non-volatile semiconductor memory 25 previously. In this method, when the non-volatile semiconductor memory 25 goes into a driven-possible state (for example, when the storage device 5 receives power from the first host 1800), the first controller 1033 reads the setting file with the memory controller 35. Then, the first controller 1033 transmits data to the first storage unit 40, based on the read setting file.

In the setting file, for example, one or a plurality of various conditions are set: a file name (example: an initial character begins with a specific character), an extension (example: a specific extension), a date order (example: 10 from a new file), only flag information, or the like. Then, the first controller 1033 writes data satisfying the condition to the first storage unit 40, using the first NFC controller 30. In addition, the first controller 1033 may write a changed portion into the first storage unit 40, or rewrite the whole every time.

In addition, since a method of reading data from the non-volatile semiconductor memory 25 and transferring the data in the first storage unit 40 is the same as the first method, the description thereof will be omitted.

Further, the setting file may be stored in the first storage unit 40 as a third method. In this case, even when power is supplied only from the second host 1850, it is possible to write the setting file.

When power is supplied from the first host 1800, the first controller 1033 reads the setting file from the first storage unit 40. At this time, the first controller 1033 may store the setting file in the non-volatile semiconductor memory 25.

Since the subsequent flow is the same as the second method, a description thereof will be omitted.

As described above, various methods can be used as the method of extracting data to be stored in the first storage unit 40. In addition, of course, the three methods described above are not intended to limit the extraction method thereto.

Second Operation Example

Figure 45:
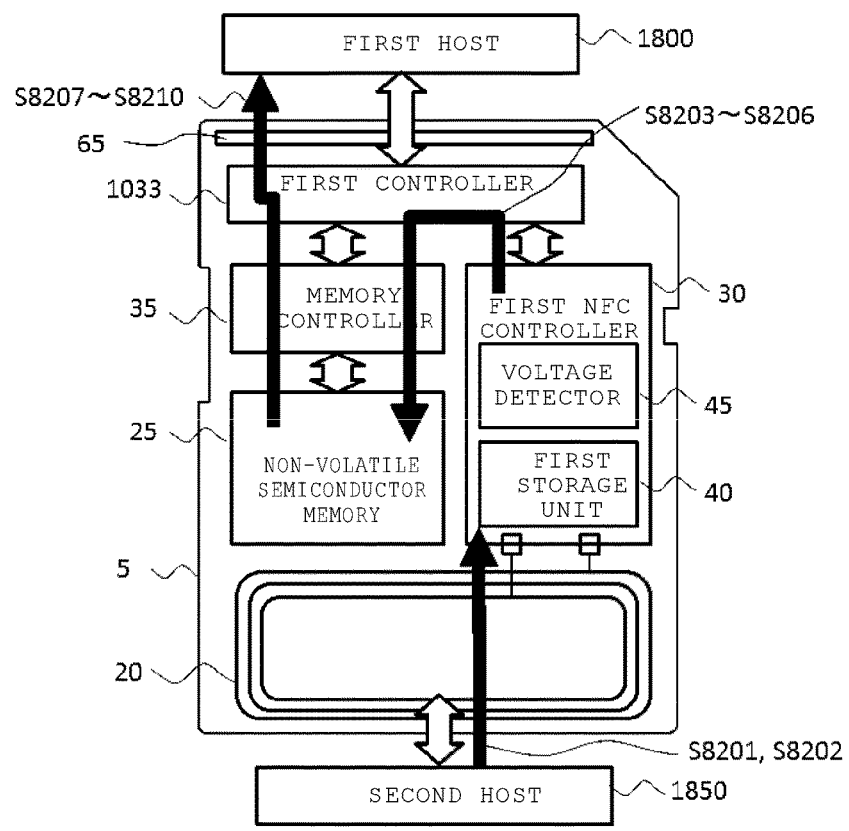
FIG. 45 illustrates data flow in the storage device according to a second operation example of the second embodiment.
Figure 46:
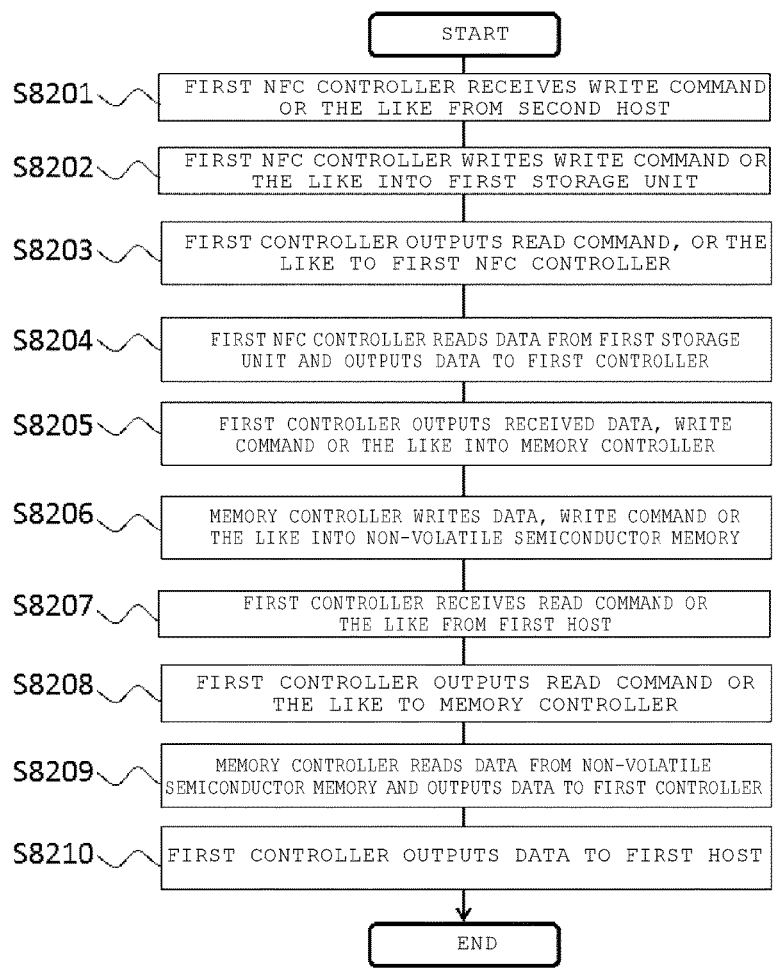
FIG. 46 is a flowchart illustrating a process of the second operation example of the second embodiment.

FIG. 45 schematically illustrates a data flow in a second operation example. Further, FIG. 46 illustrates a flowchart of the second operation example.

A second operation example is an operation to transfer data that is transmitted from the second host 1850 to the first storage unit 40, to the non-volatile semiconductor memory 25, read data from the non-volatile semiconductor memory 25, and transmit the data to the first host 1800.

In step S8201, the first NFC controller 30 receives a write command CMD, an address ADD, and data DAT, from the second host 1850, through the first wireless antenna 20.

In step S8202, the first NFC controller 30 writes data into the first storage unit 40.

In step S8203, the first controller 1033 outputs the read command CMD and the address ADD to the first NFC controller 30.

In step S8204, the first NFC controller 30 reads data DAT from the first storage unit 40, based on the read command CMD or the like. The first NFC controller 30 outputs the data DAT to the first controller.

In step S8205, the first controller 1033 outputs the data DAT, the write command CMD, and the address ADD, which are read, to the memory controller 35.

In step S8206, the memory controller 35 writes data into the non-volatile semiconductor memory 25, based on the write command CMD.

In step S8207, the first controller 1033 receives a read command CMD and an address ADD from the first host 1800, through the connection terminal 65.

In step S8208, the first controller 1033 outputs the read command CMD and the address ADD to the memory controller 35.

In step S8209, the memory controller 35 reads data from the non-volatile semiconductor memory 25, based on the read command CMD or the like. The memory controller 35 outputs data to the first controller 1033.

In step S8210, the first controller 1033 outputs data to the first host 1800 through a connection terminal.

In addition, the above steps may not necessarily be performed in succession, and respective steps may also be temporally separated.

Modification Example of Second Operation Example

Hereinafter, a modification example of the second operation example will be described.

The storage device 5 is operable only with the power supplied from the first wireless antenna 20, which is caused by the second host 1850, in step S8201 and step S8202 of the above operation example.

After step S8202, the process after step S8203 may be performed after the input of commands or the like from the first host 1800. In this case, the first host 1800 can move only required data from the first storage unit 40 to the non-volatile semiconductor memory 25. In addition, in this case, step S8207 may be omitted.

Further, after step S8202, the process after step S8203 may be performed after power supply from the first host.

Further, in step S8209, the memory controller 35 may directly output data to the first host 1800. In other words, the memory controller 35 may directly output data to the first host 1800, through the connection terminal 65.

Third Operation Example

Figure 47:
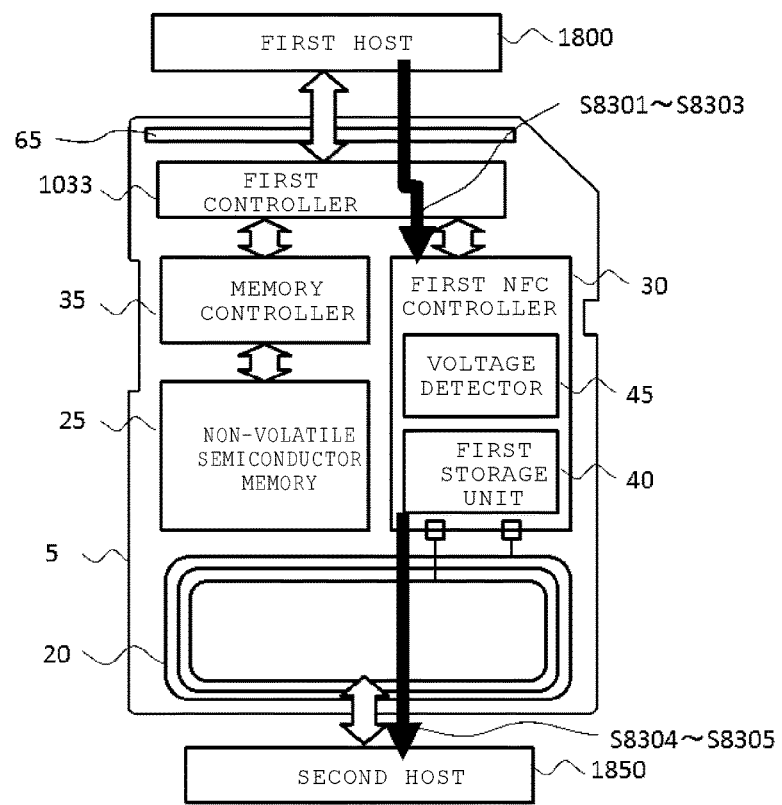
FIG. 47 illustrates data flow in the storage device according to a third operation example of the second embodiment.
Figure 48:
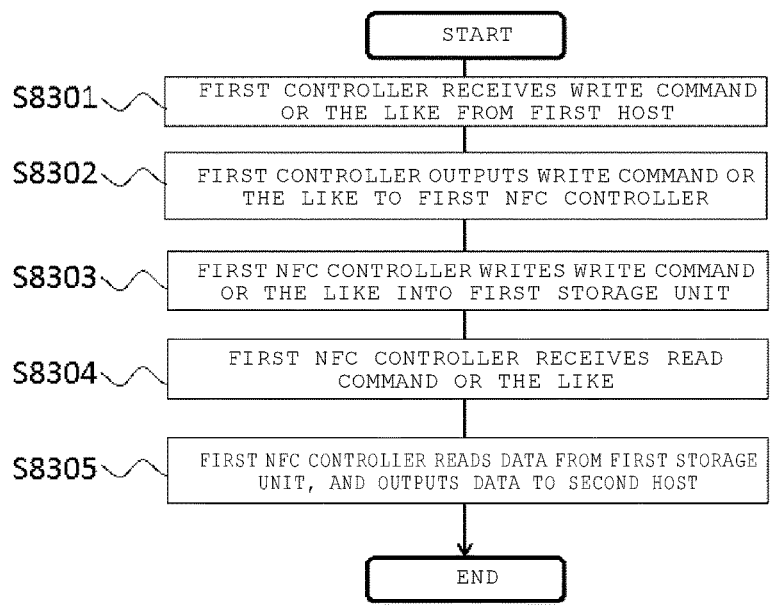
FIG. 48 is a flowchart illustrating a process of the third operation example of the second embodiment.

FIG. 47 schematically illustrates a data flow in a third operation example. Further, FIG. 48 illustrates a flowchart of the third operation example.

The third operation example is an operation in which data are transmitted from the first host 1800 to the first storage unit 40, and the second host 1850 reads the data from the first storage unit 40.

In step S8301, the first controller 1033 receives a write command CMD, an address ADD, and data DAT, from the first host 1800, through the connection terminal 65.

In step S8302, the first controller 1033 outputs the write command CMD, the address ADD, and the data DAT to the first NFC controller 30.

In step S8303, the first NFC controller 30 writes data DAT into the first storage unit 40, based on a write command or the like.

In step S8304, the first NFC controller 30 receives the read command CMD and the address ADD from the second host 1850, through the first wireless antenna 20.

In step S8305, the first NFC controller 30 reads data DAT from the first storage unit 40, and outputs the data to the second host 2850.

In addition, the above steps may not necessarily be performed in succession, and respective steps may also be temporally separated.

Modification Example of Third Operation Example

Hereinafter, a modification example of the third operation example will be described.

The storage device 5 is operable only with power supplied from the second host 1850 through the first wireless antenna 20, in step S8303 to step S8305 of the above operation example.

Fourth Operation Example

Figure 49:
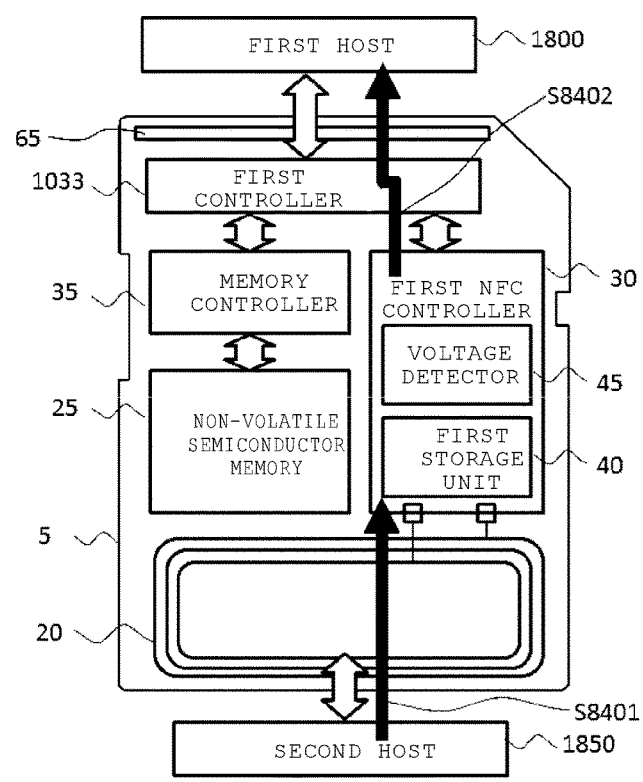
FIG. 49 illustrates data flow in the storage device according to a fourth operation example of the second embodiment.
Figure 50:
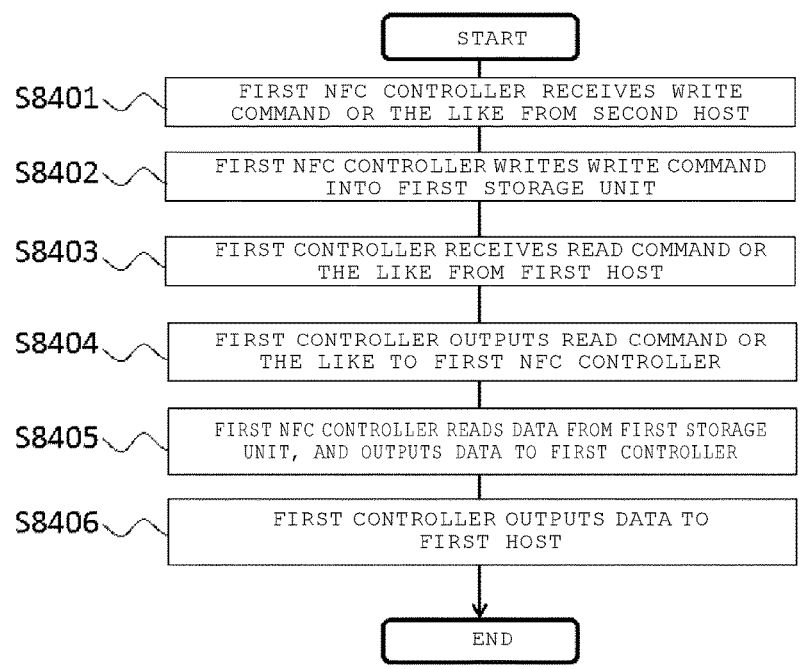
FIG. 50 is a flowchart illustrating a process of the fourth operation example of the second embodiment.

FIG. 49 schematically illustrates a data flow in a fourth operation example. Further, FIG. 50 illustrates a flowchart of the fourth operation example.

The fourth operation example is an operation in which data are transmitted from the second host 1850 to the first storage unit 40, and the first host 1800 reads the data from the first storage unit 40.

In step S8401, the first NFC controller 30 receives the write command CMD, the address ADD, and the data DAT, from the second host 1850, through the first wireless antenna 20.

In step S8402, the first NFC controller 30 writes data into the first storage unit 40.

In step S8403, the first controller 1033 receives the read command CMD and the address ADD from the first host 1800, through the connection terminal 65.

In step S8404, the first controller 1033 outputs the read command CMD and the address ADD to the first NFC controller 30.

In step S8405, the first NFC controller 30 reads data from the first storage unit 40, based on the read command CMD. The first NFC controller 30 outputs data to the first controller 1033.

In step S8406, the first controller 1033 outputs data to the first host 1800, through the connection terminal 65.

In addition, the above steps may not necessarily be performed in succession, and respective steps may also be temporally separated.

Modification Example of Fourth Operation Example

Hereinafter, a modification example of the fourth operation example will be described.

The storage device 5 is operable only with power supplied from the second host 1850 through the first wireless antenna 20, in step S8303 to step S8305 of the above operation example.

Fifth Operation Example

Figure 51:
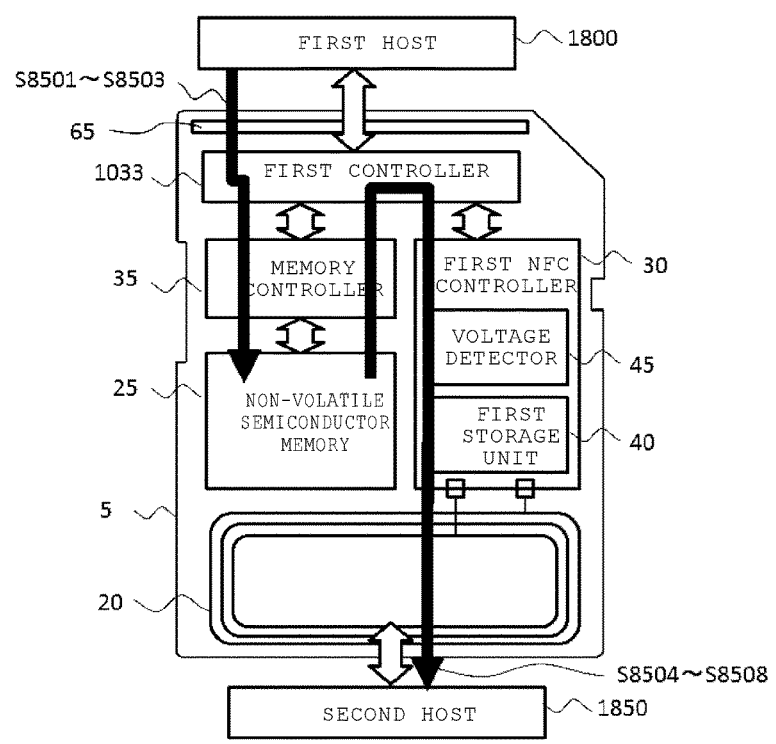
FIG. 51 illustrates data flow in the storage device according to a fifth operation example of the second embodiment.
Figure 52:
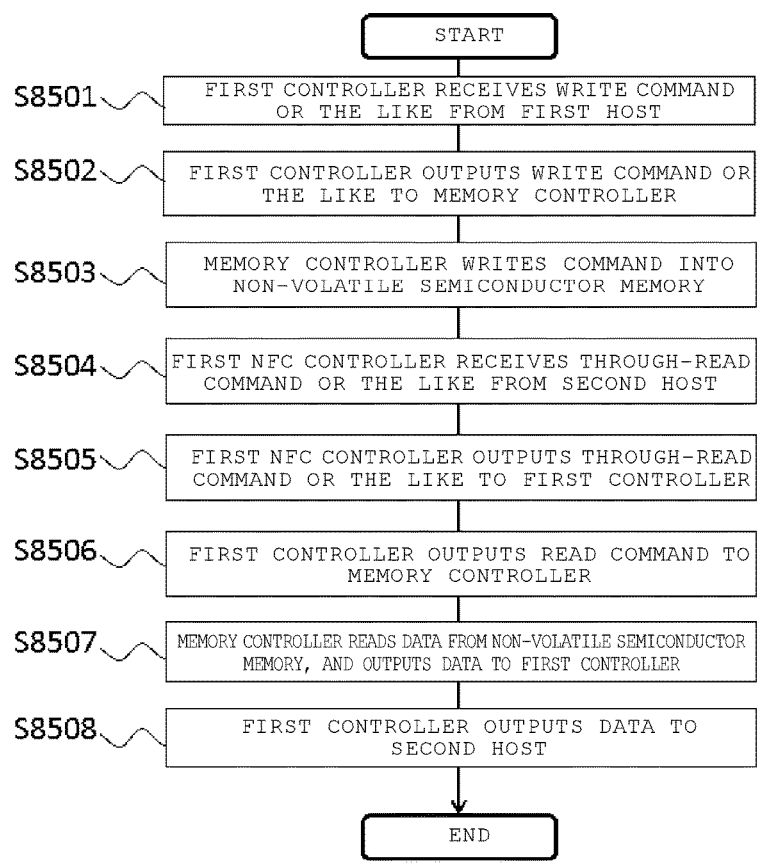
FIG. 52 is a flowchart illustrating a process of the fifth operation example of the second embodiment.

FIG. 51 schematically illustrates a data flow in a fifth operation example. Further, FIG. 52 illustrates a flowchart of the fifth operation example.

The fifth operation example is an operation of outputting data to the second host 1850, without storing data which was transmitted from the first host 1800 in the non-volatile semiconductor memory 25, to the first storage unit 40.

In step S8501, the first controller 1033 receives the write command CMD, the address ADD, and the data DAT, from the first host 1800, through the connection terminal 65.

In step S8502, the first controller 1033 outputs the write command CMD, the address ADD, and the data DAT to the memory controller 35.

In step S8503, the memory controller 35 writes data into the non-volatile semiconductor memory 25, based on the received command CMD.

In step S8504, the first NFC controller 30 receives a through-read command CMD and the address ADD, from the second host 1850, through the first wireless antenna 20. Here, the through-read command CMD is a special command of outputting data of the non-volatile semiconductor memory 25 to the second host 1850, without storing data in the first storage unit 40.

In step S8505, the first NFC controller 30 outputs the through-read command CMD and the address ADD to the first controller 1033.

In step S8506, the first controller 1033 outputs the read command CMD and the address ADD to the memory controller 35, based on the address ADD or the like. In addition, the read command CMD here needs not be a special command, and may be the same read commands in the operation examples described above.

In step S8507, the memory controller 35 reads data DAT from the non-volatile semiconductor memory 25, based on the read command CMD, and outputs the data DAT to the first controller.

In step S8508, the first controller 1033 outputs the received data DAT to the second host 1850, through the first NFC controller 30 and the first wireless antenna 20. In addition, the first controller 1033 may output the data DAT to the second host 1850, without passing through the first NFC controller 30, but through the first wireless antenna 20.

In addition, the above steps may not necessarily be performed in succession, and respective steps may also be temporally separated.

Sixth Operation Example

Figure 53:
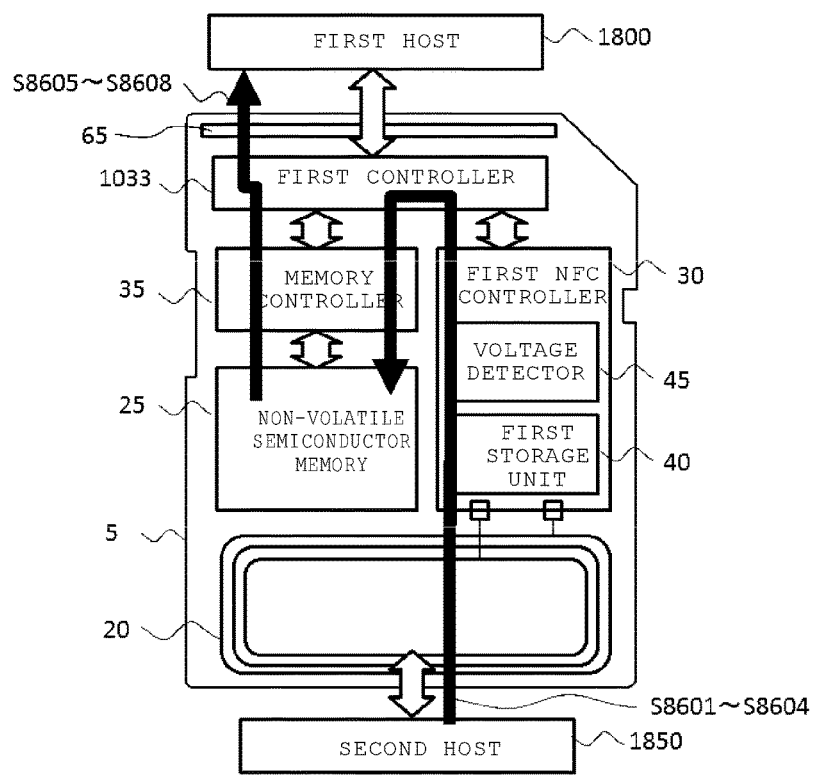
FIG. 53 illustrates data flow in the storage device according to a sixth operation example of the second embodiment.
Figure 54:
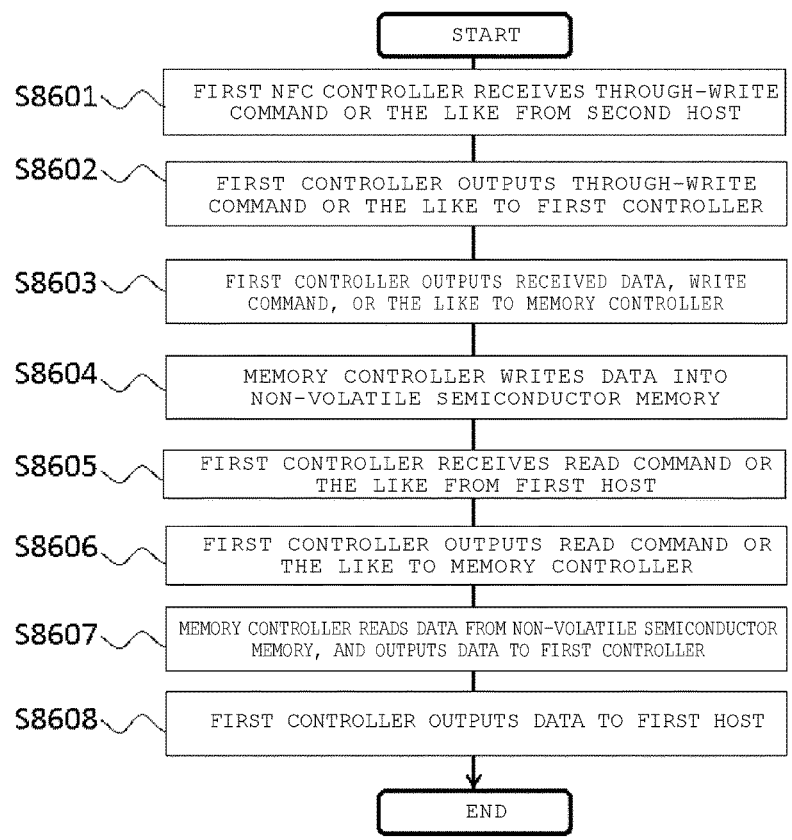
FIG. 54 is a flowchart illustrating a process of the sixth operation example of the second embodiment.

FIG. 53 schematically illustrates a flow of data in a sixth operation example. Further, FIG. 54 illustrates a flowchart of the sixth operation example.

The sixth operation example is an operation in which data from the second host 1850 are stored in the non-volatile semiconductor memory 25 without storing the data in the first storage unit 40, and the first host 1800 reads the data from the non-volatile semiconductor memory 25.

In step S8601, the first NFC controller 30 receives a through-write command CMD, an address ADD, and data DAT from the second host 1850, through the first wireless antenna 20. Here, the through-write command CMD is a special command to store data in the non-volatile semiconductor memory 25, without storing data from the second host 1850 in the first storage unit 40.

In step S8602, the first NFC controller 30 outputs the through-write command CMD, the address ADD, and the data DAT to the first controller 1033.

In step S8603, the first controller 1033 outputs the write command CMD, the address ADD, and the data DAT to the memory controller 35. In addition, this write command CMD does not need to be a special command, and may be the same write command as in the above-mentioned operation example.

In step S8604, the memory controller 35 writes data into the non-volatile semiconductor memory 25, based on the write command CMD, or the like.

In step S8605, the first controller 1033 receives the read command CMD and the address ADD from the first host 1800, through the connection terminal 65.

In step S8606, the first controller 1033 outputs the read command CMD and the address ADD to the memory controller 35.

In step S8607, the memory controller 35 reads data from the non-volatile semiconductor memory 25, based on the read command CMD or the like. The memory controller 35 outputs data to the first controller 1033.

In step S8608, the first controller 1033 outputs data to the first host 1800, through a connection terminal.

In addition, the above steps may not necessarily be performed in succession, and respective steps may also be temporally separated.

Modification Example of Sixth Operation Example

Hereinafter, a modification example of the sixth operation example will be described.

In step S8607, the memory controller 35 may directly output data to the first host 1800. In other words, the memory controller 35 may directly output the data to the first host 1800, through the connection terminal 65.

Seventh Operation Example

Figure 55:
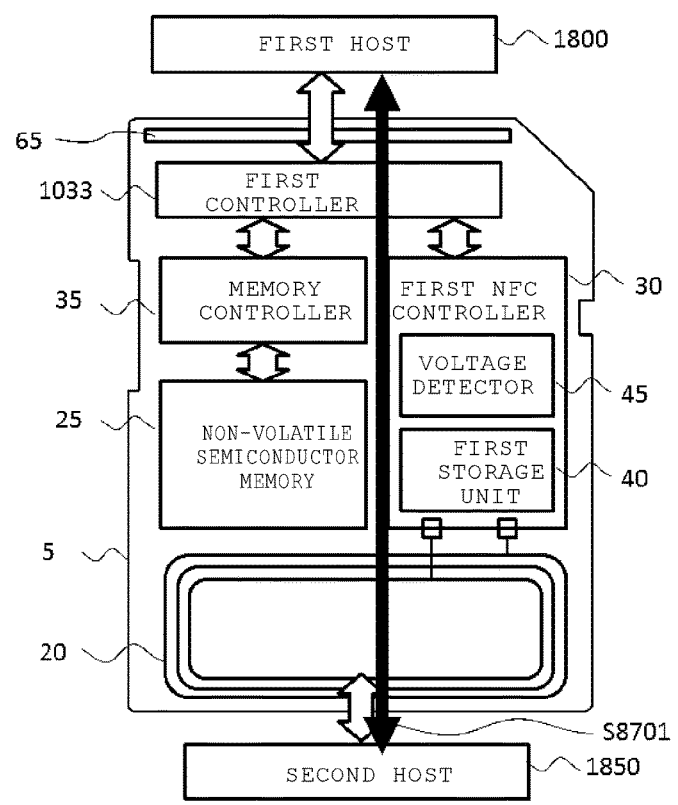
FIG. 55 illustrates data flow in the storage device according to a seventh operation example of the second embodiment.

FIG. 55 schematically illustrates a data flow in a seventh operation example.

The seventh operation example is an operation in which the first host 1800 and the second host 1850 communicate through the storage device 5.

The first host 1800 can communicate with the storage device 5 through the connection terminal 65. Further, the second host 1850 can communicate with the storage device 5 through the first wireless antenna 20. Further, the first controller 1033 and the first NFC controller 30 can communicate between the connection terminal 65 and the first wireless antenna 20.

In other words, the first host 1800 can communicate with the second host 1850 through the storage device 5. In addition, the storage device 5 may completely transfer the command CMD, the address ADD, the data DAT, or the like, as it is, or may convert a portion thereof.

The wireless communication apparatus 15 can communicate with the base station 1530, through the storage device 5, by NFC communication, according to the seventh operation example. In other words, even though the wireless communication apparatus 15 itself may not have a NFC communication function, the wireless communication apparatus 15 can perform NFC communication with the base station 1530 according to the seventh operation example.

FIG. 56 to FIG. 62 are timing charts respectively schematically illustrating time series of commands and data in the first operation example to the seventh operation example. It is assumed that circled numbers denoted in each timing chart have the following meanings for convenience. In other words, with respect to the upper number X of X-Y, X=1 indicates that the command CMD is communicated between the first host 1800 and the first controller 1033. X=2 indicates that the command CMD is communicated between the first controller 1033 and the non-volatile semiconductor memory 25. X=3 indicates that the command CMD is communicated between the first controller 1033 and the first storage unit 40. X=4 indicates that the command CMD is communicated between the first storage unit 40 and the second host 1850. X=5 indicates that the command CMD is communicated between the first host 1800 and the first storage unit 40. X=6 indicates that the command CMD is communicated between the non-volatile semiconductor memory 25 and the second host 1850. X=7 indicates that the command CMD is communicated between the second host 1850 and the first controller 1033. X=8 indicates that the command CMD is communicated between the first controller 1033 and the first host 1800. With respect to the lower number Y, Y=1 indicates that the command CMD is a write command (Write). Y=2 indicates that the command CMD is a read command (Read). For example, in the case of description "1-1", the command CMD indicates that writing is performed between the first host 1800 and the first controller 1033.

Figure 56:
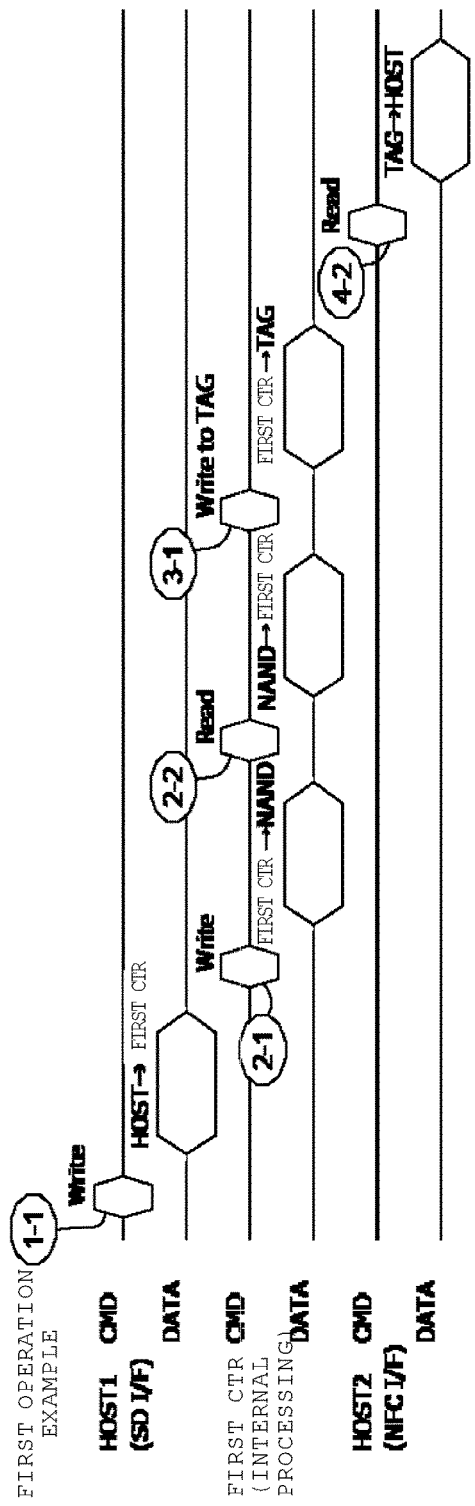
FIG. 56 is a timing chart of the first operation example of the second embodiment.

As illustrated in FIG. 56, in the first operation example, the first host 1800 first outputs the write command CMD (1-1), and then transmits the data DATA to the first controller 1033. The first controller 1033 interprets the command CMD through the memory controller 35, and writes the data DATA into the non-volatile semiconductor memory 25 (2-1). Thereafter, the first controller 1033 outputs the written data DAT through the memory controller 35 (2-2). The first controller 1033 writes the data DATA into the first storage unit 40 through the first NFC controller 30 (3-1). The second host 1850 transmits the read command CMD to the first NFC controller 30 (4-2), and reads the data DATA from the first storage unit 40, by the first NFC controller 30.

Figure 57:
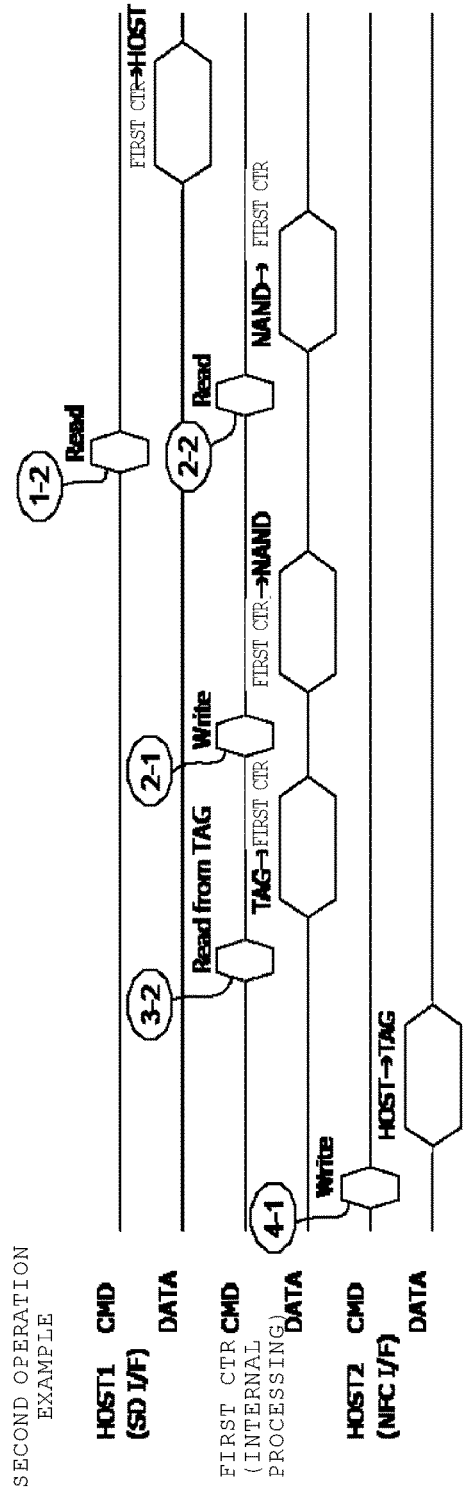
FIG. 57 is a timing chart of the second operation example of the second embodiment.

As illustrated in FIG. 57, in the second operation example, the second host 1850 outputs the write command CMD to the first storage unit 40 (4-1), and then transmits the data DATA to the first controller 1033(3-2). The first NFC controller 30 writes the data DATA into the first storage unit 40. The first NFC controller 30 outputs the written data DATA to the first controller 1033. The first controller 1033 writes the data DATA into the non-volatile semiconductor memory 25, through the memory controller 35 (2-1). Subsequently, the first host 1800 transmits the read command CMD to the first controller 1033 (1-2), and the first controller 1033, that receives the read command CMD, reads the data DATA from the non-volatile semiconductor memory 25, through the memory controller 35 (2-2). The first controller 1033 transmits the read data DATA to the first host 1800.

Figure 58:
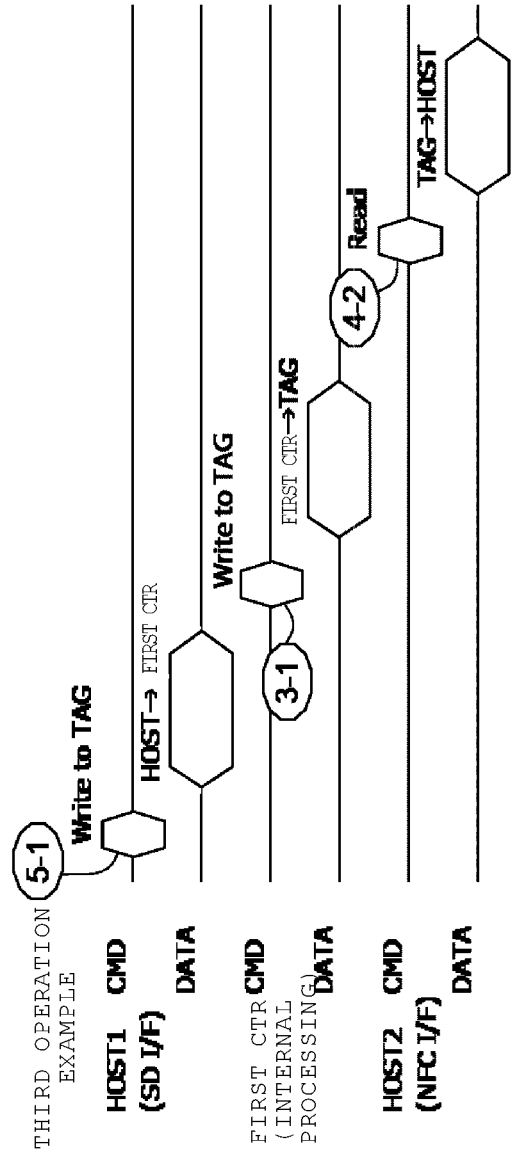
FIG. 58 is a timing chart of the third operation example of the second embodiment.

As illustrated in FIG. 58, in the third operation example, the first host 1800 outputs the write command CMD to the first storage unit 40 (5-1), and then transmits the data DATA to the first controller 1033. The first controller 1033, that receives the data DATA, writes the data DATA into the first storage unit 40, through the first NFC controller 30 (3-1). The second host 1850 transmits the read command CMD to the first NFC controller 30, and reads the data DATA from the first storage unit 40 by the first NFC controller 30 (4-2).

Figure 59:
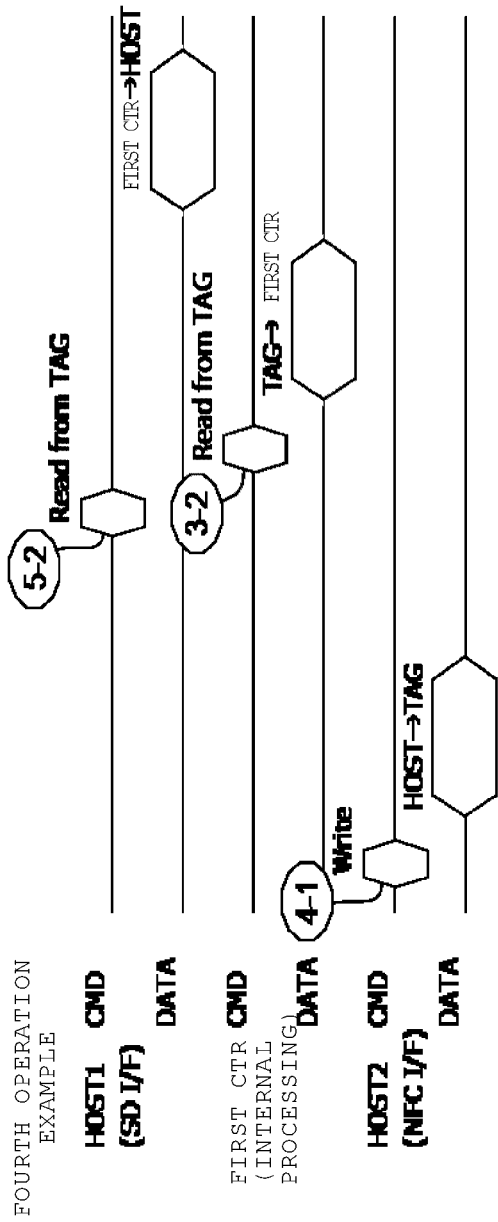
FIG. 59 is a timing chart of the fourth operation example of the second embodiment.

As illustrated in FIG. 59, in the fourth operation example, the second host 1850 outputs the write command CMD (4-1), and then transmits the data DATA to the first controller 1033. The first NFC controller 30 writes the data DAT to the first storage unit 40. The first host 1800 transmits the read command CMD to the first storage unit 40 (5-2), and the first controller 1033 reads the data DATA from the first storage unit 40, through the first NFC controller 30 (3-2). The read data DATA are transmitted to the first host 1800 by the first controller 1033.

Figure 60:
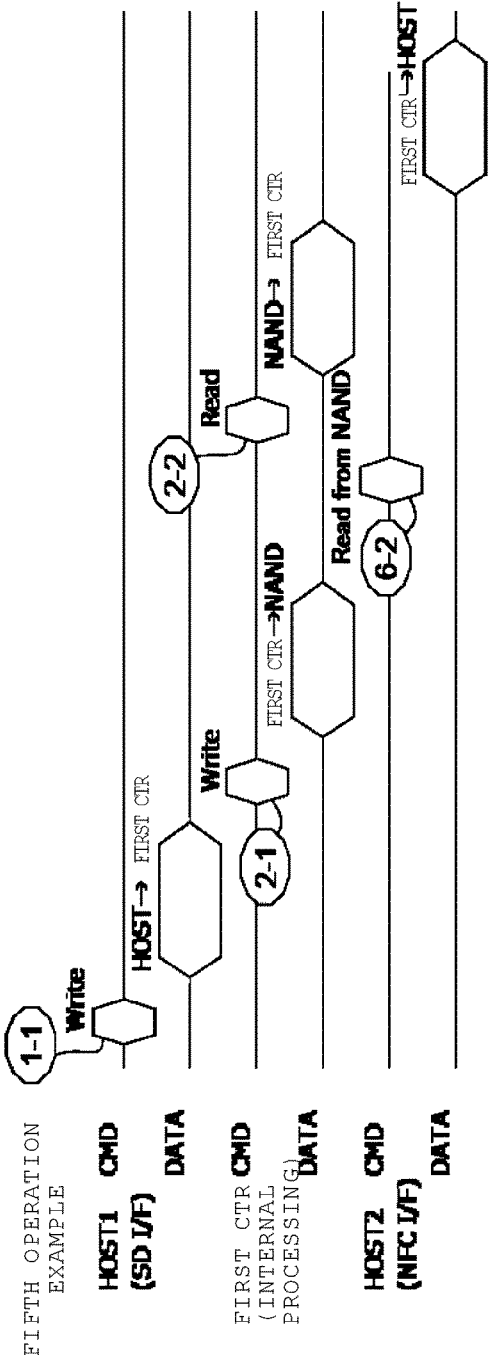
FIG. 60 is a timing chart of the fifth operation example of the second embodiment.

As illustrated in FIG. 60, in the fifth operation example, the first host 1800 outputs the write command CMD to the first controller 1033 (1-1). At this time, the command is a through-write command for passing the writing to the first storage unit 40. The first controller 1033, which receives the data DATA, writes the data DATA into the non-volatile semiconductor memory 25, through the memory controller 35 (2-1). The second host 1850 transmits the read command CMD to the non-volatile semiconductor memory 25 (6-2). At this time, the read command is a through-read command for passing the reading to the first storage unit 40. The first controller 1033 reads the data DATA from the non-volatile semiconductor memory 25, by the through-read command (2-2).

Figure 61:
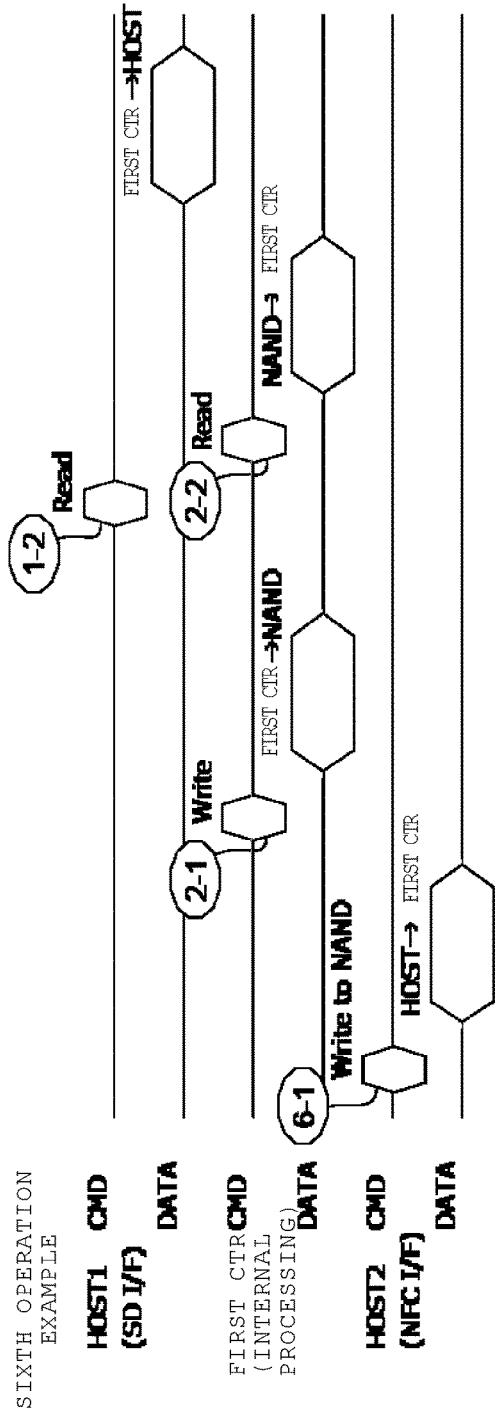
FIG. 61 is a timing chart of the sixth operation example of the second embodiment.

As illustrated in FIG. 61, in the sixth operation example, the second host 1850 transmits a write command to the non-volatile semiconductor memory 25, and transmits data DATA (6-1). The first controller 1033 writes the transmitted data DATA into the non-volatile semiconductor memory 25, through the memory controller 35 (2-1). If the first host 1800 transmits the read command to the first controller 1033 (1-2), the first controller 1033 reads data DATA from the non-volatile semiconductor memory 25 through the memory controller 35 (2-2).

Figure 62:
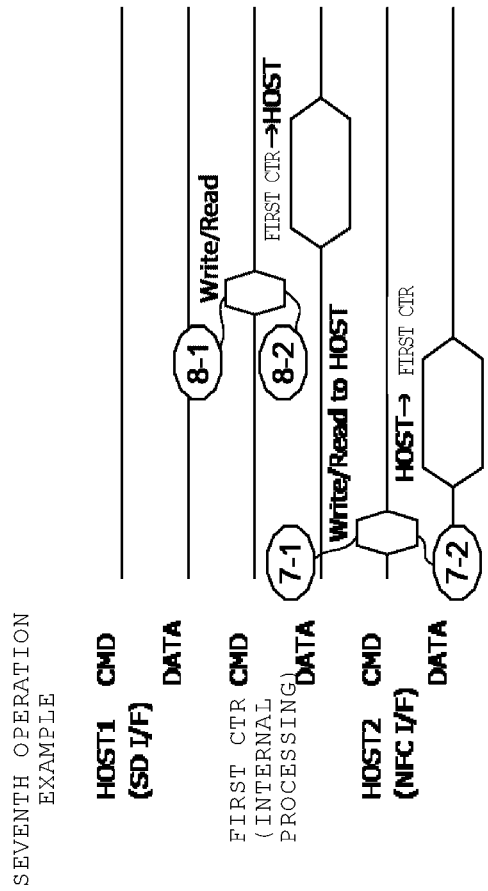
FIG. 62 is a timing chart of the seventh operation example of the second embodiment.

As illustrated in FIG. 62, in the seventh operation example, the second host 1850 transmits a write command or a read command (7-1 or 7-2), and subsequently transmits data DATA. The first controller 1033 transmits the transmitted data DATA to the first host 1800, based on any one of the write command and the read command (8-1 or 8-2). In addition, the command of the first controller 1033 at this time may be either the write command or the read command, or may be a command that the user arbitrarily sets.

FIG. 63 is a table which summarizes the above-described operation examples of the storage device 5 and advantages thereof. Each arrow indicates a flow of data, and a hatched region indicates an operation-possible state during power supply from the first host 1800. In addition, when the non-volatile semiconductor memory 25 and the first storage unit 40 hold only data, it is possible to hold data even without power supply from the first host side.

As illustrated in the first row in FIG. 63, in the first operation example, data transfer from the first host 1800 to the second host 1850 is performed through reading and writing to the non-volatile semiconductor memory 25 and the first storage unit 40. In the first operation example, since data transmission from the first storage unit 40 to the second host 1850 is performed through NFC communication, even without power supply from the first host 1800, the second host 1850 is capable of acquiring data from the first storage unit 40.

As illustrated in the second row in FIG. 63, in the second operation example, data transfer from the second host 1850 to the first host 1800 is performed through reading and writing to the first storage unit 40 and the non-volatile semiconductor memory 25. Similar to the first operation example, since data transfer between the first storage unit 40 and the second host 1850 is performed through NFC communication, the data transfer is performed without power supply from the first host 1800.

As illustrated in the third row and the fourth row in FIG. 63, even in the third operation example and the fourth operation example, since data transfer between the first storage unit 40 and the second host 1850 is performed through NFC communication, the data transfer is performed without power supply from the first host.

As illustrated in the fifth row and the sixth row in FIG. 63, even in the fifth operation example and the sixth operation example, since data of the non-volatile semiconductor memory 25 is transferred without through the writing and reading to the first storage unit 40, it is possible to transfer data of a large capacity.

As illustrated in the seventh row in FIG. 63, in the seventh operation example, since data transfer between the first host 1800 and the second host 1850 can directly be performed, it is possible to perform data transfer without being limited in the data capacity of the non-volatile semiconductor memory 25 and the first storage unit 40.

Third Embodiment

Figure 64:
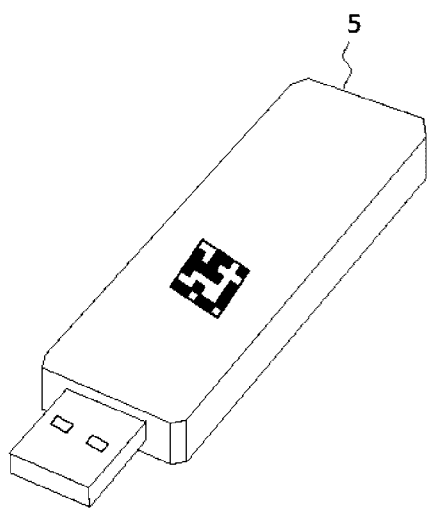
FIG. 64 is a perspective view of a storage device according to a third embodiment.

FIG. 64 is a perspective view of a storage device 5 according to a third embodiment.

The storage device 5 is not limited to a so-called memory card, and as illustrated in FIG. 63, may be a USB memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
a memory device in which data associated with a storage device that is external to the wireless communication apparatus are stored, wherein the data associated with the storage device is acquired through a wireless communication;
an image capturing device;
a display; and
a controller configured to:
identify an external storage device corresponding to a code captured by the image capturing device,
responsive to identification of the external storage device, generate a display image from the data stored in the memory device if the data stored in the memory device are associated with the identified external storage device, and
control the display to display a display image,
wherein the data stored in the memory device include thumbnail image data of image data stored in the external storage device, and
the display image includes one or more thumbnail images that are generated from the thumbnail image data.

2. The wireless communication apparatus according to claim 1, wherein
an identity of the external storage device is encoded in the code, and
the controller is further configured to decode the code to determine the identity of the external storage device.

3. The wireless communication apparatus according to claim 1, wherein
said one or more thumbnail images are displayed together with a display image of the code captured by the image capturing device.

4. The wireless communication apparatus according to claim 1, wherein
the controller controls the display to display said one or more thumbnail images around an image of the identified external storage device.

5. The wireless communication apparatus according to claim 4, wherein
said one or more thumbnail images are displayed adjacent to the image of the identified external storage device.

6. The wireless communication apparatus according to claim 1, wherein
when a user makes selection of at least one of said one or more thumbnail images through a user interface presented on the display, the controller sets a priority flag for the image data stored in the external storage device that correspond to the selected thumbnail image.

7. The wireless communication apparatus according to claim 1, wherein
the data stored in the memory device include data indicating a remaining capacity of the external storage device.

8. The wireless communication apparatus according to claim 7, wherein
the controller controls the display to display the remaining capacity together with said one or more thumbnail images.

9. The wireless communication apparatus according to claim 1, wherein
the controller controls the display to display an order near the image of the identified external storage device based on priority information set by a user.

10. The wireless communication apparatus according to claim 1, wherein
the controller controls the display to display an order near the image of the identified external storage device based on an order of a size of a remaining capacity of the external storage device.

11. The wireless communication apparatus according to claim 1, wherein
the memory device stores first data, which are associated with a first external storage device, and second data, which are associated with a second external storage device, and
when the image capturing device captures codes of the first and second external storage devices, the controller generates first display data from the first data and second display data from the second data, and controls the display to generate a display image from the first and second display data.

12. The wireless communication apparatus according to claim 1, further comprising:
a near field communication module through which the data associated with the external storage device were acquired.

13. The wireless communication apparatus according to claim 1, wherein
the data associated with the external storage device and stored in the memory device were transmitted from the external storage device to a server, when the external storage device was physically connected to a host computing device, and
the data associated with the external storage device and stored in the memory device were received from the server.

14. A method of controlling a wireless communication apparatus including a memory device and a display, comprising:
receiving data associated with a storage device that is external to the wireless communication apparatus through a wireless communication;
storing the data associated with the storage device in the memory device;
capturing a code;
identifying an external storage device corresponding to the captured code;
responsive to identification of the external storage device, generating a display image from the data stored in the memory device if the data stored in the memory device are associated with the identified external storage device; and
controlling the display to display a display image,
wherein the data stored in the memory device include thumbnail image data of image data stored in the external storage device, and
the display image includes one or more thumbnail images that are generated from the thumbnail image data.

15. The method according to claim 14, wherein
an identity of the external storage device is encoded in the code, and
the identifying further includes decoding the code to determine the identity of the external storage device.

16. The wireless communication apparatus according to claim 14, wherein
said one or more thumbnail images are displayed together with a display image of the captured code.

17. The method according to claim 14, further comprising
controlling the display to display said one or more thumbnail images around image of the identified external storage device.

18. The method according to claim 17, wherein
said one or more thumbnail images are displayed adjacent to the image of the identified external storage device.

19. The method according to claim 14, further comprising
setting, when a user makes selection of at least one of said one or more thumbnail images through a user interface presented on the display, a priority flag for the image data stored in the external storage device that correspond to the selected thumbnail image.

20. The method according to claim 14, wherein
the data stored in the memory device include data indicating a remaining capacity of the external storage device.

* * * * *